United States Patent
Lode

[11] 3,889,189
[45] June 10, 1975

[54] DIGITAL TIME MEASUREMENT SYSTEM

[76] Inventor: Tenny D. Lode, 3270 Cherryridge Rd., Cherry Hills Village, Colo. 80110

[22] Filed: Feb. 21, 1974

[21] Appl. No.: 444,562

[52] U.S. Cl. ............................. 324/186; 343/5 DP
[51] Int. Cl. ......................... G04f 9/00; G01s 9/04
[58] Field of Search .......... 343/5 DP; 324/186, 187

[56] References Cited
UNITED STATES PATENTS

| | | | |
|---|---|---|---|
| 3,199,104 | 8/1965 | Miller | 343/12 |
| 3,376,504 | 4/1968 | Chick | 343/5 DP X |
| 3,505,594 | 4/1970 | Tarcey-Hornoch et al. | 324/187 |
| 3,541,448 | 11/1970 | Nutt | 324/186 |
| 3,675,127 | 7/1972 | McKiernan | 324/186 |

FOREIGN PATENTS OR APPLICATIONS

815,481   6/1959   United Kingdom

Primary Examiner—T. H. Tubbesing
Attorney, Agent, or Firm—Dugger, Johnson & Westman

[57] ABSTRACT

This invention relates to the digital measurement of times and time intervals. An object is to provide time measurement data in a form suitable for input to a digital computing system. In a particular form of the invention, a number of oscillators or signal sources are synchronized so that their output frequencies are related exactly as successive powers of two, and their output signals are maintained in a predetermined phase relationship. For example, a set of oscillators may be arranged to generate signals of 1 MHz, 2 MHz, 4 MHz, 8 MHz, etc. Sample-and-hold circuits are used to sample and hold the oscillator signal values at the time of a pulse signal whose time is to be measured. Binary (two-state) signals are generated whose values correspond to the polarities of the sampled oscillator signal values. These binary signals are connected to simple logical circuits which resolve any ambiguities and generate the desired digital number in a normal binary or other desired form. This generated number is a digital measure of the time of occurrence of the pulse which initiated the sampling operation. Time intervals may be measured by two such sampling operations and a subtraction of the two resulting digital values.

24 Claims, 81 Drawing Figures $-\sin(\theta-45°)$ $-\sin(\theta+45°)$ $-\sin(2\theta-45°)$ $-\sin(2\theta+45°)$ $-\sin(4\theta-45°)$ $-\sin(4\theta+45°)$ $-\sin(8\theta)$

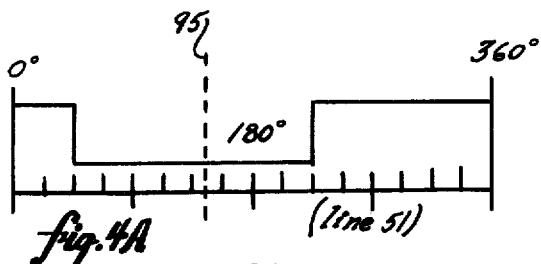
fig.4A (line 51)
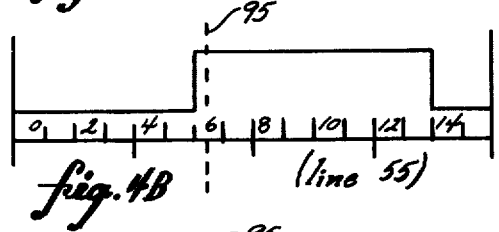
fig.4B (line 55)
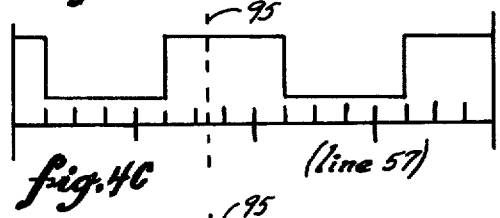
fig.4C (line 57)
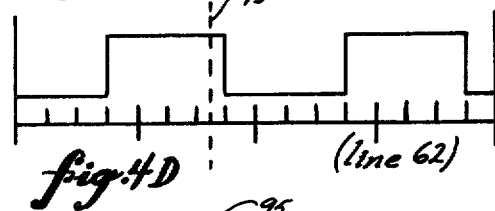
fig.4D (line 62)
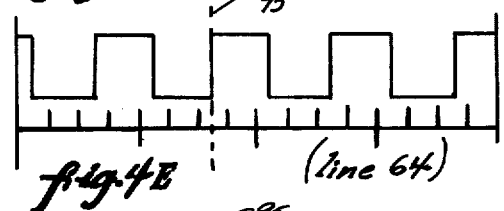
fig.4E (line 64)
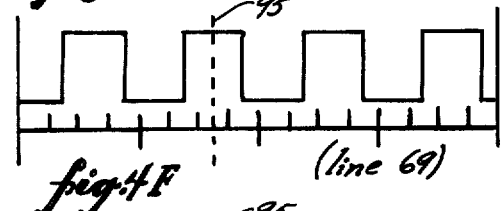
fig.4F (line 69)
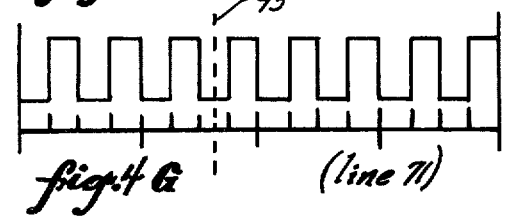
fig.4G (line 71)
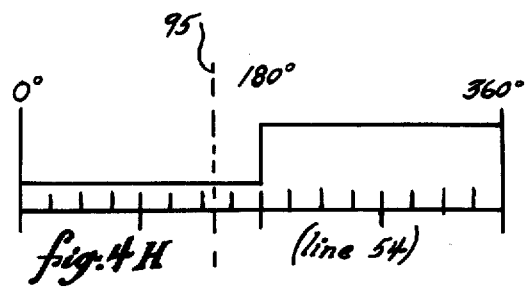
fig.4H (line 54)
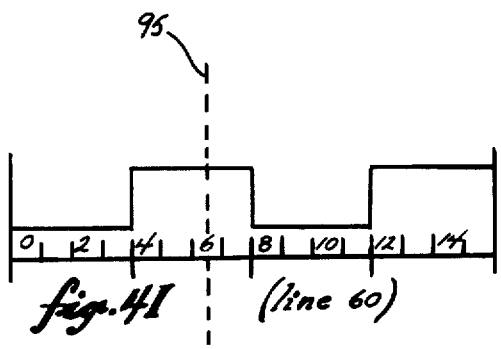
fig.4I (line 60)
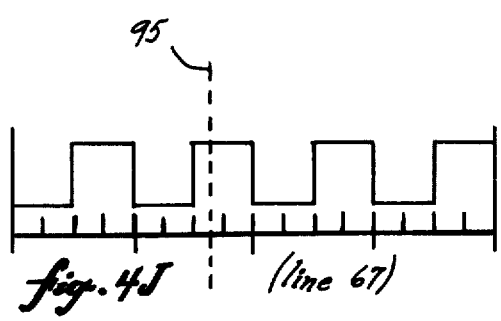
fig.4J (line 67)
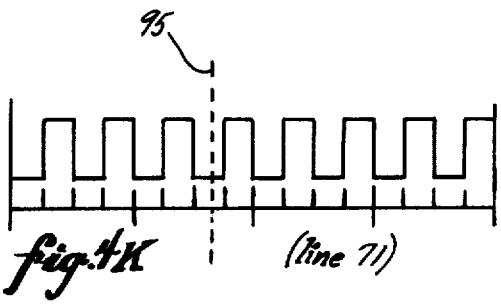
fig.4K (line 71)

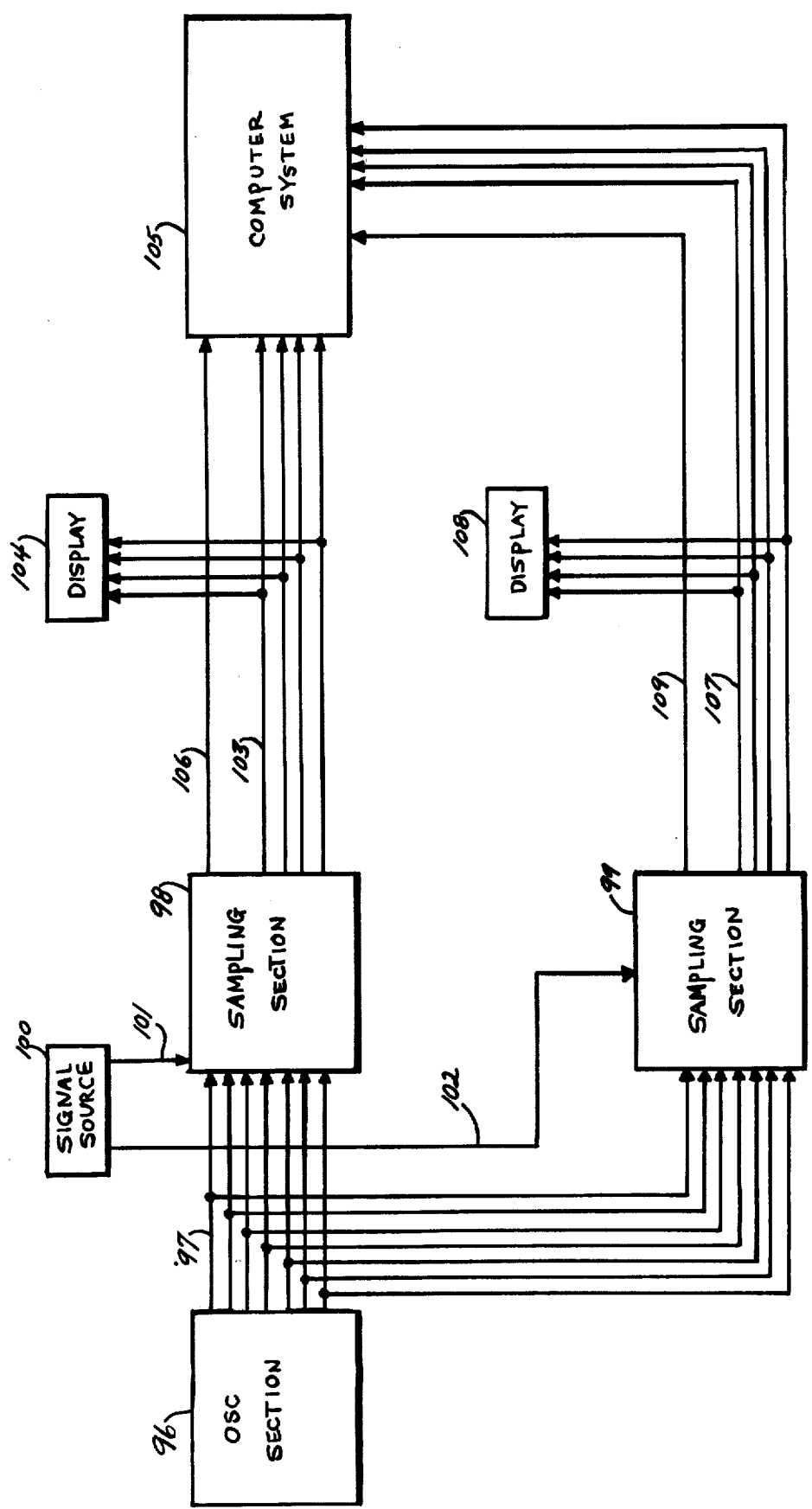

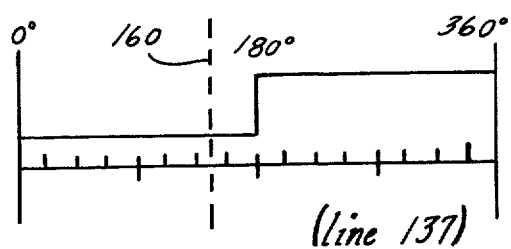
fig. 8A (line 137)
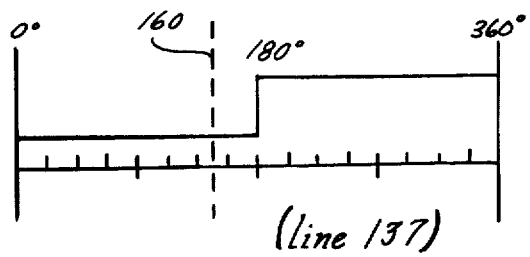
fig. 8E (line 137)
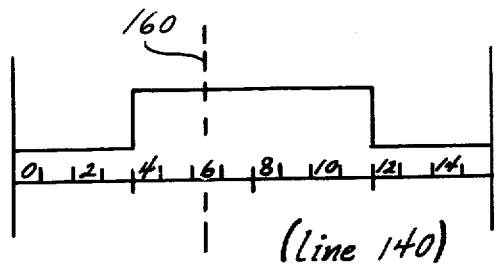
fig. 8B (line 140)
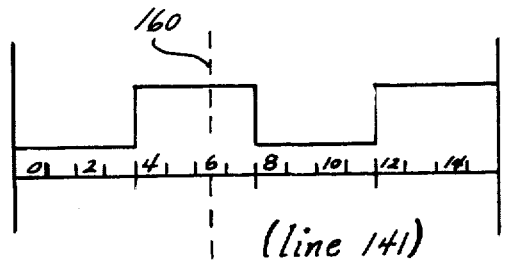
fig. 8F (line 141)
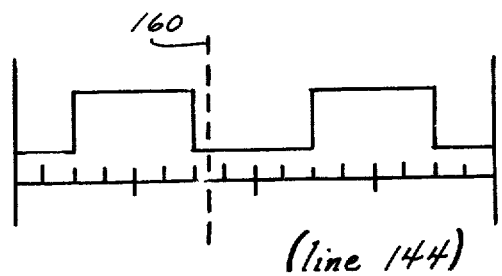
fig. 8C (line 144)
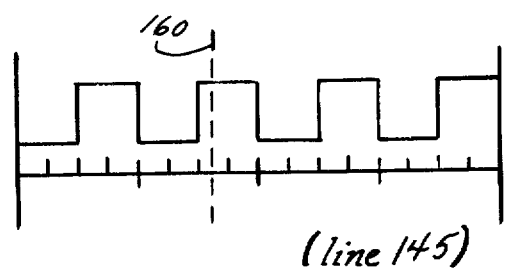
fig. 8G (line 145)
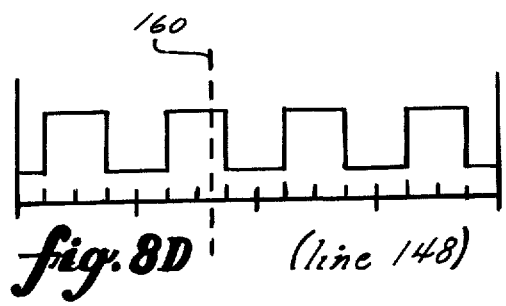
fig. 8D (line 148)
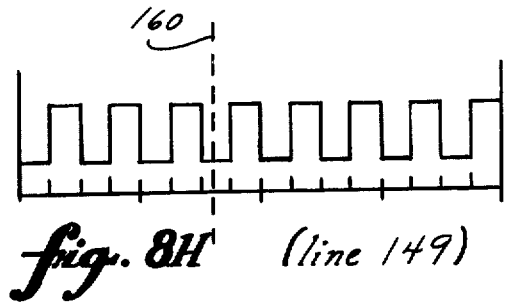
fig. 8H (line 149)

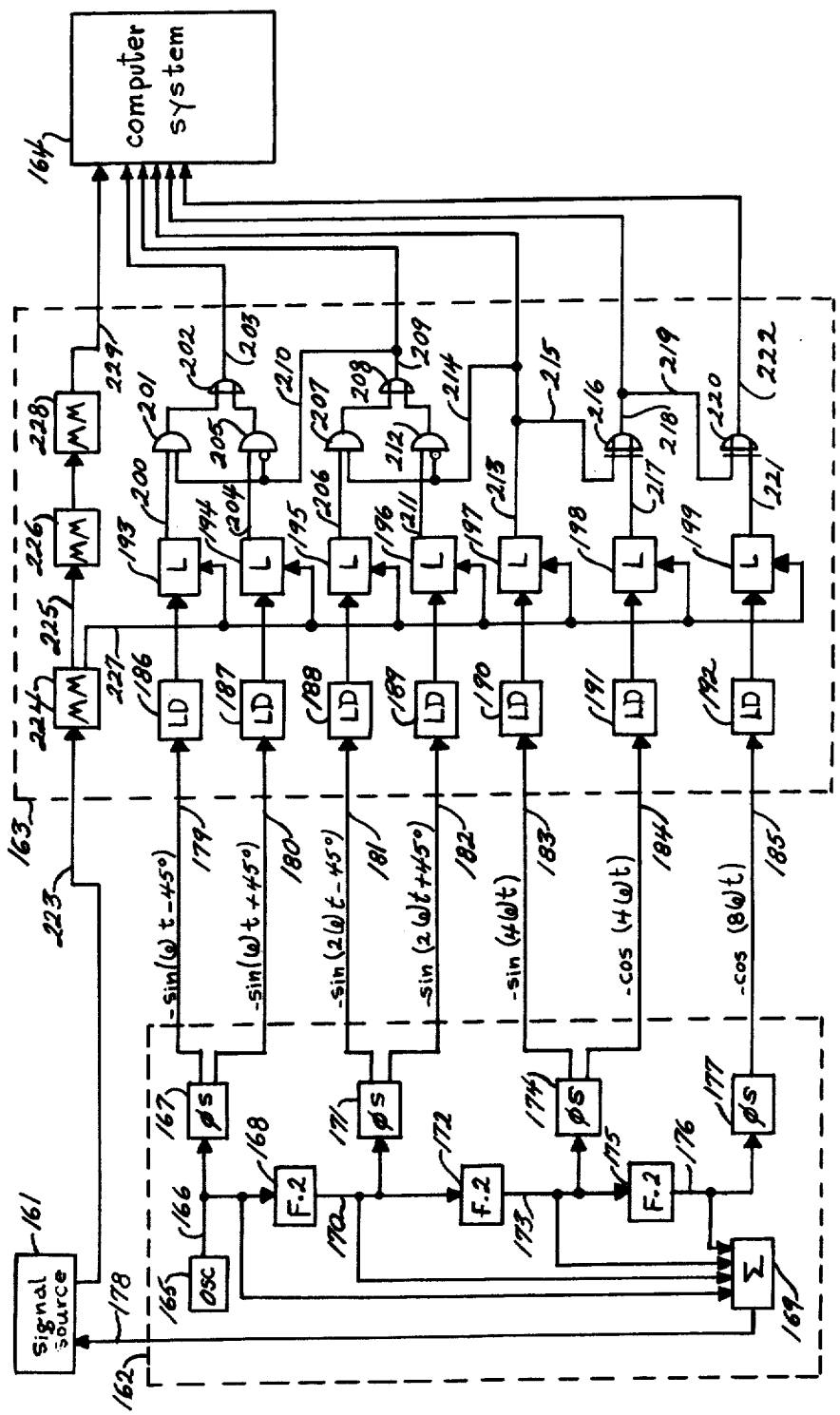

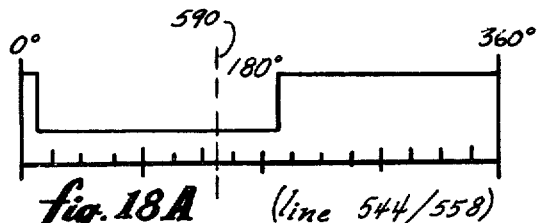
fig. 18A    (line 544/558)
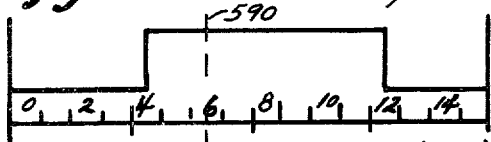
fig. 18B    (line 545/562)
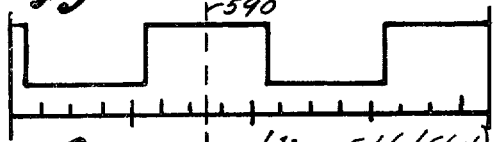
fig. 18C    (line 546/564)
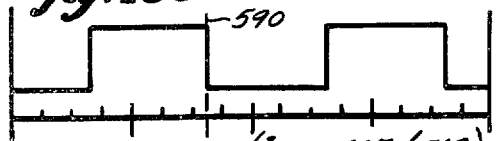
fig. 18D    (line 547/569)
fig. 18E    (line 548/571)
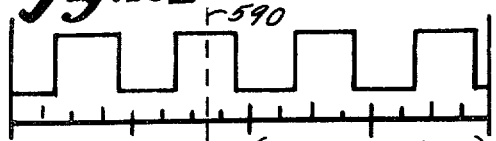
fig. 18F    (line 549/576)
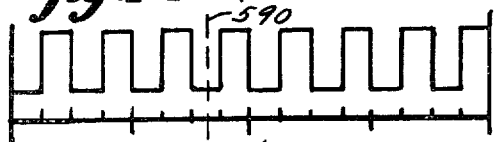
fig. 18G    (line 550/578)
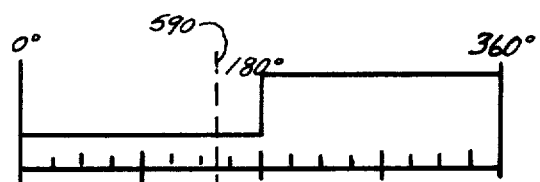
fig. 18J    (line 561)
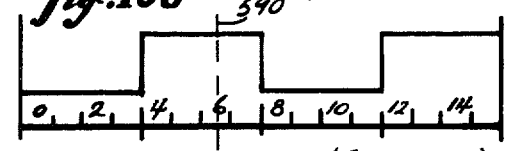
fig. 18K    (line 567)
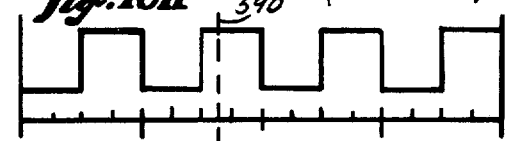
fig. 18L    (line 574)
fig. 18M    (line 578)
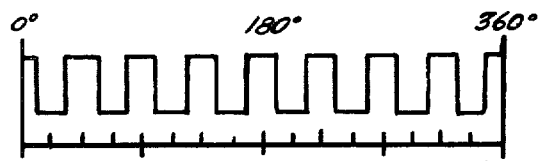
fig. 18H    (line 530)
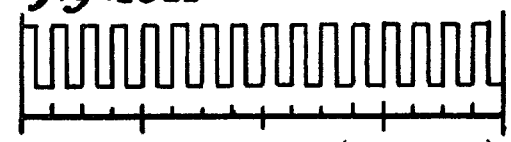
fig. 18I    (line 526)

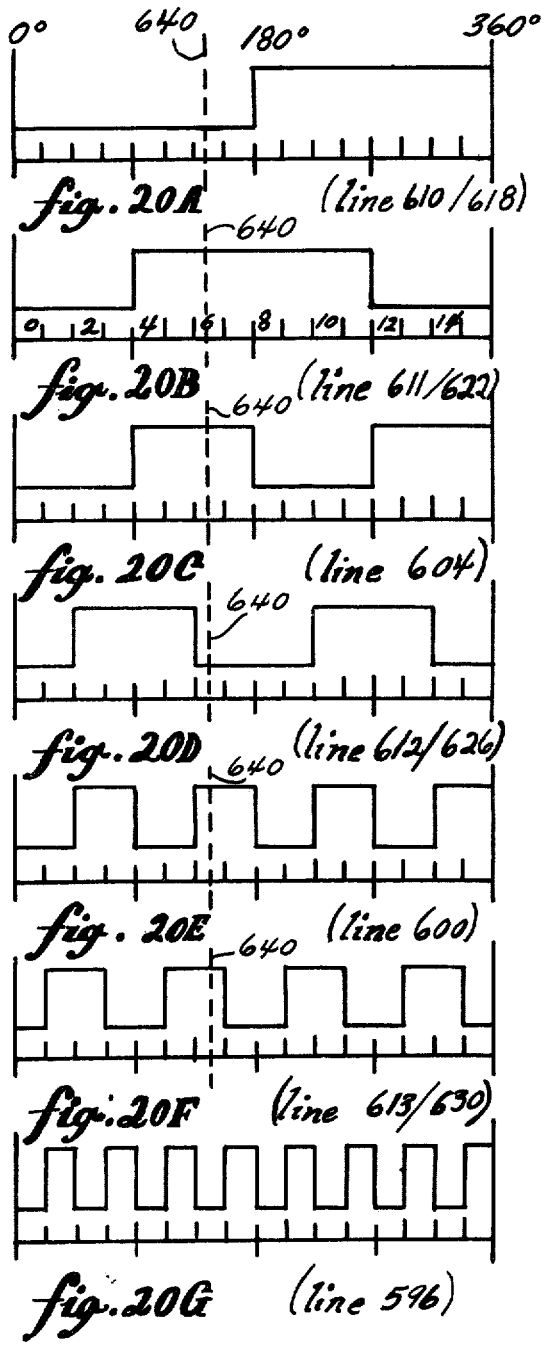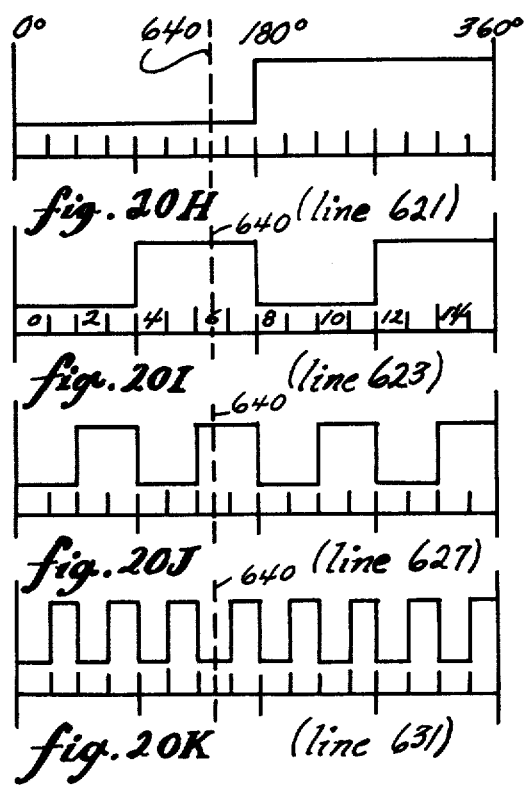

DIGITAL TIME MEASUREMENT SYSTEM

BACKGROUND OF THE INVENTION

The increasing use of digital computers and digital techniques for measurement, computation and control makes it desirable and useful to be able to digitally measure a wide variety of time and time interval signals. The digital numbers may be entered into a digital computer as data for processing, recorded, displayed and/or used otherwise as desired. A commonly used system for digital time measurement is to arrange a digital counter to count the number of pulses from a clock oscillator which occur during a time interval which is to be measured. For example, the number of microseconds between the transmission of a radar pulse and the reception of the reflected echo may be measured by counting the number of pulses of a 1 MHz clock oscillator which occur between the transmission and reception. This number may then be observed via a digital display, transmitted to a computer and/or used otherwise as desired.

When a counter is used for the measurement of a single time interval, the usual practice is to disconnect the counter from the clock pulse stream at the measurement time. If the digital value is to be transmitted to a computer or other data receiver, there will usually be a short pause between the disconnecting of the clock pulse stream and the transmission of the counter value, to allow any carry signals to propagate through the counter. This pause for carry propagation avoids the possible transmission of intermediate count states, which might otherwise appear as occasional erroneous values.

Simple pulse counting time measurement techniques are limited by the maximum counting speeds of the digital counting circuits. At the present time (1973), the maximum practical counting speeds with generally available semiconductor devices are in the range of a few hundred MHz. These counting speeds give time resolutions in the range of 2 to 5 nanoseconds per count. In some instances, it may be desirable to digitally measure times or time intervals with finer resolutions. For example, if a radial velocity is to be digitally measured in a radar system, it is necessary to measure small changes in radial distance and correspondingly small changes in echo time with a relatively high resolution. It may not be necessary to measure the total distance and total echo time with a correspondingly high accuracy.

A number of systems have been developed which can make digital time measurements with resolutions of less than 1 nanosecond per digital step. One approach is to use some form of high speed analog circuitry for interpolation between the pulses of a clock oscillator. At least some of these interpolating high speed digital time measurement systems have the disadvantage that there is a dead time after the measured time interval, in which the timing system is performing the interpolation and cannot be used to make additional measurements. This measurement dead time implies that a single instrument cannot be used to measure several times or time intervals in rapid succession. For example, a single such instrument would not be able to measure the times of several radar echoes, from several different objects, received in rapid succession.

A technique which is sometimes used in the laboratory to measure the time duration of a repetitive event with a time resolution of less than 1 nanosecond per count is to average a number of individual measurements. In a particular instance, several thousand or more measurements may be made to obtain a single average value. However, this averaging approach is not applicable to the measurement of time intervals which are changing or which occur as single or infrequent events. For example, the averaging approach generally cannot be used to measure the time of a radar echo from a moving object.

A simple technique for the digital measurement of a series of event times is to sample the state of a continuously running counter whenever an event which is to be measured occurs. However, this approach can lead to ambiguity and error problems. For example, when a simple binary counter is incremented from 0111 (decimal 7) to 1,000 (decimal 8), it will pass through the intermediate states 0110 (decimal 6), 0100 (decimal 4), and 0000 (decimal 0) as the count signal is transmitted from one binary counter stage to another. The simple sampling of such a continuously running counter can thus give erroneous values. In many digital computer and control systems, it is desirable or necessary that each and every measured digital value be a valid value, accurately representing the measured time. It is possible to avoid this sampling error problem by using an individual counter for each time or event which is to be separately measured. However, this approach becomes less practical as the number of times or events to be separately measured increases.

SUMMARY OF THE INVENTION

The subject invention takes advantage of the properties of cyclic variables, such as angles, whose values effectively repeat in a generally cyclic manner. An angle variable can be measured relative to a convenient scale, such as 0° to 360°, representing one complete turn. Given a particular input angle value, two times, four times, or any number times the input angle can still be represented on the same 0° to 360° scale. For example, if the input angle value is 200° and we wish to multiply it by 2, the result is 400°. This 400° value is also equal to 40° and, hence, still on the original 0° to 360° scale. In the subject invention, a time is measured relative to a number of cyclic time scales of different resolutions. These cyclic time scales are generated, for example, by the periodic signal outputs of a number of synchronized oscillators, counters or other signal sources and/or by a process of angle multiplication.

In a particular form of the invention, a number of oscillators or signal sources are synchronized so that their output frequencies are related exactly as successive powers of two, and their output signals are maintained in a predetermined phase relationship. For example, a set of oscillators may be arranged to generate signals of 1 MHz, 2 MHz, 4 MHz, 8 MHz, etc. Sample-and-hold circuits are used to sample and hold the oscillator signal values at the time of a pulse signal whose time is to be measured. For each frequency, one or more signals at one or more relative phases are generated and sampled. Binary (2-state) signals are generated whose values correspond to the polarities of the sampled oscillator signal values. These binary signals are a two-phase, Gray or other intermediate code representation of the desired digital number. The intermediate code binary signals are connected to simple logical circuits which resolve any ambiguities and generate the desired digital number in a normal binary or other desired form.

This generated number is a digital measure of the time of occurrence of the pulse which initiated the sampling operation. Time intervals may be measured by two such sampling operations and a subtraction of the two resulting digital values.

A general object of the subject invention is to provide a novel system for digital time measurement.

A further object is to provide means for digital time measurement with finer time resolutions and/or accuracies than possible with simple counting or other techniques.

A further object is to provide means for the digital measurement of several times or time intervals in rapid succession.

A further object is to provide digital time measurement data in an unambiguous form suitable for input to a digital computer system.

BRIEF DESCRIPTION OF THE DRAWINGS

FIGS. 4A through 4K are graphical illustrations of certain logical signals within the system of FIG. 1, plotted as functions of the time being measured;

FIG. 5 is a diagrammatic illustration of a second form of the invention showing the measurement of time intervals;

FIGS. 8A through 8H are graphical illustrations of certain logical signals within the system of FIG. 6, plotted as functions of the time being measured;

FIG. 9 is a diagrammatic illustration of a fourth form of the invention showing digital time measurement resulting in a 5-bit binary number, the use of frequency multipliers and the use of a combination of two-phase and Gray intermediate codes for the resolution of ambiguities;

FIG. 17 is a diagrammatic illustration of an eighth form of the invention showing digital time measurement resulting in a 4-bit binary number, the use of binary counter elements for the generation of multiple frequency timing signals and the use of an intermediate two-phase code for the resolution of ambiguities;

FIGS. 18A through 18M, are graphical illustrations of certain logical signals within the system of FIG. 17, plotted as functions of time and of the time being measured;

FIGS. 20A through 20K are graphical illustrations of certain logical signals within the system of FIG. 19, plotted as functions of time and of the time being measured;

DESCRIPTION OF THE PREFERRED EMBODIMENTS

Figure 1:
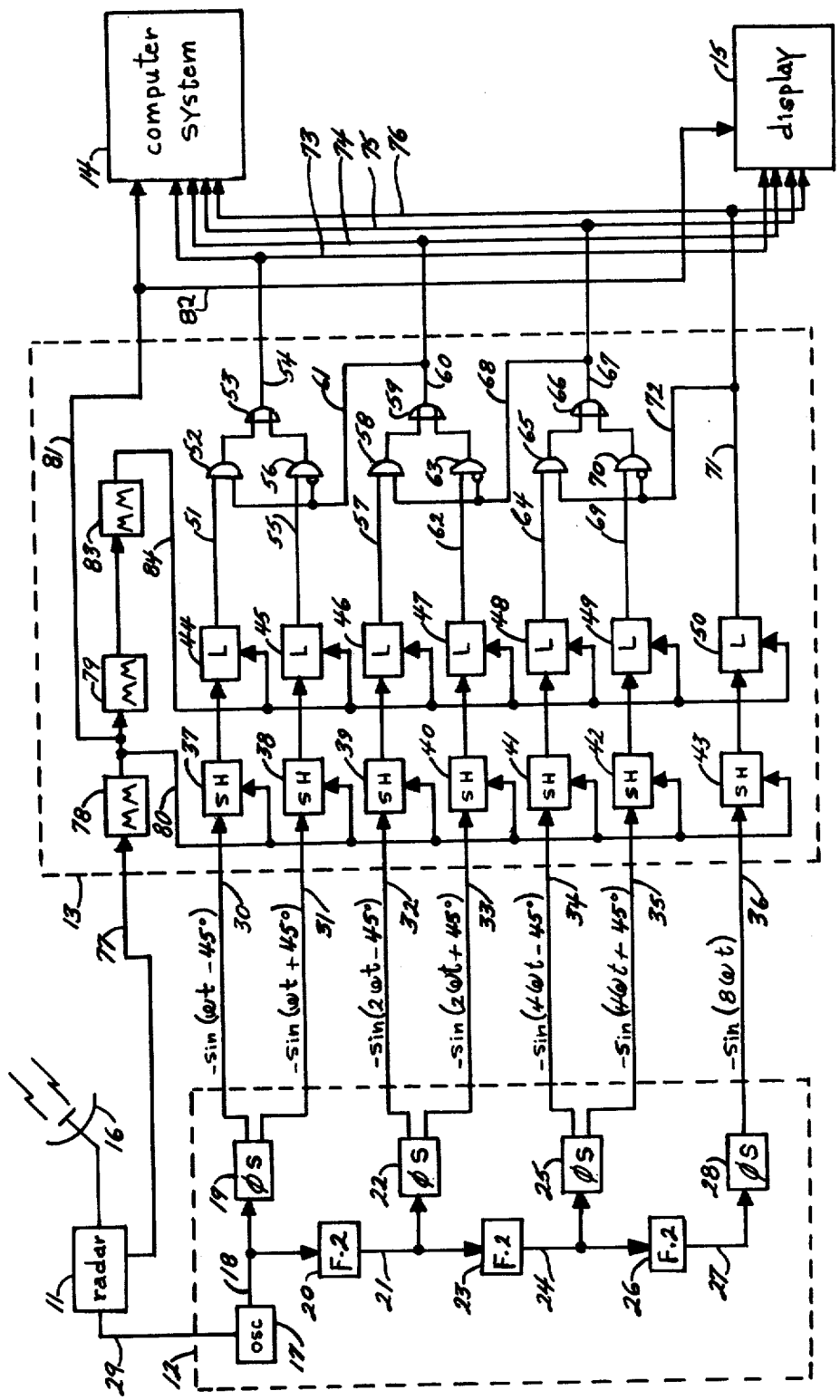
FIG. 1 is a diagrammatic illustration of a first form of the invention showing digital time measurement resulting in a 4-bit binary number, the use of frequency multipliers and the use of an intermediate two-phase code for the resolution of ambiguities.

FIG. 1 is a diagrammatic illustration of a first form of the invention showing digital time measurement resulting in a 4-bit binary number, the use of frequency multipliers and the use of an intermediate two-phase code for the resolution of ambiguities. FIG. 1 includes a radar system 11, an oscillator section 12, a sampling section 13, a digital computer system 14 and a digital display 15. Radar system 11 is connected to a radar antenna 16. Within oscillator section 12, oscillator 17 is connected via line 18 to the input of a conventional phase shift circuit 19 and to the input of a conventional frequency doubler circuit 20. For convenience, phase shift, frequency doubler and frequency multiplier circuits will be referred to simply as phase shifts, frequency doublers and frequency multipliers. The output of frequency doubler 20 is connected via line 21 to the input of phase shift 22 and to the input of frequency doubler 23. The output of frequency doubler 23 is connected via line 24 to the input of phase shift 25 and to the input of frequency doubler 26. The output of frequency doubler 26 is connected via line 27 to the input of phase shift 28. Phase shifts 19, 22 and 25 each provide two output signals which are 90° apart in phase. Oscillator 17 is connected via line 29 to radar system 11. The two outputs of phase shift 19 are connected to lines 30 and 31. Similarly, the two outputs of phase shift 22 are connected to lines 32 and 33, the two outputs of phase shift 25 are connected to lines 34 and 35, and the output of phase shift 28 is connected to line 36. Within sampling section 13, lines 30, 31, 32, 33, 34, 35 and 36 are connected to the signal inputs of conventional sample-and-hold elements 37, 38, 39, 40, 41, 42 and 43, respectively, whose outputs are connected to the signal inputs of conventional latches 44, 45, 46, 47, 48, 49 and 50, respectively. The output of latch 44 is connected via line 51 to a first input of AND gate 52, whose output is connected to a first input of OR gate 53. The output of OR gate 53 is connected to line 54. The output of latch 45 is connected via line 55 to a first input of AND gate 56, whose output is connected to a second input of OR gate 53. The output of latch 46 is connected via line 57 to a first input of AND gate 58, whose output is connected to a first input of OR gate 59. The output of OR gate 59 is connected to line 60 and, via line 61, to second inputs of AND gates 52 and 56. The second input of AND gate 56 is an inverted input indicated by the circle at the input point. Other inverted inputs and outputs are similarly indicated in the drawings. The output of latch 47 is connected via line 62 to a first input of AND gate 63, whose output is connected to a second input of OR gate 59. The output of latch 48 is connected via line 64 to a first input of AND gate 65, whose output is connected to a first input of OR gate 66. The output of OR gate 66 is connected to line 67 and, via line 68, to second inputs of AND gates 58 and 63. The output of latch 49 is connected via line 69 to a first input of AND gate 70, whose output is connected to a second input of OR gate 66. The output of latch 50 is connected to line 71 and, via line 72, to second inputs of AND gates 65 and 70. The signal outputs of sampling section 13 on lines 54, 60, 67 and 71 are connected via lines 73, 74, 75 and 76, respectively, to signal inputs of digital computer system 14 and digital display 15. Radar system 11 is connected via line 77 to the input of monostable multivibrator 78. The output of monostable multivibrator 78 is connected to the input of monostable multivibrator 79, via line 80 to the control inputs of sample-and-hold elements 37, 38, 39, 40, 41, 42 and 43, via line 81 to a control signal input of digital computer system 14 and via line 82 to a control signal input of digital display 15. The output of monostable multivibrator 79 is connected to the input of monostable multivibrator 83, whose output is connected via line 84 to the control inputs of latches 44, 45, 46, 47, 48, 49 and 50.

Radar system 11 is a source of a pulse signal on line 77 whose time is to be measured. The line 77 signal may correspond, for example, to the time of reception of a reflected radar signal from an object whose echo time and corresponding distance are to be measured. Oscillator 17 is a source of a periodic signal at a frequency compatible with the desired time measurement scale and resolution. As an example, the system of FIG. 1 can be used to digitally measure the time of the line 77 signal on a scale of 0 to 15 microseconds, with a resolution of 1 microsecond per digital step. In this case, the frequency of the line 18 signal would be one cycle per 16 microseconds or 1/16 MHz. Frequency doublers 20, 23 and 26 generate signals on lines 21, 24 and 27, respectively, with frequencies of 2, 4 and 8 times the frequency of the line 18 signal.

The line 18 signal may be expressed as $-\sin(\omega t)$, where $\omega$ is the angular frequency. Phase shifts 19, 22, 25 and 28 generate signals corresponding to $-\sin(\omega t-45°)$, $-\sin(\omega t+45°)$, $-\sin(2\omega t-45°)$, $-\sin(2\omega t+45°)$, $-\sin(4\omega t-45°)$, $-\sin(4\omega t+45°)$ and $-\sin(8\omega t)$ on lines 30, 31, 32, 33, 34, 35 and 36, respectively. AT the time of the line 77 signal whose time is to be measured, the line 30 through 36 signals are sampled by sampling section 13 and converted into a 4-bit binary number on lines 54, 60, 67 and 71. This 4-bit binary number is transmitted to computer system 14 and to display 15. A control signal on line 81 indicates the occurrence of a signal whose time is measured, and the subsequent availability of valid data.

As will be shown later, the relative phases of the line 30 through 36 signals need not be maintained with great precision. The line 36 signal is used as a synchronizing signal for the ambiguity resolution process. Moderate errors of the phases of the line 30 through 35 signals, relative to the line 36 signals, will not affect the measured digital values.

Sample-and-hold elements 37 through 43 are used to sample and hold the values of the line 30 through 36 signals under the control of the line 80 control signal. A high or positive signal on line 80 will cause the signal output of each of sample-and-hold elements 37 through 43 to follow the input signal thereto. A low or ground signal on line 80 will cause sample-and-hold elements 37 through 43 to retain the respective input signal values corresponding to those at the last instant that the line 80 signal was high, and to ignore further changes in the input signals.

Analog sample-and-hold devices are well known circuit elements and frequently used, for example, in various types of signal measuring devices. Sample-and-hold elements of several types are commercially available as circuit modules from a number of sources. Particular sample-and-hold elements may be designed and constructed to meet particular requirements. A typical analog sample-and-hold element will include an analog switch, which may be a FET (field effect transistor) or diode switch, and a signal storage capacitor. Amplifiers are frequently used to reduce the loading effects of the signal storage capacitor. Active and/or passive delay elements may be employed in the switch control signal path(s) to allow precise control of the effective time of signal sampling. In operation, the analog switch of such a sample-and-hold element is closed for some period of time so that the signal on the signal storage capacitor will approach and become substantially equal to the input signal. The analog switch is then opened and the signal storage capacitor will retain the signal value at the instant that the switch was opened. One of the limitations of typical sample-and-hold elements is that the output signal will tend to drift with time after the sampling operation. However, sample-and-hold elements are typically used to hold an analog signal value for only a short period of time, such as a few microseconds to a few hundred microseconds, so such drifting is usually of little consequence.

The outputs of sample-and-hold elements 37 through 43 are connected to the signal inputs of latches 44 through 50, whose outputs are logic level signals with values of zero (low) or one (high) in response to low or high values of the signal inputs at the time of sampling. Latches 44 through 50 are controlled by the line 84 signal such that a high or positive signal on line 84 will cause the sample-and-hold element 37 through 43 output signals to be accepted by latches 44 through 50. A low or ground signal on line 84 will cause latches 44 through 50 to retain the signal values corresponding to those at the last instant that the line 84 signal was high, and to ignore further changes in the sample-and-hold element 37 through 43 output signals. A latch circuit typically consists of a flip-flop circuit plus some control and gating circuits. Latch circuits of this type are well known logic circuit elements and are available, for example, as standard 7,400 series TTL integrated circuit devices.

In the system of FIG. 1, the signal on line 30 is sampled by sample-and-hold element 37. The output of sample-and-hold element 37 is then sampled by latch 44, which retains a logic level value corresponding to the polarity of the line 30 signal at the time of sampling by sample-and-hold element 37. Analog sample-and-hold elements can be constructed with a sampling time precision which is greater than that of many types of latch circuits. The cooperative sampling of the line 30 signal by the combination of sample-and-hold element 37 and latch 44 results in the sampling of the polarity of the line 30 signal with the time precision provided by sample-and-hold element 37, and the retention of the sampled polarity value indefinitely, without drift, by latch 44. The other combinations of sample-and-hold and latch elements in sampling section 13 operate together in a similar cooperative manner. The result is that the signals on lines 51, 55, 57, 62, 64, 69 and 71 will correspond to the polarities of the signals on lines 30 through 36 at the time of sampling by sample-and-hold elements 37 through 43.

Depending on the characteristics of latches 44 through 50, it may be necessary to limit the amplitudes of the output signals of sample-and-hold elements 37 through 43. Since only the polarities of the sampled signals need be retained, such amplitude limiting need not introduce any error. Amplitude limiting may be accomplished, for example, by incorporating an output stage in each of sample-and-hold elements 37 through 43 which generates a logic level signal corresponding to the polarity of the sampled signal. Such output stages may be generally along the lines of the output stages of the amplifier circuits of FIGS. 13, 14 and 15.

The network of logical gates between latches 44 through 50 and output lines 54, 60, 67 and 71 resolves any ambiguities and generates a four-bit binary number on those lines. These gates may be, for example, standard 7,400 series TTL integrated circuit devices. The digital number is transmitted to computer system 14 and to digital display 15. The most significant bit signal is on line 54 and the least significant bit signal is on line 71. Gates such as 56, 63 and 70 which have one inverted input may be, for example, standard AND or NOR gates with one input line connected through an inverter. The operation of this gate network and the digital time measurement process will be described subsequently in greater detail.

Monostable multivibrators 78, 79 and 83 are circuit elements which generate a pulse of a predetermined duration when triggered by an input signal transition, from one logical value to another, in a predetermined direction. A number of different types of monostable multivibrators are available as integrated circuit devices, which are compatible with standard 7,400 series TTL integrated circuit devices and with other types of logic circuit devices.

Figure 2A:
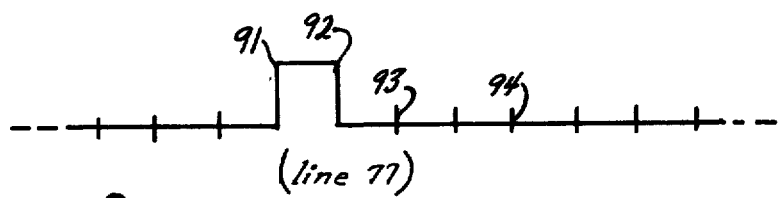
FIGS. 2A through 2C are graphical illustrations showing the relative timing of certain control signals and operations in the system of FIG. 1.
Figure 2B:
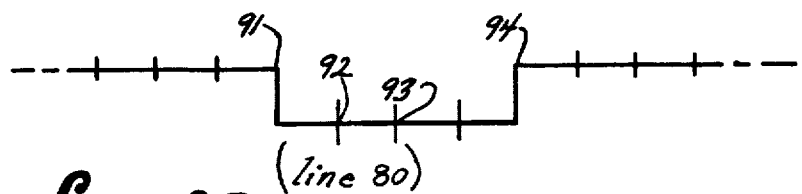
Figure 2C:
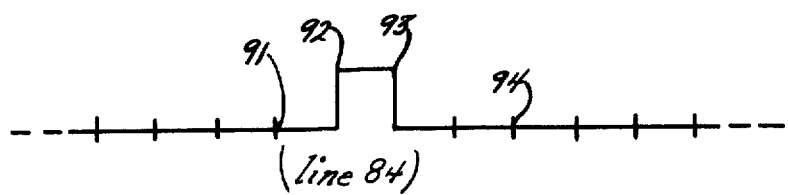

FIGS. 2A through 2C are graphical illustrations showing the relative timing of certain control signals and operations in the system of FIG. 1. FIG. 2A is a plot of the line 77 signal, the signal from radar system 11, whose time is to be measured. FIG. 2B is a plot of the line 80 signal, the output of the monostable multivibrator 78. FIG. 2C is a plot of the line 84 signal, the output of monostable multivibrator 83. Times 91, 92, 93 and 94 are identified so that they may be subsequently referenced.

Monostable multivibrator 78 is connected so that it will be triggered by a positive or high going transition of the line 77 signal, and so that its output is a normally positive or high signal which will become low for a predetermined interval when it is triggered. The time which is to be measured is the leading or high going edge of the FIG. 2A, line 77 pulse signal. This time is identified as time 91 in FIGS. 2A-2C. The time 91 high going edge of the line 77 signal triggers monostable multivibrator 78 so that its output immediately becomes low and remains low through time 94, as shown in FIG. 2B. Monostable multivibrator 79 is also triggered at time 91 by the FIG. 2B, line 80 signal, and generates a pulse which lasts until time 92. The end of the monostable multivibrator 79 pulse, at time 92, triggers monostable multivibrator 83 which generates a short pulse lasting from time 92 to time 93 as shown in FIG. 2C.

To further examine the operation of the system of FIG. 1, consider the state of the system before time 91 and well after the occurrence of any previous line 77 signals. The FIG. 2B, line 80 signal will be high, so that sample-and-hold elements 37 through 43 will be following their respective input signals. However, the FIG. 2C, line 84 signal will be low so that latches 44 through 50 will not be responding to the outputs of sample-andhold elements 37 through 43, but will retain values corresponding to the previous time measurement. The low transition of the FIG. 2B, line 80 signal at time 91 will cause sample-and-hold elements 37 through 43 to retain their time 91 signal values for a short time. The output signals of sample-and-hold elements 37 through 43 are then sampled by latches 44 through 50 between times 92 and 93, under control of the FIG. 2C, line 84 signal. The FIG. 2B, line 80 signal is also transmitted to computer system 14 and display 15. For computer system 14 and display 15, the low value of the line 80 signal between times 91 and 94 indicates that a digital measurement is in process. The return of the line 80 signal to a high value at time 94 indicates that a digital measurement has been completed and that a valid digital measurement signal is available on lines 54, 60, 67 and 71.

The time interval 93–94, between the end of the sampling interval of latches 44 through 50 and the data available indication to computer system 14 and display 15, is to allow sufficient time for signals to propagate through the logical gate network between latches 44 through 50 and signal output lines 54, 60, 67 and 71. The time interval 91–92, between the low going transition of the FIG. 2B, line 80 data available signal to computer system 14 and display 15, and the beginning of the sampling operation of latches 44 through 50 under the control of the FIG. 2C, line 84 signal, is to insure that the line 54, 60, 67 and 71 data output signals will remain valid until after the low going transition of the data available signal. In some instances, this delay will not be required. In that case, monostable multivibrator 79 may be deleted and the output of monostable multivibrator 78 connected directly to the input of monostable multivibrator 83.

FIGS. 3A through 3G and 4A through 4K illustrate the digital time measurement process of the system of FIG. 1 in greater detail. FIGS. 3A, 3B, 3C, 3D, 3E, 3F and 3G are plots of the sine wave signals on lines 30, 31, 32, 33, 34, 35 and 36, respectively, plotted as functions of time for one cycle of the line 18 oscillator 17 output signal. The value of $\theta$ is the relative angular value of the line 18 signal, and also the relative time which is to be digitally measured. FIGS. 4A, 4B, 4C, 4D, 4E, 4F, 4G, 4H, 4I, 4J and 4K are plots of the signals on lines 51, 55, 57, 62, 64, 69, 71, 54, 60, 67 and 71, respectively, plotted as functions of the relative time of the line 77 signal.

FIGS. 3A–3G are plotted as functions of time, in terms of the angular value of the line 18 signal, over a 0° to 360° range. FIGS. 4A–4K are plotted as functions of the relative time of the line 77 signal, in terms of the angular value of the line 18 signal, over a 0° to 360° range. The 0° to 360° range is specifically marked on FIGS. 3A, 4A and 4H. The time scale in each figure is also divided into 16 segments of 22.5° each. The individual segments are identified as segments 0 through 15, and are specifically marked on FIGS. 3B, 4B and 4I. The signals shown in FIGS. 4A–4K are logic level signals which are normally either high or low and, in general, not of an intermediate value. With standard 7,400 series TTL integrated circuit logic devices, a high signal will typically be in the range of 3 to 5 volts positive, and a low signal will typically be in the range of 0 to 0.5 volts positive.

Figure 3A:
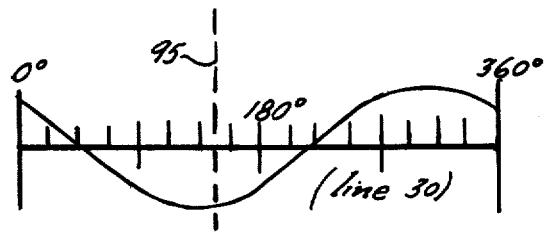
FIGS. 3A through 3G are graphical illustrations of certain sine wave signals within the system of FIG. 1, plotted as functions of time.
Figure 3B:
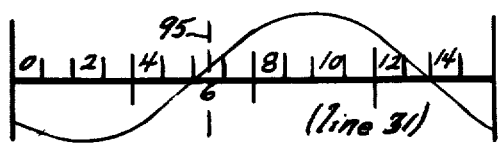
Figure 3C:
Figure 3D:
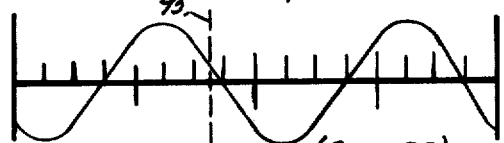
Figure 3E:
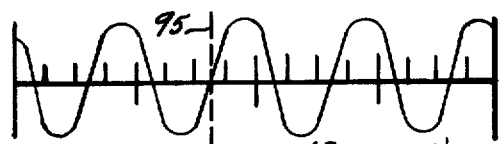
Figure 3F:
Figure 3G:

FIG. 3A is a plot of the function $-\sin(\theta-45°)$, the signal on line 30 of FIG. 1. FIG. 4A is a plot of the signal on line 51, the output of latch 44, plotted as a function of the value of $\theta$ at the time of the most recent line 77 signal. The value of the function plotted in FIG. 4A corresponds to the polarity of the function plotted in FIG. 3A, although the horizontal scales of the two figures do not have exactly the same significance. That is, the FIG. 3A, line 30 signal will continually alternate as a periodic function of time while the FIG. 4A, line 51 signal represents the polarity of the line 30 signal at the time of the most recent line 77 signal. In a similar manner, the values of the plots of FIGS. 4B, 4C, 4D, 4E, 4F and 4G correspond to the polarities of the functions plotted in FIGS. 3B, 3C, 3D, 3E, 3F and 3G, respectively. FIG. 4H is a plot of the line 54 signal, the most significant bit of the 4-bit binary number resulting from the digital time measurement. Similarly, FIGS. 4I, 4J and 4K are plots of the line 60, line 67 and line 71 signals, the three less significant bits of the binary number.

Now consider the opeation of the network of logical gates between latches 44 through 50 and lines 54, 60, 67 and 71. The output of latch 50 is connected directly to data output line 71, so that the plots of FIGS. 4G and 4K are identical. The line 71 signal plotted in FIGS. 4G and 4K is the least significant bit of the four-bit binary number resulting from the digital time measurement. Line 72 is connected to a normal or non-inverted input of AND gate 65 and to an inverted input of AND gate 70. The combination of AND gates 65 and 70, and OR gate 66, serves as a switch which transmits either the line 64 or the line 69 signal to line 67, depending on the value of the line 71 signal. If the line 71 signal is low, the line 69 signal will be transmitted to line 67. If the line 71 signal is high, the line 64 signal will be transmitted to line 67. Similarly, the line 67 signal determines which of the line 57 or line 61 signals will be transmitted to line 60, and the line 60 signal determines which of the line 51 or line 55 signals will be transmitted to line 54.

As an example, consider the digital measurement of a time of slightly more than 6/16 of a full cycle as indicated by dotted line 95 in FIGS. 3A-3G and 4A-4K. The polarity of the line 30 signal at that time will be negative, as indicated by FIG. 3A. The polarities of the line 31 through 36 signals at that time will be as shown in FIGS. 3B through 3G. The line 51, latch 44 output signal will be low, as shown in FIG. 4A, corresponding to the sampled negative value of the line 30 signal. The latch output signals on lines 55, 57, 62, 64, 69 and 71 will be as shown in FIGS. 4B through 4G. The negative value of the $-\sin(8\theta)$ signal on line 36 at the measurement time will cause the line 71 signal to be low, and the $2^0$ or least significant bit of the binary number to be a 0. The low value of the line 71 signal causes the selection of the line 69 signal for transmission to line 67, and a high or one value for the $2^1$ or 2 bit of the binary number. The high value of the line 67 signal causes the selection of the line 57 signal for transmission to line 60, and a high or one value for the $2^2$ or 4 bit of the binary number. The high value of the line 60 signal causes the selection of the line 51 signal for transmission to line 54, and a low or 0 value for the $2^3$ 8 bit of the binary number.

The digital number resulting from the measurement of the time represented by dotted line 95 is thus binary 0110 or decimal 6. As may be seen in FIGS. 3B, 4B and 4I, dotted line 95 is in time segment number 6. Thus, the system of FIG. 1 has performed a digital measurement of the time represented by dotted line 95. As shown in FIGS. 3A-3G and 4A-4K, the system of FIG. 1 will generate digital numbers from 0 to 15 for line 77 signal times over a range of 0° to 360°.

The operation of the system of FIG. 1 is such that whenever the —sin(4θ—45°) line 34 signal is near zero at the measurement time, and its sensed polarity and the value of the line 64 signal are perhaps incorrect, the line 71 signal will be low and the line 69 signal will be selected for transmission to line 67. Whenever the —sin(4θ+45°) line 35 signal is near zero at the measurement time, and its sensed polarity and the value of the line 69 signal are perhaps incorrect, the line 71 signal will be high and the line 64 signal will be selected for transmission to line 67. Similarly, the lines and signals for the more significant bits of the binary number will be selected for transmission to the corresponding data output lines only when they are well away from points of uncertainty at the measurement time. The selection of a signal for any particular bit, except the least significant bit, is controlled by the value of the adjacent less significant bit. This maintains an exact synchronization of the various individual bit output signals, and avoids erroneous intermediate or transition values which might otherwise occur when the measured time was at or near a boundary point between two adjacent digital values. Hence, moderate phase angle errors of the line 30 through 35 signals will not affect the resulting digital values, as the generation of the output binary number is synchronized with the sampled polarity of the line 36 signal.

Radar system 11 and oscillator 17 are synchronized via the line 29 connection. This synchronization is such that the transmission of a radar signal by radar system 11 is at a time corresponding to a 0° or other predetermined relative time value of the line 18 signal. This synchronization may be in either direction. That is, oscillator 17 may be synchonized so as to follow the repetition rate of radar system 11, or radar system 11 may be synchronized so as to follow the frequency and phase of oscillator 17. In either case, the relative time scale of the line 18 signal is synchronized to the operation of radar system 11, and the digital measurement of a time relative to the line 18 signal will provide a measure of the time interval between the transmission and reception of a signal by radar system 11. This synchronization process allows the measurement of a time interval with the measurement of only one time value. In some applications, it may be desirable to synchronize the signals generated by a timing oscillator section with the end of a time interval to be measured, or with an intermediate one of a group of time signals.

In some instances, this synchronization process may not be practical or desired. FIG. 5 is an illustration of a second form of the invention which does not require such a synchronization process.

FIG. 5 is a diagrammatic illustration of a second form of the invention showing the measurement of time intervals. In FIG. 5, an oscillator section 96 is connected via a set of seven lines indicated generally as 97 to oscillator signal inputs of a first sampling section 98 and a second sampling section 99. A signal source 100 is connected via line 101 to a time signal input of sampling section 98 and via line 102 to a time signal input of sampling section 99. The data signal outputs of sampling section 98 are connected via a set of four lines indicated generally as 103 to the signal inputs of a first digital display 104 and to a first set of four signal inputs of a digital computer system 105. A control signal output of sampling section 98 is connected via line 106 to a first control signal input of digital computer system 105. The data signal outputs of sampling section 99 are connected via a set of four lines indicated generally as 107 to the signal inputs of a second digital display 108 and to a second set of four signal inputs of digital computer system 105. A control signal output of sampling section 99 is connected via line 109 to a second control signal input of computer system 105.

In the system of FIG. 5, signal source 100 is a source of two pulse signals on lines 101 and 102. An object of the system of FIG. 5 is to measure the time interval between the line 101 and line 102 signals. Sampling section 98 measures the time of the line 101 signal. Sampling section 99 similarly measures the time of the line 102 signal. The lines 103 data output signals are a measure of the time of the line 101 signal, and the lines 107 data output signals are a measure of the time of the line 102 signal. The line 106 control signal indicates the occurrence of a line 101 signal, the completion of a time measurement and the availability of valid data on lines 103. Similarly, the line 109 control signal indicates the occurrence of a line 102 signal, the completion of a time measurement and the availability of valid data on lines 107. The difference between the lines 103 and lines 107 digital values will correspond to the time interval between the line 101 and line 102 time signals. The measured times are displayed via displays 104 and 108, and are transmitted to computer system 105. Within computer system 105, the two times measured by sampling sections 98 and 99 may be subtracted to obtain the time interval between the line 101 and line 102 signals, and/or otherwise processed as desired.

The system of FIG. 5 may be implemented with elements and sections shown in FIG. 1 and/or in other systems shown in this disclosure. Oscillator section 96 may be, for example, of substantially the same form as oscillator section 12 of FIG. 1. Lines 30 through 36 would be connected to lines 97 of FIG. 5. Sampling section 98 of FIG. 5 may be of the form of sampling section 13 of FIG. 1. Lines 97 would be connected to the line 30 through 36 inputs of sampling section 13, and time signal line 101 would be connected to the line 77 input. The line 54, 60, 67 and 71 signal outputs would be connected to lines 103. Control signal output line 81 would be connected to line 106. Sampling section 99 may be similarly of the form of sampling section 13. Lines 97 would be connected to the line 30 through 36 inputs, and time signal line 102 would be connected to the line 77 signal input. Signal output lines 54, 60, 67 and 71 would be connected to lines 107, and control signal output line 81 would be connected to line 109.

Figure 6:
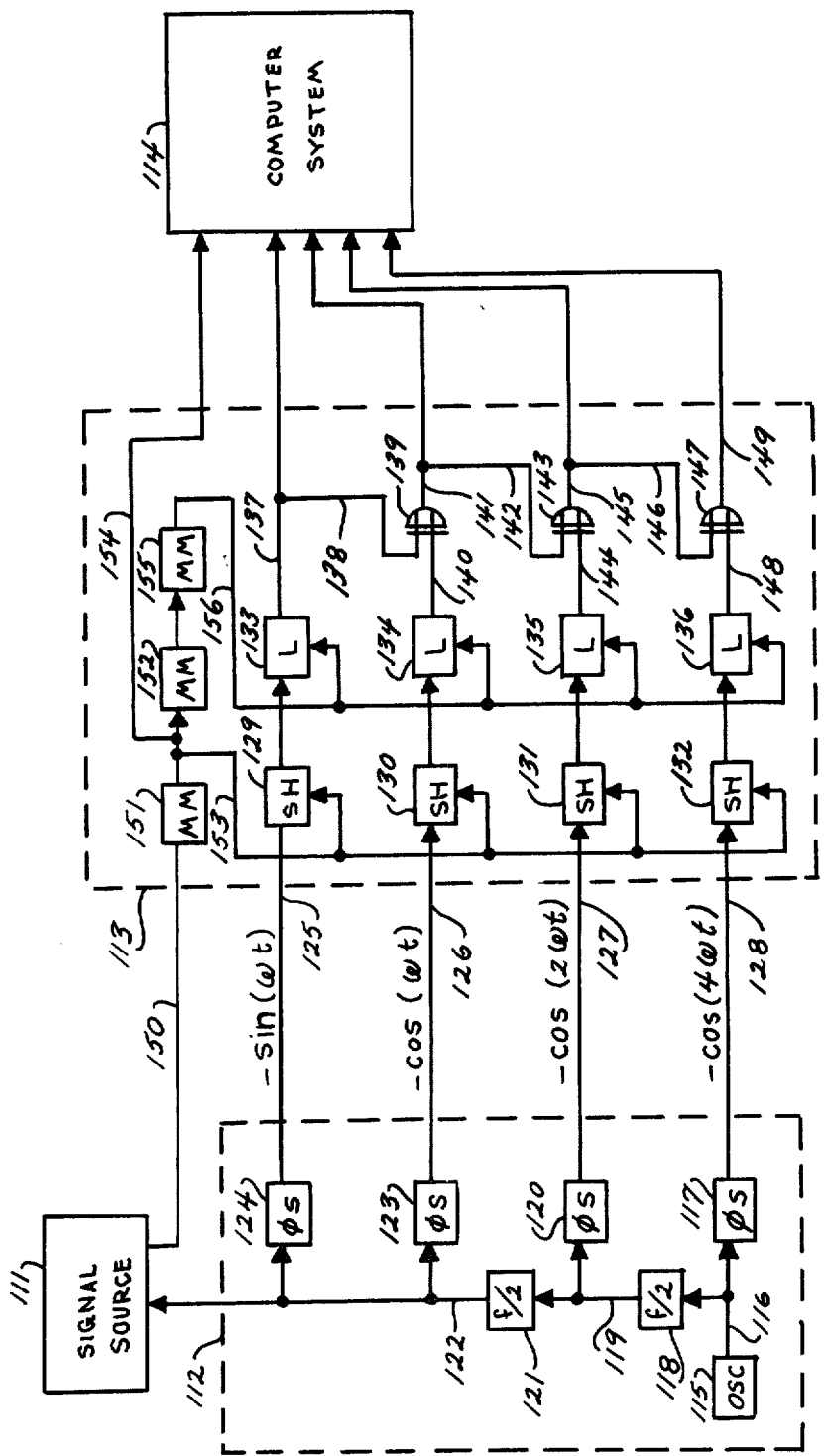
FIG. 6 is a diagrammatic illustration of a third form of the invention showing digital time measurement resulting in a 4-bit binary number, the use of frequency dividers and the use of an intermediate Gray code for the resolution of ambiguities.

FIG. 6 is a diagrammatic illustration of a third form of the invention showing digital time measurement resulting in a 4-bit binary number, the use of frequency dividers and the use of an intermediate Gray code for the resolution of ambiguities. FIG. 6 includes a signal source 111, an oscillator section 112, a sampling section 113 and a digital computer system 114. Within oscillator section 112, the output of oscillator 115 is connected via line 116 to the input of phase shift 117 and to the input of frequency divider 118. The output of frequency divider 118 is connected via line 119 to the input of phase shift 120 and to the input of frequency divider 121. The output of frequency divider 121 is connected via line 122 to the input of phase shift 123, to the input of phase shift 124 and to an input of signal source 111. The outputs of phase shifts 124, 123, 120 and 117 are connected to lines 125, 126, 127 and 128, respectively. Within sampling section 113, lines 125, 126, 127 and 128 are connected to the signal inputs of sample-and-hold elements 129, 130, 131 and 132, respectively, whose outputs are connected to the signal inputs of latches 133, 134, 135 and 136, respectively. The output of latch 133 is connected to line 137 and, via line 138, to a first input of EXCLUSIVE-OR gate 139. The output of latch 134 is connected via line 140 to a second input of EXCLUSIVE-OR gate 139. The output of EXCLUSIVE-OR gate 139 is connected to line 141 and, via line 142, to a first input of EXCLUSIVE-OR gate 143. The output of latch 135 is connected via line 144 to a second input of EXCLUSIVE-OR gate 143. The output of EXCLUSIVE-OR gate 143 is connected to line 145 and, via line 146, to a first input of EXCLUSIVE-OR gate 147. The output of latch 136 is connected via line 148 to a second input of EXCLUSIVE-OR gate 147. The output of EXCLUSIVE-OR gate 147 is connected to line 149. Lines 137, 141, 145 and 149 are connected to signal inputs of digital computer system 114. Signal source 111 is connected via line 150 to the input of monostable multivibrator 151. The output of monostable multivibrator 151 is connected to the input of monostable multivibrator 152, via line 153 to the control inputs of sample and hold elements 129, 130, 131 and 132, and via line 154 to a control signal input of computer system 114. The output of monostable multivibrator 152 is connected to the input of monostable multivibrator 155, whose output is connected via line 156 to the control inputs of latches 133, 134, 135 and 136.

Signal source 111 is a source of a pulse signal on line 150 whose time is to be measured. Signal source 111 may be, for example, of the form of radar system 11 of FIG. 1. The functions and operation of the system of FIG. 6 are generally similar to the functions and operation of the system of FIG. 1. The digital output signals on lines 137, 141, 145 and 149, the response of sampling section 113 to a pulse signal on line 150 and the generation of a control signal on line 154 are similar to the digital output signals on lines 54, 60, 67 and 71, the response of converter 13 to a pulse signal on line 77 and the generation of a control signal on line 81. The differences are primarily in the internal structures of oscillator section 112 and sampling section 113, the number of oscillator section output signals and in the manner in which possible ambiguities between adjacent digital values are resolved.

The method used for ambiguity resolution in the system of FIG. 1 may be described as a two-phase code system. Two oscillator section output signals of different phase are generated and sampled for each bit of the desired binary output number, except the least significant bit. In the system of FIG. 1, a total of seven logic level signals are generated for subsequent conversion into a four-bit binary number. An advantage of the two-phase code system of FIG. 1 is that it is not necessary to provide a particularly exact synchronization of the relative phases of the output signals of oscillator section 12 on lines 30 through 36. A disadvantage of the two-phase code system is that it requires the generation and sampling of a number of signals which is almost twice the number of bits in the resulting binary number.

The system of FIG. 6 shows an alternate method of ambiguity resolution which is based on the Gray binary code. An advantage of the Gray code system of FIG. 6 is that a smaller number of signals and a smaller number of circuit elements are required. A disadvantage of the Gray code system of FIG. 6 is that it is necessary to maintain a more exact synchronization of the relative phases of the output signals of oscillator section 112 on lines 125 through 128.

To illustrate a different oscillator section signal generation process, oscillator section 112 uses frequency dividers rather than frequency multipliers as in oscillator section 12 of FIG. 1. The output of oscillator 115 on line 116 is a signal at the highest frequency generated by oscillator section 112. Frequency dividers 118 and 121 are used to generate signals of one-half and one-fourth the line 116 signal frequency on lines 119 and 122, respectively. The frequency divider 121 output signal on line 122 is also connected to signal source 111 for synchronization purposes. In this case, because signal source 111 is not connected to oscillator 115, the synchronization is of signal source 111 to the line 122 signal. That is, oscillator section 112 sets the basic time scale of the system and signal source 111 adapts thereto.

The outputs of oscillator section 112 on lines 125, 126, 127 and 128 are signals of the form $-\sin(\omega t)$, $-\cos(\omega t)$, $-\cos(2\omega t)$ and $-\cos(4\omega t)$, respectively, where $4\omega$ is the angular frequency of the line 116 signal. The arrangement of monostable multivibrators 151, 152 and 155 is substantially the same as the arrangement of monostable multivibrators 78, 79 and 83 of FIG. 1. The operation of monostable multivibrators 151, 152 and 155 in response to a pulse signal on line 150 is in the general manner illustrated in FIGS. 2A–2C and described in connection with the system of FIG. 1. Sample-and-hold elements 129 through 132 are controlled by the line 153 control signal, and latches 133 through 136 are controlled by the line 156 control signal, in the general manner of the corresponding elements of FIG. 1. The network of logical gates between latches 133 through 136 and signal output lines 137, 141, 145 and 149 resolves any ambiguities and generates a fourbit binary number signal on those output lines. This digital number signal is transmitted to digital computer system 114. The most significant bit signal is on line 137 and the least significant bit signal is on line 149. The latches and logical gates in the system of FIG. 6 may be, for example, standard 7400 series TTL integrated circuit devices.

FIGS. 7A through 7D and 8A through 8H illustrate the digital time measurement process of the system of FIG. 6 in greater detail. FIGS. 7A, 7B, 7C and 7D are plots of the signals on lines 125, 126, 127 and 128, respectively, of FIG. 6. FIGS. 8A, 8B, 8C, 8D, 8E, 8F, 8G and 8H are plots of signals on lines 137, 140, 144, 148, 137, 141, 145 and 149, respectively.

FIGS. 7A–7D are plotted as functions of time, in terms of the angular value of the line 125 signal, over a 0° to 360° range. FIGS. 8A–8H are plotted as functions of the time of the line 150 signal, in terms of the angular value of the line 125 signal, over a 0° to 360° range. The 0° to 360° range is specifically marked on FIGS. 7A, 8A and 8E. The time scale is also divided into 16 segments of 22.5° each. The individual segments are identified as segments 0 through 15, and are specifically marked on FIGS. 7B, 8B and 8F. The signals shown in FIGS. 8A-8H are logic level signals which are normally either high or low and, in general, not of an intermediate value.

Figure 7A:
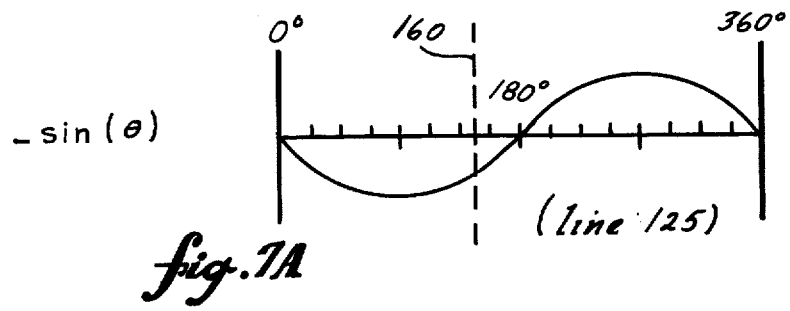
FIGS. 7A through 7D are graphical illustrations of certain sine wave signals within the system of FIG. 6, plotted as functions of time.

FIG. 7A is a plot of the function $-\sin(\theta)$, the signal on line 125 of FIG. 6, plotted as a function of time. FIG. 8A is a plot of the signal on line 137, the output of latch 133, plotted as a function of the value of $\theta$ at the time of the most recent line 150 signal. The value of the function plotted in FIG. 8A corresponds to the polarity of the function plotted in FIG. 7A although, as in the case of the system of FIG. 1 and the plots of FIGS. 3A-3G and 4A-4K, the horizontal scales of the two figures do not have exactly the same significance. In a similar manner, the values of the plots of FIGS. 8B, 8C and 8D correspond to the polarities of the functions plotted in FIGS. 7B, 7C and 7D, respectively. FIG. 8E is a plot of the line 137 signal, the most significant bit of the 4-bit binary number resulting from the digital time measurement. FIGS. 8F, 8G and 8H are plots of the line 141, 145 and 149 signals, the three less significant bits of the binary number. The line 137 signal is plotted in both FIGS. 8A and 8E as it is a part of the set of Gray code signals plotted in FIGS. 8A through 8D, and also a part of the set of normal binary code signals plotted in FIGS. 8E through 8H.

Now consider the operation of the network of logical gates between latches 133 through 136, and lines 137, 141, 145 and 149. The line 137 signal is the most significant bit of the output binary number. Lines 137 and 140 are connected to the two inputs of EXCLUSIVE-OR gate 139. Hence, the line 141 signal plotted in FIG. 8F is the result of an EXCLUSIVE-OR operation upon the line 137 and line 140 signals plotted in FIGS. 8A and 8B. In a similar manner, the line 145 and 149 signals plotted in FIGS. 8G and 8H are generated as the result of EXCLUSIVE-OR operations in accordance with the connections shown in FIG. 6.

As may be seen, the line 137, 140, 144 and 148 signals plotted in FIGS. 8A through 8D follow the typical pattern of a Gray code representation of a binary number over a range of 0 through 15. Similarly, the line 137, 141, 145 and 149 signals plotted in FIGS. 8E through 8H follow the typical pattern of a 4-bit normal binary number over a range of 0 through 15.

Figure 7B:
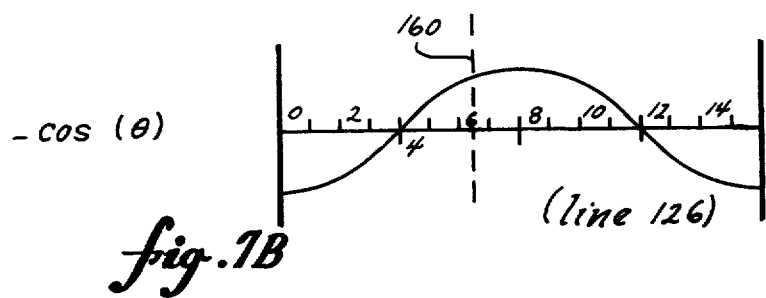
Figure 7C:
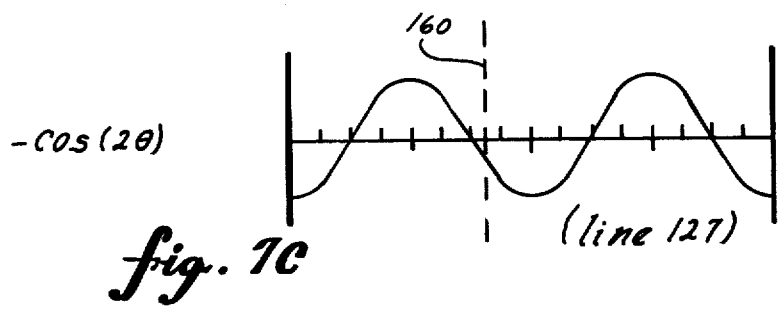
Figure 7D:
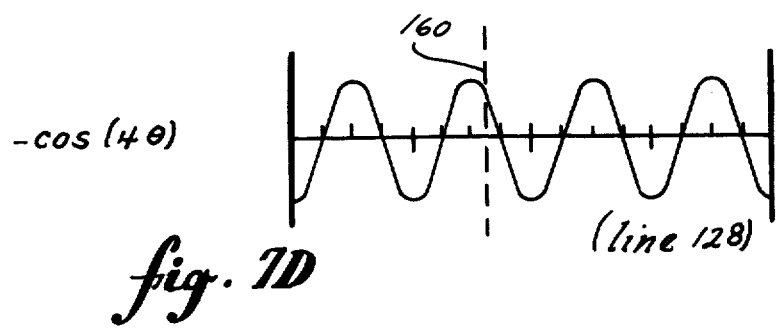

As an example, consider the measurement of a time of slightly more than 6/16 of full scale as indicated by dotted line 160 in FIGS. 7A-7D and 8A-8H. This is the same time value that was used as an example for the description of the operation of the system of FIG. 1. The polarity of the $-\sin(\theta)$ signal sampled by sample-and-hold element 129 will be negative as indicated by FIG. 7A. The polarities of the signals sampled by sample-and-hold elements 130, 131 and 132 will be as shown in FIGS. 7B, 7C and 7D, respectively. The latch output signals on lines 137, 140, 144 and 148 will be as shown in FIGS. 8A, 8B, 8C and 8D, respectively.

The negative value of the $-\sin(\theta)$ signal at the time of sampling causes the line 137 signal to be low and the $2^3$ or most significant bit of the binary number to be 0. The low signal on line 137, the high signal on line 140 and the EXCLUSIVE-OR operation performed by EX-CLUSIVE-OR gate 139 cause the line 141 signal to be high as shown in FIG. 8F. This gives a high or one value for the $2^2$ or 4 bit of the binary number. The high value of the line 141 signal, the low value of the line 144 signal and the EXCLUSIVE-OR operation performed by EXCLUSIVE-OR gate 143 cause the line 145 signal to be high as shown in FIG. 8G. This gives a high or one value for the $2^1$ or two bit of the binary number. The high values of the line 145 and line 148 signals, and the EXCLUSIVE-OR operation performed by EXCLU-SIVE-OR gate 147, cause the line 149 signal to be low as shown in FIG. 8H. This gives a low or 0 value for the $2^0$ or least significant bit of the binary number.

The digital number resulting from the measurement of the time signal represented by dotted line 160 is binary 0110 or decimal 6. As may be seen in FIGS. 7B, 8B and 8F, dotted line 160 is in time segment 6. Thus, the system of FIG. 6 has performed a digital time measurement of the time signal represented by dotted line 160. As shown in FIGS. 7A-7D and 8A-8H, the system of FIG. 6 will generate digital numbers from 0 through 15 for time signals over a range of 0° through 360°, or one cycle of the line 125 signal.

In the two-phase code ambiguity resolution process as illustrated in the system of FIG. 1, the selection of a signal for each bit of the output binary number, except the least significant bit, is controlled by the value of the adjacent less significant bit. In the Gray code ambiguity resolution process as illustrated in the system of FIG. 6, the value of each bit of the resulting binary number, except the most significant bit, is controlled in part by the value of the adjacent more significant bit.

Although the system of FIG. 6 has the advantage of requiring fewer circuit elements than the system of FIG. 1, it is more subject to certain types of error and is, in general, less suitable for extension to a large number of bits and a correspondingly high time accuracy and/or resolution. However, as will be shown subsequently in FIG. 9, the general approach of the system of FIG. 6 can be useful in providing a moderate extension of the accuracy and/or resolution of a digital time measurement system constructed in accordance with the subject invention.

The nature of the Gray code and the operation of the system of FIG. 6 are such that only one of the four signals plotted in FIGS. 8A through 8D will change between any two adjacent digital values. Hence, if any one of the signals on lines 127 through 130 is near zero at the sampling time, and its sensed polarity and the value of the corresponding latch output signal are perhaps incorrect, it will at most cause an error of one in the resulting digital value. However, with the Gray code process, it is in general necessary that all of the logical signals, not just those associated with the least significant bit, be generated with a time accuracy and resolution corresponding to the desired accuracy and-/or resolution of the digital time measurement.

As an example, consider the effects of a one degree phase error in the generation of the $-\sin(\theta)$ signal on line 125, and a corresponding one degree error in the 180° transition point of the line 137 signal plotted in FIG. 8A. This will cause a one degree error in the transition point of the output binary number between digital time values 7 and 8. In the two-phase code system of FIG. 1, a moderate phase error in the generation of any oscillator section output signal, except the one associated with the least significant bit, will not cause an error in the transition points of the output digital time values.

FIG. 9 is a diagrammatic illustration of a fourth form of the invention showing digital time measurement resulting in a 5-bit binary number, the use of frequency multipliers and the use of a combination of two-phase and Gray intermediate codes for the resolution of ambiguities. FIG. 9 includes a signal source 161, an oscillator section 162, a sampling section 163 and a digital computer system 164. Within oscillator section 162, oscillator 165 is connected via line 166 to the input of phase shift 167, to the input of frequency doubler 168 and to a first input of summing circuit 169. The output of frequency doubler 168 is connected via line 170 to the input of phase shift 171, to the input of frequency doubler 172 and to a second input of summing circuit 169. The output of frequency doubler 172 is connected via line 173 to the input of phase shift 174, to the input of frequency doubler 175 and to a third input of summing circuit 169. The output of frequency doubler 175 is connected via line 176 to the input of phase shift 177 and to a fourth input of summing circuit 169. The output of summing circuit 169 is connected via line 178 to an input of signal source 161. The two outputs of phase shift 167 are connected to lines 179 and 180. Similarly, the two outputs of phase shift 171 are connected to lines 181 and 182, the two outputs of phase shift 174 are connected to lines 183 and 184, and the output of phase shift 177 is connected to line 185. Within sampling section 163, lines 179, 180, 181, 182, 183, 184 and 185 are connected to the signal inputs of conventional level detectors 186, 187, 188, 189, 190, 191 and 192, respectively, whose outputs are connected to the signal inputs of latches 193, 194, 195, 196, 197, 198 and 199, respectively. The output of latch 193 is connected via line 200 to a first input of AND gate 201, whose output is connected to a first input of OR gate 202. The output of OR gate 202 is connected to line 203. The output of latch 194 is connected via line 204 to a first input of AND gate 205, whose output is connected to a second input of OR gate 202. The output of latch 195 is connected via line 206 to a first input of AND gate 207, whose output is connected to a first input of OR gate 208. The output of OR gate 208 is connected to line 209 and, via line 210, to second inputs of AND gates 201 and 205. The output of latch 196 is connected via line 211 to a first input of AND gate 212, whose output is connected to a second input of OR gate 208. The output of latch 197 is connected to line 213, via line 214 to second inputs of AND gates 207 and 212, and via line 215 to a first input of EXCLUSIVE-OR gate 216. The output of latch 198 is connected via line 217 to a second input of EXCLUSIVE-OR gate 216. The output of EXCLUSIVE-OR gate 216 is connected to line 218 and, via line 219, to a first input of EXCLUSIVE-OR gate 220. The output of latch 199 is connected via line 221 to a second input of EXCLUSIVE-OR gate 220. The output of EXCLUSIVE-OR gate 220 is connected to line 222. Lines 203, 209, 213, 218 and 222 are connected to signal inputs of digital computer system 164. Signal source 161 is connected via line 223 to the input of monostable multivibrator 224. A first output of monostable multivibrator 224 is connected via line 225 to the input of monostable multivibrator 226. A second output of monostable multivibrator 224 is connected via line 227 to the control inputs of latches 193, 194, 195, 196, 197, 198 and 199. The output of monostable multivibrator 226 is connected to the input of monostable multivibrator 228, whose output is connected via line 229 to a control signal input of computer system 164.

The operation of the system of FIG. 9 generally resembles the operation of the systems of FIGS. 1 and 6. Signal source 161 is a source of a pulse signal on line 223 whose time is to be digitally measured. Signal source 161 may be, for example, of the form of radar system 11 of FIG. 1. Sampling section 163 generates a 5-bit binary number signal on lines 203, 209, 213, 218 and 222. The most significant bit signal is on line 203 and the least significant bit signal is on line 222. This five-bit binary number signal is connected to computer system 164. Level detectors 186 through 192 generate logic level output signals whose values correspond to the polarities of the analog input signals. A low, or high, logic level output signal corresponds to a negative, or positive, input signal polarity, respectively. Level detectors of this general type are well known devices and are commercially available as integrated circuit devices compatible with TTL and other logic device families. Latches 193 through 199, and gates 201, 202, 205, 207, 208, 212, 216 and 220 may be, for example, standard 7400 series TTL integrated circuit devices.

Comparing the circuit of FIG. 9 with the circuit of FIG. 1, the oscillator section 162 output signals generated on lines 179, 180, 181, 182 and 183, and the network of logical gates between latches 193 through 197 and signal output lines 203, 209 and 213, closely parallels the arrangement of the system of FIG. 1. Sampling section 163 of FIG. 9 uses substantially the same two-phase ambiguity resolution process of sampling section 13 of FIG. 1 to generate the three most significant bit signals on lines 203, 209 and 213. The oscillator section 162 output signals on lines 183, 184 and 185, and the network of EXCLUSIVE-OR gates 216 and 220 between latches 197, 198 and 199, and signal output lines 213, 218 and 222, closely parallels the arrangement of the system of FIG. 6. Sampling section 163 of FIG. 9 uses substantially the same Gray code ambiguity resolution process as sampling section 113 of FIG. 6 to generate the two least significant bit signals on lines 218 and 222.

Thus, the digital time measurement system of FIG. 9 takes advantage of the inherent accuracy of the two-phase code ambiguity resolution process shown in FIG. 1 to generate the most significant three bits of the output binary number, and takes advantage of the relative circuit simplicity of the Gray code ambiguity resolution process shown in FIG. 6 for the generation of the two least significant bits of the output binary number. The result is a converter which provides the general overall accuracy of the two-phase code system of FIG. 1, without requiring quite as many circuit elements.

In addition to illustrating the combination two-phase and Gray code ambiguity resolution process, FIG. 9 also illustrates several other variations of the subject invention. The synchronizing signal which is transmitted from oscillator section 162 to signal source 161 via line 178 is generated by summing circuit 169 from a combination of signals of 1, 2, 4 and 8 times the frequency of the line 166 oscillator 165 output signal. It is well known that any physically possible waveform may be synthesized as a sum of a numbmer of components. For example, a periodic signal with an arbitrary waveform and a frequency of F cycles per second may be synthesized as a Fourier series. That is, it may be synthesized as a sum of sine and cosine signals with frequencies of F, 2F, 3F, 4F, 5F, etc. In oscillator section 162, summing circuit 169 is used to sum the signals of frequencies F, 2F, 4F and 8F on lines 166, 170, 173 and 176. Since not all of the frequency components which may be required for a Fourier synthesis of an arbitrary waveform are directly available within oscillator section 162, the waveforms which can be conveniently generated by summing circuit 169 are subject to some limitations. However, summing circuit 169 can be used to generate a synchronizaton signal waveform whose zero crossing points are more precisely defined than those of a simple sine wave signal. In general, summing circuit 169 is intended to illustrate that a synchronizing signal may be generated in a variety of ways.

Level detectors 186 through 192 of FIG. 9 are used in substantially the same place in the circuit as sample-and-hold elements 37 through 43 of FIG. 1. In FIG. 1, sample-and-hold elements 37 through 43 are used to sample the output signals of oscillator section 12 at a time which is to be measured. Latches 44 through 50 subsequently sample the outputs of sample-and-hold elements 37 through 43, and retain the corresponding logic level signal values indefinitely. In FIG. 9, latches 193 through 199 are employed for both the sampling of the oscillator section 162 output signals, and the retentinon of the sampled values for a period of time.

Level detectors 186 through 192 are used, if required, to connect the oscillator section 162 output signals on lines 179 through 185 to latches 193 through 199. A positive signal on line 179 at the time of sampling by latch 193 will result in a logical high or one signal on line 200. A negative signal on line 170 at the time of sampling will result in a low or zero signal on line 200. Level detectors 187 through 192 and latches 194 through 199 operate in a similar cooperative manner. In some instances, depending on the particular characteristics of latches 193 through 199, level detectors 186 through 192 may not be required. In that case, lines 179 through 185 would be connected directly to the signal inputs of latches 193 through 199.

FIG. 9 also illustrates the use of a network of monostable multivibrators for the control of the sampling process which differs from that shown in FIGS. 1 and 6. Monostable multivibrator 224 provides two complementary outputs on lines 225 and 227. The line 227 output is normally high, so that latches 193 through 199 will normally follow the output signals of level defectors 186 through 192. When a pulse signal whose time is to be measured is transmitted on line 223, monostable multivibrator 224 is triggered and generates a pulse with a duration of, for example, three time units. The line 227 control signal goes low for this period, so that latches 193 through 199 will retain the signal values corresponding to the outputs of level detectors 186 through 192 at approximately the time of the pulse signal on line 223. The normally low signal on line 225 goes high when the line 227 signal goes low. This high going signal on line 225 trigger monostable multivibrator 226 which has a period of approximately one time unit. Monostable multivibrator 228 is triggered at the end of the pulse signal output of monostable multivibrator 226, and provides a pulse signal on line 229 approximately one time unit long, which begins approximately one time unit after the line 223 time signal.

Thus, a pulse signal on line 223 triggers a measurement operation in which the outputs of oscillator section 162 are sampled, ambiguities are resolved in the network of logical gates within sampling section 163, and a valid digital signal is transmitted to computer system 164. A pulse on line 229 indicates that a measurement has been performed, and that a valid data signal is available for the duration of the line 229 pulse.

When the system of FIG. 1 has made a digital time measurement, it will transmit that digital value to computer system 14 for an indefinite period of time until the next measurement is made. The system of FIG. 9 transmits a valid digital measurement to computer system 164 only during the period of time which is indicated by the line 229 pulse signal. A reason for this is that to provide a precise sampling operation, simple sampling devices such as simple sample-and-hold elements and latches are often operated with their sampling connection normally closed, so as to normally follow their input signal. When a sampling operation is to be performed, the sampling connection is opened at the desired sampling instant. When a sampling device is used in this manner, it cannot be used to indefinitely retain a sampled value between measurements.

In the system of FIG. 1, there are two sets of sampling devices, sample-and-hold elements 37 through 43 and latches 44 through 50. This makes it possible to operate one set of sampling devices in a normally on or connected manner for a precise sampling time. The second set of sampling device then retains the sampled values for an indefinite period of time. In the system of FIG. 9, there is only a single set of simple sampling devices, latches 193 through 199. In the described manner of operation, these latches are normally on and ready to perform a sampling operation, and cannot be used to indefinitely retain previously sampled values. However, as will be shown in FIG. 19, a single set of sampling devices can be arranged to both perform a sampling operation and indefinitely retain the sampled values.

Figure 10:
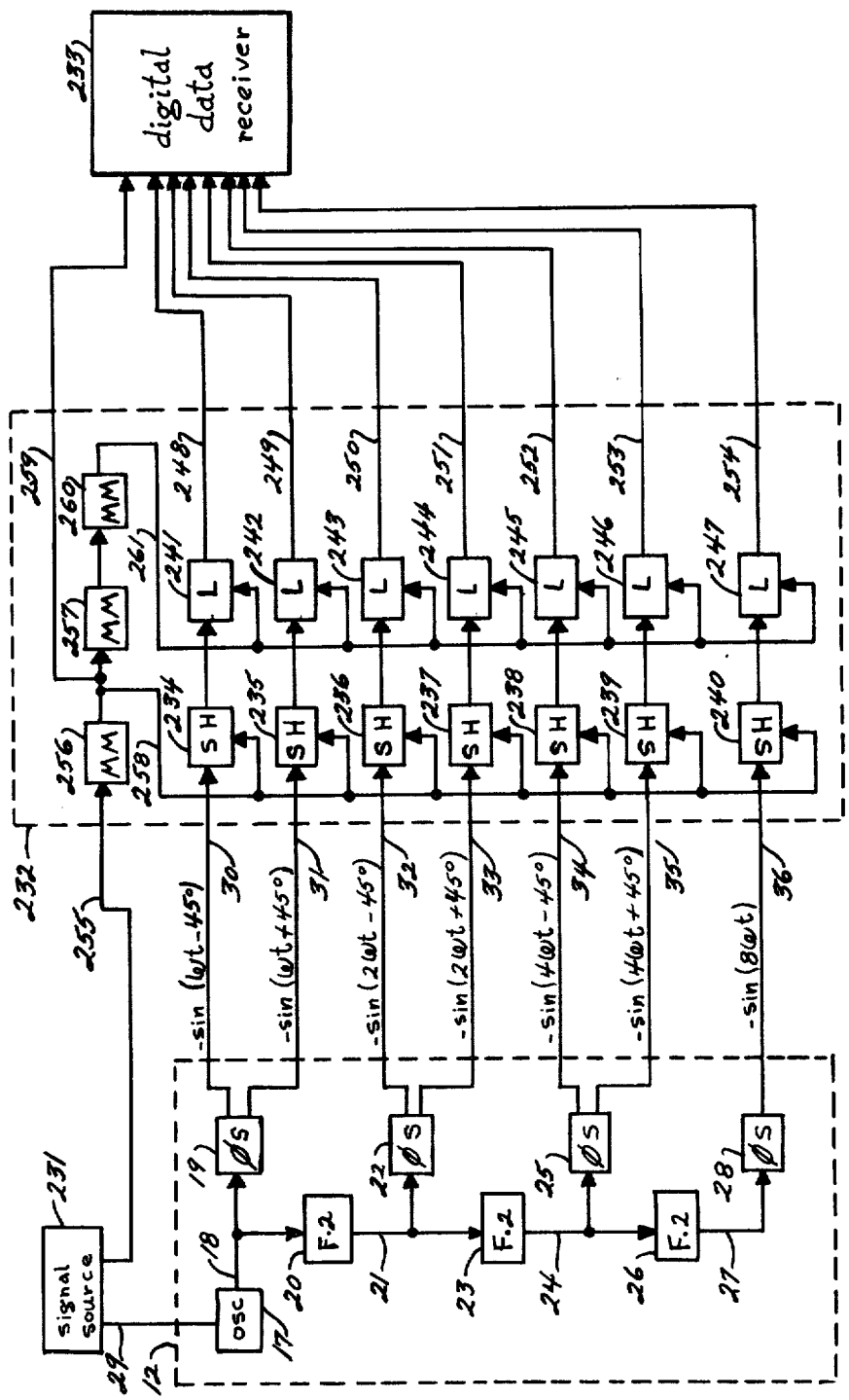
FIG. 10 is a diagrammatic illustration of a fifth form of the invention showing digital time measurement resulting in a set of two-phase code signals corresponding to a 4-bit binary number, the use of frequency multipliers and the separation of the encoding and ambiguity resolution steps.

FIG. 10 is a diagrammatic illustration of a fifth form of the invention showing digital time measurement resulting in a set of two-phase code signals corresponding to a 4-bit binary number, the use of frequency multiplier and the separation of the encoding and ambiguity resolution steps. FIG. 10 includes an oscillator section 12, a signal source 231, a sampling section 232 and a digital data receiver 233. Oscillator section 12 of FIG. 10, and its connections to lines 29, 30, 31, 32, 33, 34, 35 and 36, are substantially identical to oscillator section 12 of FIG. 1. Within oscillator section 12, oscillator 17 is connected via line 18 to the input of phase shift 19 and to the input of frequency doubler 20. The output of frequency doubler 20 is connected via line 21 to the input of phase shift 22 and to the input of frequency doubler 23. The output of frequency doubler 23 is connected via line 24 to the input of phase shift 25 and to the input of frequency doubler 26. The output of frequency doubler 26 is connected via line 27 to the input of phase shift 28. Oscillator 17 is connected via line 29 to signal source 231. The two outputs of phase shift 19 are connected to lines 30 and 31. Similarly, the two outputs of phase shift 22 are connected to lines 32 and 33, the two outputs of phase shift 25 are connected to lines 34 and 35, and the output of phase shift 28 is connected to line 36. Within sampling section 232, lines 30, 31, 32, 33, 34, 35 and 36 are connected to the signal inputs of sample-and-hold elements 234, 235, 236, 237, 238, 239 and 240, respectively, whose outputs are connected to the signal inputs of latches 241, 242, 243, 244, 245, 246 and 247, respectively. The outputs of latches 241, 242, 243, 244, 245, 246 and 247, are connected to lines 248, 249, 250, 251, 252, 253 and 254, respectively, which are connected to signal inputs of digital data receiver 233. Signal source 231 is connected via line 255 to the input of monostable multivibrator 256. The output of monostable multivibrator 256 is connected to the input of monostable multivibrator 257, via line 258 to the control inputs of sample-and-hold elements 234, 235, 236, 237, 238, 239 and 240, and via line 259 to a control signal input of digital data receiver 233. The output of monostable multivibrator 257 is connected to the input of monostable multivibrator 260, whose output is connected via line 261 to the control inputs of latches 241, 242, 243, 244, 245, 246 and 247.

The operation of the system of FIG. 10 generally resembles the operation of the system of FIG. 1. The principal difference is the separation of the steps of sampling and digital encoding, and ambiguity resolution. Digital data receiver 233 may be, for example, a digital computer system which performs the ambiguity resolution process, or a digital recorder which records the time measurement data for subsequent reproduction and conversion into a normal binary or other desired form.

Signal source 231 is a source of a pulse signal whose time is to be measured. signal source 231 may be, for example, of the form of radar system 11 of FIG. 1. Oscillator section 12 of FIG. 10 is identical to oscillator section 12 of FIG. 1, and provides the same oscillator section output signals on lines 30 through 36. The sampling control circuit of monostable multivibrator 256, 257 and 260 is arranged in a manner identical to that of monostable multivibrators 78, 79 and 83 of FIG. 1, and operates in substantially the same manner. The circuit of sampling section 232, between lines 30 through 36 and latch output lines 248 through 254, is substantially identical to the circuit of sampling section 13 between lines 30 through 36 and latch output lines 51, 55, 57, 62, 64, 69 and 71. Latches 241 through 247 may be, for example, standard 7400 series TTL integrated circuit devices. Sampling section 232 does not include the logical gate network of sampling section 13 for the resolution of ambiguities. Instead, the two-phase code representation of the digital time measurement is transmitted on lines 248 through 254 to digital data receiver 233 without ambiguity resolution or conversion into a normal binary form.

Digital data receiver 233 may be a separate system which generates a normal binary coded number from the signals on lines 248 through 254, for example, in the general manner shown in FIG. 1, or it may be a system which records the signals on lines 248 through 254 for the later reproduction of those signals and the generation of the corresponding binary member at that time if so desired. In the latter case, the line 248 through 254 signals are recorded as generated by sampling section 232 with little or no change. The control signal on line 259 causes the recording of the data on lines 248 through 254 whenever a measurement has been completed and valid data is available. The subsequently reproduced data signals, corresponding to the signals on lines 248 through 254, may be transmitted through a network of logical gates similar to that shown in FIG. 1 to provide the digital data in the normal binary form at the time of reproduction.

Figure 11:
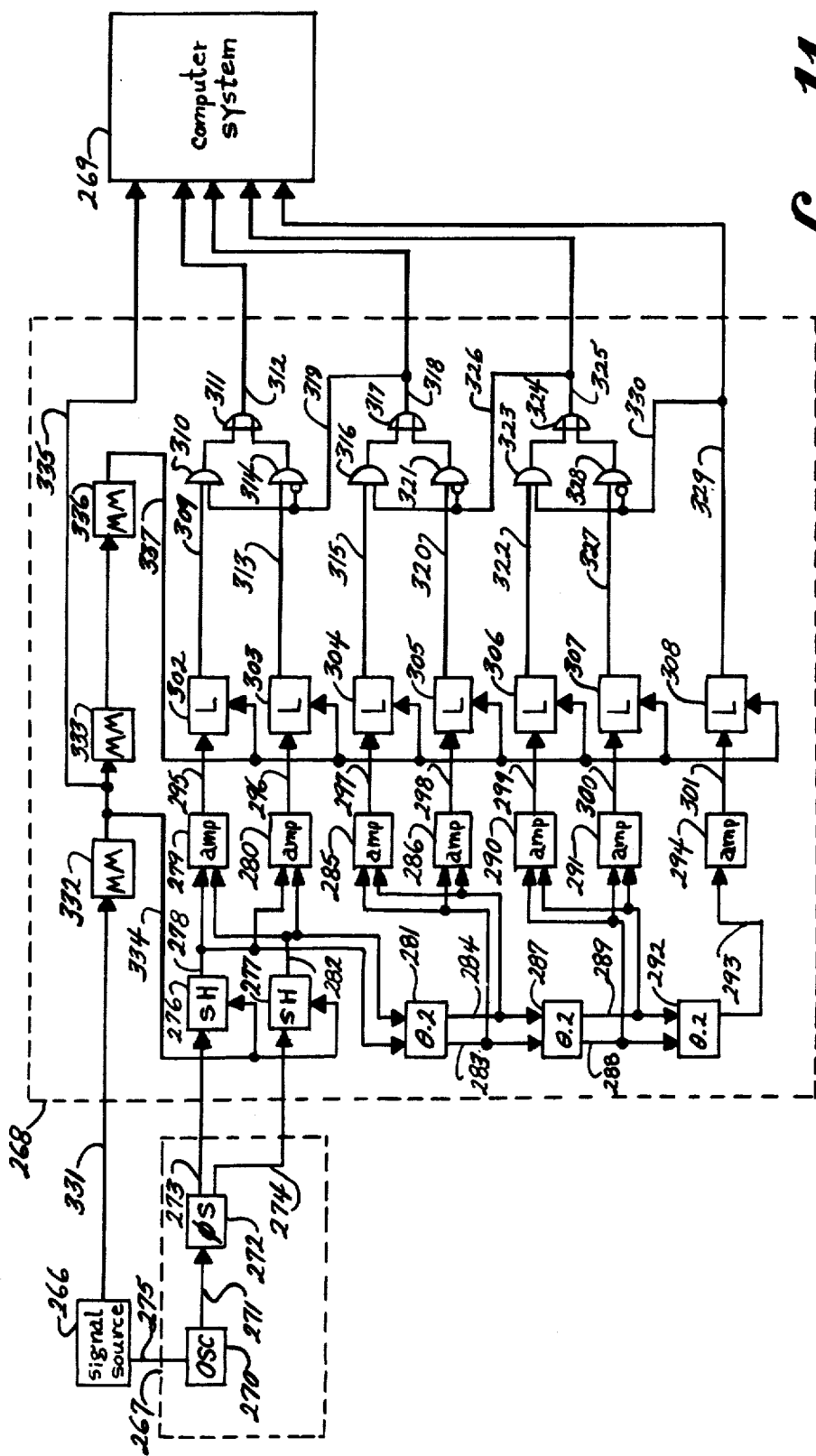
FIG. 11 is a diagrammatic illustration of a sixth form of the invention showing digital time measurement resulting in a 4-bit binary number, the use of a single frequency signal source, the use of angle multipliers and the use of an intermediate two-phase code for the resolution of ambiguities.

FIG. 11 is a diagrammatic illustration of a sixth form of the invention showing digital time measurement resulting in a 4-bit binary number, the use of a single frequency source, the use of angle multipliers and the use of an intermediate two-phase code for the resolution of ambiguities. FIG. 11 includes a signal source 266, an oscillator section 267, a sampling section 268 and a digital computer system 269. Within oscillator section 267, oscillator 270 is connected via line 271 to the input of phase shift 272. The two outputs of phase shift 272 are connected to lines 273 and 274. Oscillator 270 is connected via line 275 to signal source 266. Within sampling section 268, line 273 is connected to a signal input of sample-and-hold element 276, and line 274 is connected to a signal input of sample-and-hold element 277. The output of sample-and-hold element 276 is connected via line 278 to a first input of amplifier 279, to a first input of amplifier 280 and to a first input of angle multiplier 281. The output of sample-and-hold element 277 is connected via line 282 to a second input of amplifier 279, to a second input of amplifier 280 and to a second input of angle multiplier 281. The two outputs of angle multiplier 281 are connected via lines 283 and 284 to the two inputs of amplifier 285, to the two inputs of amplifier 286 and to the two inputs of angle multiplier 287. The two outputs of angle multiplier 287 are connected via lines 288 and 289 to the two inputs of amplifier 290, to the two inputs of amplifier 291 and to the two inputs of angle multiplier 292. The output of angle multiplier 292 is connected via line 293 to the input of amplifier 294. The outputs of amplifiers 279, 280, 285, 286, 290, 291 and 294 are connected via lines 295, 296, 297, 298, 299, 300 and 301, respectively, to the signal inputs of latches 302, 303, 304, 305, 306, 307 and 308, respectively. The output of latch 302 is connected via line 309 to a first input of AND gate 310, whose output is connected to a first input of OR gate 311. The output of OR gate 311 is connected to line 312. The output of latch 303 is connected via line 313 to a first input of AND gate 314, whose output is connected to a second input of OR gate 311. The output of latch 304 is connected via line 315 to a first input of AND gate 316, whose output is connected to a first input of OR gate 317. The output of OR gate 317 is connected to line 318 and, via line 319, to second inputs of AND gates 310 and 314. The output of latch 305 is connected via line 320 to a first input of AND gate 321, whose output is connected to a second input of OR gate 317. The output of latch 306 is connected via line 322 to a first input of AND gate 323, whose output is connected to a first input of OR gate 324. The output of OR gate 324 is connected to line 325 and, via line 326, to second inputs of AND gates 316 and 321. The output of latch 307 is connected via line 317 to a first input of AND gate 328, whose output is connected to a second input of OR gate 324. The output of latch 308 is connected to line 329 and, via line 330, to second inputs of AND gates 323 and 328. Lines 312, 318, 325 and 329 are connected to signal inputs of digital computer system 269. Signal source 266 is connected via line 331 to the input of monostable multivibrator 332. The output of monostable multivibrator 332 is connected to the input of monostable multivibrator 333, via line 334 to the control inputs of sample-and-hold elements 276 and 277, and via line 335 to a control signal input of computer system 269. The output of monostable multivibrator 333 is connected to the input of monostable multivibrator 336, whose output is connected via line 337 to the control inputs of latches 302, 303, 304, 305, 306, 307 and 308.

Signal source 266 is a source of a pulse signal on line 331 whose time is to be digitally measured. Signal source 266 may be, for example, of the form of radar system 11 of FIG. 1. The functions and operation of the system of FIG. 11 have a general resemblance to the functions and operation of the system of FIG. 1. The digital output signals on lines 312, 318, 325 and 329, the general response of sampling section 268 to a pulse signal on line 331 and the generation of a control signal on line 335 are generally similar to the digital output signals on lines 54, 60, 67 and 71, the response of sampling section 13 to a pulse signal on line 77 and the generation of a control signal on line 81. The differences are primarily in the internal structures of oscillator section 267 and sampling section 268, and the interconnections thereof.

In the system of FIG. 1, oscillator section 12 generates a number of signals at different frequencies. These signals are sampled at the time which is to be digitally measured. The sampled values are then converted into a digital number. The time resolution of the system of FIG. 1 is such that one digital count corresponds to the time of one half cycle of the highest frequency oscillator section 12 output signal on line 36. In the system of FIG. 11, oscillator section 267 generates two signals of different phases at a single frequency. These two signals are sampled and converted into a digital number. The resolution of the system of FIG. 11 is such that one digital count corresponds to the time of 1/16 cycle of the line 273 and 274 signals.

The arrangement of monostable multivibrators 332, 333, and 336 is substantially the same as the arrangement of monostable multivibrators 78, 79 and 83 of FIG. 1. The operation of monostable multivibrators 332, 333 and 336 in response to a pulse signal on line 331 is in the general manner illustrated in FIGS. 2A–2C and described in connection with the system of FIG. 1. When signal source 266 generates a time signal on line 331, monostable multivibrator 332 and the control signal on line 334 cause sample-and-hold elements 276 and 277 to sample the values of the line 273 and 274 signals at the time which is to be measured. A series of analog operations which will be described subsequently generate a set of logic level signals on lines 295 through 301. These signals form a two-phase intermediate code representation of a binary number corresponding to the sampled values of the line 273 and 274 signals at the measurement time. Monostable multivibrator 336 and the control signal on line 337 then cause latches 302 through 308 to sample the signals on lines 295 through 301. The output binary number is generated on lines 312, 318, 325 and 329 from the output signals of latches 302 through 308. The most significant bit signal is on line 312 and the least significant bit signal is on line 329. Latches 302 through 308, and gates 310, 311, 314, 316, 317, 321, 323, 324 and 328 may be, for example, standard 7400 series TTL integrated circuit devices.

Figure 12:
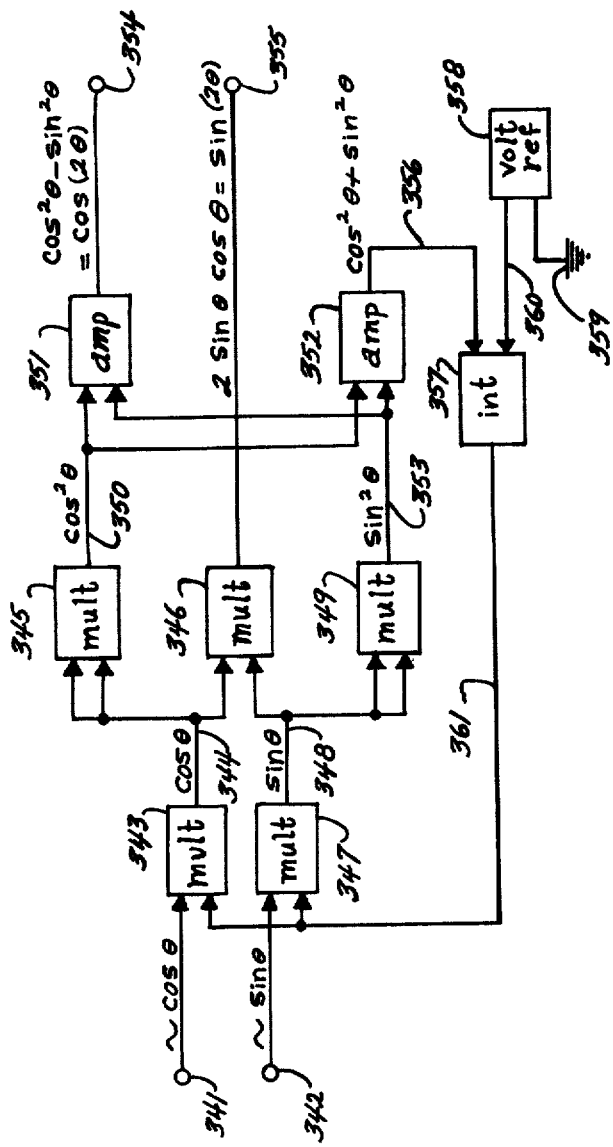
FIG. 12 is a diagrammatic illustration of an analog angle multiplier circuit for the multiplication of an analog angle signal by a factor of 2, which may be used for angle multipliers in the system of FIG. 11 and/or in the system of FIG. 16.

The oscillator 270 output signal on line 271 is a signal of angular frequency $\omega$. The two outputs of phase shift 272 on lines 273 and 274 are signals of the form $\cos(\omega t)$ and $\sin(\omega t)$, respectively. When signal source 266 generates a line 331 signal whose time is to be measured, monostable multivibrator 332 and the line 334 control signal generated thereby cause sample-and-hold elements 276 and 277 to sample the line 273 and 274 signals at the time which is to be measured. The outputs of sample-and-hold elements 276 and 277 on lines 279 and 282 will then be signals corresponding to $\cos(\theta)$ and $\sin(\theta)$, respectively, where $\theta$ is the angular value of $\omega t$ at the measurement time. Angle multipliers 281, 287 and 292 generate signals corresponding to $\cos(2\theta)$, $\sin(2\theta)$, $\cos(4\theta)$, $\sin(4\theta)$ and $\sin(8\theta)$ on lines 283, 284, 288, 289 and 293, respectively. A circuit which may be used for angle multipliers 281, 287 and 292 is shown in FIG. 12 and will be described subsequently.

Figure 13:
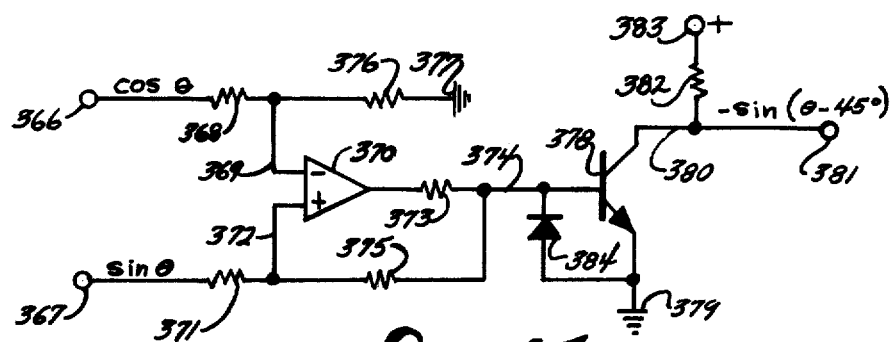
FIG. 13 is a diagrammatic illustration of a first form of polarity detection amplifier circuit, which may be used for amplifiers in the system of FIG. 11 and/or in the system of FIG. 16.
Figure 14:
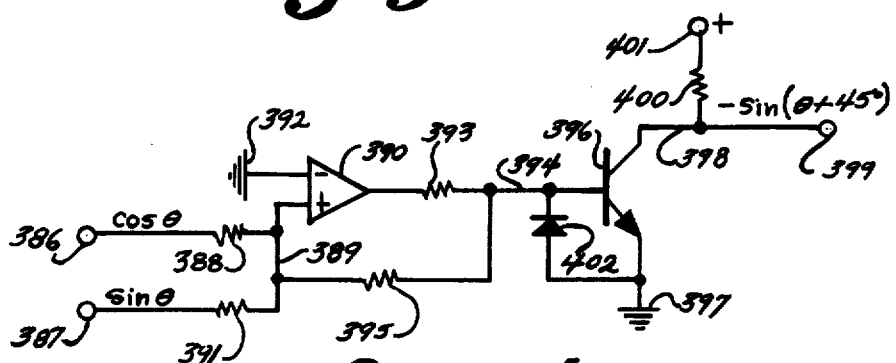
FIG. 14 is a diagrammatic illustration of a second form of polarity detection amplifier circuit, which may be used for amplifiers in the system of FIG. 11 and/or in the system of FIG. 16.
Figure 15:
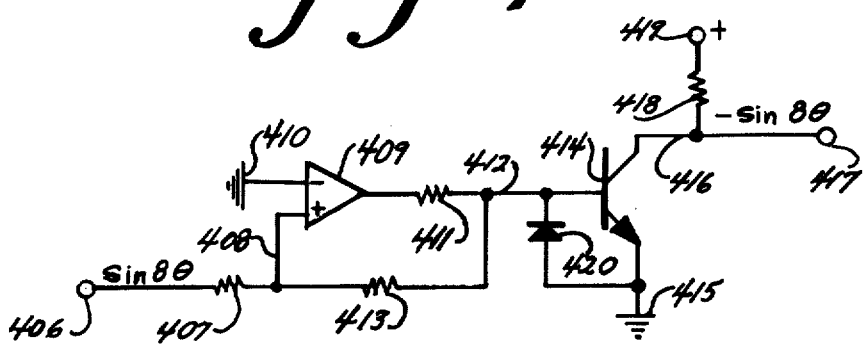
FIG. 15 is a diagrammatic illustration of a third form of polarity detection amplifier circuit, which may be used for an amplifier in the system of FIG. 11 and/or in the system of FIG. 16.

Given the two trigonometric functions $\cos(\theta)$ and $\sin(\theta)$, simple linear combinations of these two functions (i.e., weighted sums) may be used to generate any function of the form $\pm\sin(\theta\pm K)$ where K is any constant. In sampling section 268, amplifiers 279, 280, 285, 286, 290, 291 and 294 are used to generate logic level signals on lines 295 through 301 whose values correspond to the polarities of the functions $-\sin(\theta-45°)$, $-\sin(\theta+45°)$, $-\sin(2\theta-45°)$, $-\sin(2\theta+45°)$, $-\sin(4\theta-45°)$, $-\sin(4\theta+45°)$ and $-\sin(8\theta)$, respectively. Circuits which may be used for amplifiers 279, 280, 285, 286, 290, 291 and 294 are shown in FIGS. 13, 14 and 15, and will be described subsequently.

The $\cos(\theta)$ and $\sin(\theta)$ signals on lines 278 and 282 are connected to the inputs of amplifiers 279 and 280, which generate logic level signals on lines 295 and 296 corresponding to the polarities of the $-\sin(\theta-45°)$ and $-\sin(\theta+45°)$ functions, respectively. Similarly, the $\cos(2\theta)$ and $\sin(2\theta)$ signals on lines 283 and 284 are connected to the inputs of amplifiers 285 and 286 which generate logic level signals on lines 297 and 298 corresponding to the polarities of the $-\sin(2\theta-45°)$ and $-\sin(2\theta+45°)$ functions, respectively; the $\cos(4\theta)$ and $\sin(4\theta)$ signals on lines 288 and 289 are connected to the inputs of amplifiers 290 and 291 which generate logic level signals on lines 299 and 300 corresponding to the polarities of the $-\sin(4\theta-45°)$ and $-\sin(4\theta+45°)$ functions, respectively; and the $\sin(8\theta)$ signal on line 293 is connected to the input of amplifier 294 which generates a logic level signal on line 301 corresponding to the polarity of the $-\sin(8\theta)$ function.

Thus, after the sampling operation by sample-and-hold elements 276 and 277, the signals on lines 295 through 301 correspond to the signal outputs of sample-and-hold elements 37 through 43 of FIG. 1 after the sampling operation by those sample-and-hold elements. The lines 295 through 301 signals are then sampled by latches 302 through 308 in substantially the same manner that the output signals of sample-and-hold elements 37 through 43 of FIG. 1 are sampled by latches 44 through 50. The conversion of the latch 302 through 308 output signals into a normal binary coded digital signal on lines 312, 318, 325 and 329 is in substantially the same manner as the conversion of the latch 44 through 50 output signals into a normal binary coded digital signal on lines 54, 60, 67 and 71.

In the system of FIG. 1, frequency multiplication and phase shift operations are used to generate a number of alternating signals whose polarities correspond to a digital value of the time which is to be measured. These signals are sampled and converted into a digital number signal. In the system of FIG. 11, two phases of a single frequency are sampled. Angle multiplication operations are used to generate a number of signals whose polarities correspond to the desired digital time measurement value. Thus, the angle multiplication operations in sampling section 268 of FIG. 11 correspond generally to the frequency multiplication operations in oscillator section 12 of FIG. 1.

Analog angle multiplication is generally not as exact as frequency multiplication. Hence, it may not be practical to extend the system of FIG. 11 for the generation of a digital word containing a large number of bits and for a correspondingly fine time resolution as may be done with the system of FIG. 1. However, as will be shown in FIG. 16, the general concept of FIG. 11 can be useful for a form of interpolation to provide a moderate improvement in the resolution of a digital time measurement system constructed in accordance with other forms of the invention.

Figure 16:
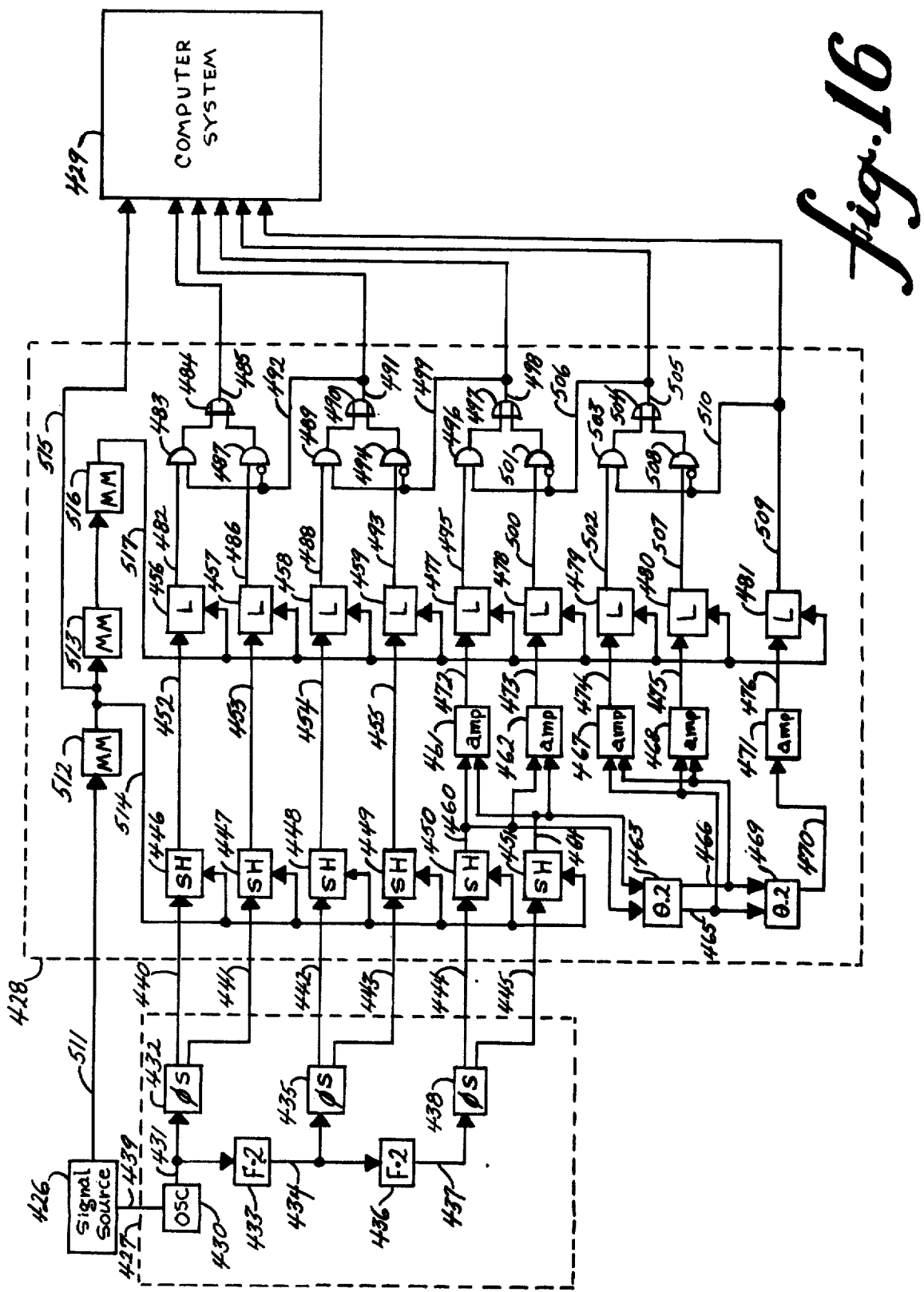
FIG. 16 is a diagrammatic illustration of a seventh form of the invention showing digital time measurement resulting in a 5-bit binary number, the use of an angle multiplier circuit for digital interpolation in combination with a multiple frequency signal source and the use of an intermediate two-phase code for the resolution of ambiguities.
Figure 11:
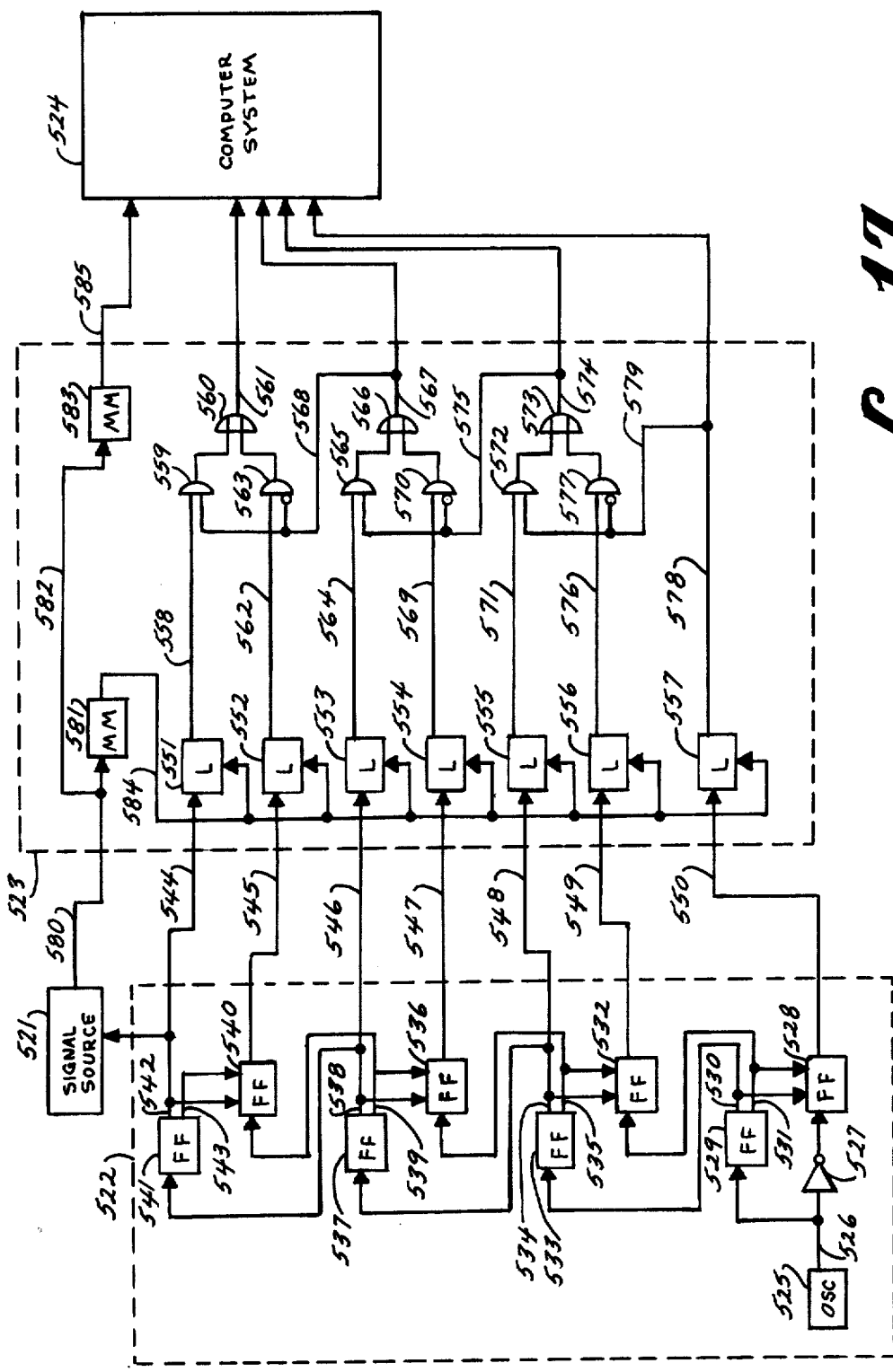

FIG. 12 is a diagrammatic illustration of an angle multiplier circuit for the multiplication of an analog angle signal by a factor of two, which may be used for angle multipliers 281, 287 and 292 in the system of FIG. 11 and/or for angle multipliers 463 and 469 in the system of FIG. 16. FIG. 12 includes signal input terminals 341 and 342, and signal output terminals 354 and 355. Terminal 341 is connected to a first input of multiplier 343, whose output is connected via line 344 to the two inputs of multiplier 345 and to a first input of multiplier 346. Terminal 342 is connected to a first input of multiplier 347, whose output is connected via line 348 to a second input of multiplier 346 and to the two inputs of multiplier 349. The output of multiplier 345 is connected via line 350 to a first input of summing amplifier 351 and to a first input of summing amplifier 352. The output of multiplier 349 is connected via line 353 to a second input of summing amplifiers 351 and 352. The output of amplifier 351 is connected to terminal 354. The output of multiplier 346 is connected to terminal 355. The output of amplifier 352 is connected via line 356 to a first input of different input integrator 357. Voltage reference 358 is connected to ground 359 and to line 360. Line 360 is connected to a second input of integrator 357. The output of integrator 357 is connected via line 361 to a second input of multiplier 343 and to a second input of multiplier 347.

Analog multipliers, in which the output signal is proportional to the product of two analog input signals, are well known. They are commercially available as circuit modules and as integrated circuit devices from a number of sources. The use of summing amplifiers to generate signals corresponding to linear combinations of two or more input signals is a well known practice, for example, in the analog computing field.

Analog multipliers 343 and 347 normalize the input signals in a manner which will be described subsequently. Analog multipliers 345, 346 and 349, and summing amplifier 351 are employed to mechanize the trigonometric realtionships:

$\sin(2\theta) = 2 \sin(\theta) \cos(\theta)$
$\cos(2\theta) = \cos^2(\theta) - \sin^2(\theta)$ In operation, the circuit of FIG. 12 will take 2 voltage signals, corresponding to the sine and cosine of an angle, and will generate two voltage signals corresponding to the sine and cosine of twice that angle.

Two input signals corresponding approximately to $\cos(\theta)$ and $\sin(\theta)$ are applied to terminals 341 and 342, respectively. Multiplier 343 is normally operated at a near unity gain such that its output on line 344 is nearly equal to the input signal on terminal 341. Multiplier 347 is similarly normally operated at a near unity gain such that the line 348 signal is nearly equal to the terminal 342 input signal. The multiplier 343 and 347 output signals on lines 344 and 348 correspond to $\cos(\theta)$ and $\sin(\theta)$, respectively. The output of multiplier 345 is a $\cos^2(\theta)$ signal and the output of multiplier 349 is a $\sin^2(\theta)$ signal. These two signals are combined by summing amplifier 351 into a $\cos^2(\theta) - \sin^2(\theta)$ signal which, from trigonometry, is identical to a $\cos(2\theta)$ signal. The $\cos(2\theta)$ output signal of amplifier 351 is connected to terminal 354. The output of multiplier 346 is a $2\sin(\theta)\cos(\theta)$ signal which, from trigonometry, is identical to a $\sin(2\theta)$ signal. The $\sin(2\theta)$ output signal of multiplier 346 is connected to terminal 355.

In mechanizing a set of equations with analog computing elements, it is generally necessary to consider the scale factors of multipliers and other non-linear elements. It is currently a common practice to design analog computing circuits with a full scale range of ±10 volts. Analog multipliers are often adjusted so that a full scale input signal on each of the two signal input lines will cause a full scale output signal. If the input and output signals are measured in terms of voltage, the equation for a multiplier element is:

$W = XY/K$ where W is the multiplier output voltage, X and Y are the multiplier input voltages and K is the voltage which corresponds to a value of one for the particular multiplier circuit. In a ±10 volt signal range system, K might be, for example, 10 volts. For convenience, the scale factors are often omitted from equations corresponding to analog computing element circuits. This practice was followed for the equations describing the operation of the circuit of FIG. 12.

The combination of multipliers 345, 346 and 349, and summing amplifier 351 may be used as a simple angle multiplier circuit. In that case, the $\cos(\theta)$ and $\sin(\theta)$ input signals would be connected directly to lines 344 and 348. The double angle signal would be generated on terminals 354 and 355.

A practical limitation of the simple angle multiplier circuit including only multipliers 345, 346 and 349, and summing amplifier 351 is that the "length" of the output vector (that is, the square root of the sum of the squares of the output sine and cosine components) may not be exactly one. If a number of such simple angle multiplier circuits are connected in cascade, this vector magnitude error may become quite substantial and may cause poor performance of the latter stages. The circuit of FIG. 12 includes a vector magnitude correction circuit which substantially reduces the vector magnitude error problem.

The vector magnitude of an angle signal represented as sine and cosine components will be correct if the sum of the squares of the sine and cosine components is equal to one. That is, if the trigonometric identity:

$\cos^2(\theta) + \sin^2(\theta) = 1$ is satisfied. In the circuit of FIG. 12, summing amplifier 352 generates a $\cos^2(\theta) + \sin^2(\theta)$ signal which is compared with the output of voltage reference 358 by differential input integrator 357. If there is an error in the magnitude off the $\cos^2(\theta) + \sin^2(\theta)$ signal on line 356, integrator 357 will adjust the gains of multipliers 343 and 347 so as to substantially reduce that error. The gains of multipliers 343 and 347, for the $\cos(\theta)$ and $\sin(\theta)$ signals, will normally be quite close to 1. They may be slightly less than one or slightly more than 1, depending on the required vector magnitude correction. The use of an integrator in the feedback loop which controls the vector magnitude stabilizes the control process.

If the circuit of FIG. 12 is used for angle multiplier 281 of FIG. 11, terminals 341, 342, 354 and 355 would be connected to lines 278, 282, 283 and 284, respectively. Similar connections would be made when the circuit of FIG. 12 is used for other angle multipliers in the circuit of FIG. 11 and/or in the circuit of FIG. 16.

FIG. 13 is a diagrammatic illustration of a first form of polarity detection amplifier circuit which may be used for amplifiers 279, 285 and 290 in the system of FIG. 11, and/or for amplifiers 461 and 467 in the system of FIG. 16. FIG. 13 includes a signal input terminals 366 and 367, and signal output terminal 381. Terminal 366 is connected via resistor 368 to line 369, which is connected to the negative or inverting input of operational amplifier 370. Terminal 367 is connected via resistor 371 to line 372, which is connected to the positive or non-inverting input of amplifier 370. The output of amplifier 370 is connected via resistor 373 to line 374, which is connected via resistor 375 to line 372. Line 369 is connected via resistor 376 to ground 377. Line 374 is connected to the base of transistor 378, whose emitter is connected to ground 379. The collector of transistor 378 is connected to line 380, which is connected to terminal 381. Line 380 is connected via resistor 382 to power supply terminal 383. Diode 384 is connected between line 374 and ground 379.

If the circuit of FIG. 13 is used for amplifier 279 of FIG. 11, terminals 366, 367 and 381 would be connected to lines 278, 282 and 295, respectively. Amplifier 370 is a high gain, differential input operational amplifier, for example, of the type available as circuit modules and as integrated circuit devices from a number of sources. Since there is no negative feedback around amplifier 370, the output of amplifier 370 will tend to be a saturation or maximum magnitude signal whose polarity corresponds to the polarity of the differential input signal on lines 369 and 372.

Resistors 368 and 371 will normally be of substantially equal resistance values. Resistors 375 and 376 will normally have resistance values which are substantially equal and which are substantially higher than the values of resistors 368 and 371. When the circuit of FIG. 13 is used for amplifier 279 of FIG. 11, the terminal 366 and 367 signals will correspond to $\cos(\theta)$ and $\sin(\theta)$, respectively. The signal on line 372 relative to line 369 will be approximately $\sin(\theta)-\cos(\theta)$, and the output of amplifier 370 will be a signal whose polarity corresponds to the polarity of the $\sin(\theta)-\cos(\theta)$ function.

From trigonometry:
$\sin(\theta)-\cos(\theta) = \sqrt{2}\sin(\theta-45°)$

Hence, the output of amplifier 370 will be a signal whose polarity corresponds to the polarity of the $\sin(\theta-45°)$ function. Resistor 373 is a current limiting resistor to limit the current drawn from the output of amplifier 370. When the output of amplifier 370 is positive, transistor 378 will be turned on, the voltage on line 380 will be pulled down to near ground, and the output signal on terminal 381 will have a low or zero value. When the output of amplifier 370 is negative, transistor 378 will be turned off, the voltage on line 380 will rise to approximately the voltage on power supply terminal 383, and the output signal on terminal 381 will have a high or one value.

Since the output signal of amplifier 370 is inverted as it passes through transistor 378, the circuit output signal on terminal 381 will be a logic level signal corresponding to the polarity of the $-\sin(\theta-45°)$ function. That is, a low or zero value of the terminal 381 signal will indicate that the polarity of the $-\sin(\theta-45°)$ function is negative, and a high or one value of the terminal 381 signal will indicate that the polarity of the $-\sin(\theta-45°)$ function is positive. The amplifier circuit of FIG. 13 will function in a generally similar manner when used for amplifiers other than amplifier 279 of FIG. 11.

Diode 384 limits the magnitude of the negative voltage on line 374 to prevent damage to transistor 378. Resistor 375 provides a small amount of positive feedback around amplifier 370 to prevent oscillation when the differential input signal on lines 369 and 372 is near zero. Since there is no negative feedback around amplifier 370, and it is not used to generate a signal whose magnitude is proportional to the value of an input signal, most or all of the usual frequency compensation applied to operational amplifiers may be eliminated and the response of amplifier 370 can be quite fast. Resistor 376 is for the purpose of balancing the circuit. It provides essentially the same attenuation of the terminal 366 signal, between terminal 366 and line 369, as the attenuation of the terminal 367 signal between terminal 367 and line 372 due to the resistive loading of resistor 375. To provide output signals which will be compatible with standard 7,400 series TTL integrated circuit devices, terminal 383 would be, for example, connected to a +5 volt power supply and resistor 382 would have a value typically in the range of a few hundred to a few thousand ohms.

FIG. 14 is a diagrammatic illustration of a second form of polarity detection amplifier circuit which may be used for amplifiers 280, 286 and 291 in the system of FIG. 11, and/or for amplifiers 462 and 468 in the system of FIG. 16. FIG. 14 includes signal input terminals 386 and 387, and signal output terminal 399. Terminal 386 is connected via resistor 388 to line 389, which is connected to the positive or non-inverting input of operational amplifier 390. Terminal 387 is connected via resistor 391 to line 389. The negative or inverting input of amplifier 390 is connected to ground 392. The output of amplifier 390 is connected via resistor 393 to line 394, which is connected via resistor 395 to line 389. Line 394 is connected to the base of transistor 396, whose emitter is connected to ground 397. The collector of transistor 396 is connected to line 398, which is connected to terminal 399. Line 398 is connected via resistor 400 to power supply terminal 401. Diode 402 is connected between line 394 and ground 397.

The operation of the circuit of FIG. 14 generally resembles the operation of the circuit of FIG. 13. The circuit of FIG. 14, from the output of amplifier 390 through output terminal 399, is substantially identical to the circuit of FIG. 13 from the output of amplifier 370 through output terminal 381. The difference is in the connections to the input of amplifier 390.

If the circuit of FIG. 14 is used for amplifier 280 of FIG. 11, terminals 386, 387 and 399 would be connected to lines 278, 282 and 296, respectively. Resistors 388 and 391 are of substantially equal resistance values, and resistor 395 is of a substantially higher resistance value. When the circuit of FIG. 14 is used for amplifier 280 of FIG. 11, the terminal 386 and 387 signals will correspond to cos($\theta$) and sin($\theta$), respectively. Hence, the signal on line 389 will be approximately (0.5)(sin($\theta$)+cos($\theta$)). Amplifier 390 is a high gain, differential input operational amplifier operated without negative feedback. Its output signal will tend to be a saturation signal of maximum magnitude whose polarity corresponds to the polarity of the line 389 signal. Hence, the output of amplifier 390 will be a signal whose polarity corresponds to the polarity of the (0.5)(sin($\theta$)+cos($\theta$)) function.

From trigonometry:
sin($\theta$)+cos($\theta$) = $\sqrt{2}$ sin($\theta$+45°)

Hence, the output of amplifier 390 will correspond to the polarity of the sin($\theta$+45°) function. The output signal of amplifier 390 is inverted in passing through transistor 396, so that the circuit output signal on terminal 399 is a logic level signal whose value corresponds to the polarity of the —sin($\theta$+45°) function.

Resistor 395 provides a small amount of positive feedback around amplifier 390, to prevent oscillation when the line 389 signal is near zero. The amplifier circuit of FIG. 14 will function in a generally similar manner when used for amplifiers other than amplifier 280 of FIG. 11.

FIG. 15 is a diagrammatic illustration of a third form of polarity detection amplifier circuit which may be used for amplifier 294 in the system of FIG. 11 and/or for amplifier 471 in the system of FIG. 16. FIG. 15 includes signal input terminal 406 and signal output terminal 417. Terminal 406 is connected via resistor 407 to line 408, which is connected to the positive or noninverting input of operational amplifier 409. The negative or inverting input of amplifier 409 is connected to ground 410. The output of amplifier 409 is connected via resistor 411 to line 412, which is connected via resistor 413 to line 408. Line 412 is connected to the base of transistor 414, whose emitter is connected to ground 415. The collector of transistor 414 is connected to line 416, which is connected to terminal 417. Line 416 is connected via resistor 418 to power supply terminal 419. Diode 420 is connected between line 412 and ground 415.

The operation of the circuit of FIG. 15 generally resembles the operation of the circuits of FIGS. 13 and 14. The circuit of FIG. 15, from the output of amplifier 409 through output terminal 417, is substantially identical to the circuit of FIG. 13 from the output of amplifier 370 through output terminal 381. The difference is in the connections to the input of amplifier 409.

If the circuit of FIG. 15 is used for amplifier 294 of FIG. 11, terminal 406 and 417 would be connected to lines 293 and 301, respectively. The line 293 and terminal 406 signal will correspond to sin(8$\theta$). Resistor 413 will normally be of a resistance value substantially higher than that of resistor 407. Hence, the signal on line 408 will be approximately a sin(8$\theta$) signal. The circuit output signal on terminal 417 will be a logic level signal whose value corresponds to the polarity of the —sin(8$\theta$) function.

Resistor 413 provides a small amount of positive feedback around amplifier 409, to prevent oscillation when the line 408 signal is near 0. The amplifier circuit of FIG. 15 will function in a generally similar manner when used for amplifiers other than amplifier 294 of FIG. 11.

FIG. 16 is a diagrammatic illustration of a seventh form of the invention showing digital time measurement resulting in a 5-bit binary number, the use of an angle multiplier circuit for digital interpolation in combination with a multiple frequency signal source and the use of an intermediate two-phase code for the resolution of ambiguities. FIG. 16 includes a signal source 426, an oscillator section 427, a sampling section 428 and a digital computer system 429. Within oscillator section 427, oscillator 430 is connected via line 431 to the input of phase shift 432 and to the input of frequency doubler 433. The output of frequency doubler 433 is connected via line 434 to the input of phase shift 435 and to the input of frequency doubler 436. The output of frequency doubler 436 is connected via line 437 to the input of phase shift 438. Oscillator 430 is connected via line 439 to signal source 426. The two outputs of phase shift 432 are connected to lines 440 and 441. Similarly, the two outputs of phase shift 435 are connected to lines 442 and 443, and the two outputs of phase shift 438 are connected to lines 444 and 445. Within sampling section 428, lines 440, 441, 442, 443, 444 and 445 are connected to the signal inputs of sample-and-hold elements 446, 447, 448, 449, 450 and 451, respectively. The outputs of sample-and-hold elements 446, 447, 448 and 449 are connected via lines 452, 453, 454 and 455 to the signal inputs of latches 456, 457, 458 and 459, respectively. The output of sample-and-hold element 450 is connected via line 460 to a first input of amplifier 461, to a first input of amplifier 462 and to a first input of angle multiplier 463. The output of sample-and-hold element 451 is connected via line 464 to a second input of amplifier 461, to a second input of amplifier 462 and to a second input of angle multiplier 463. The two outputs of angle multiplier 463 are connected via lines 465 and 466 to the two inputs of amplifier 467, to the two inputs of amplifier 468 and to the two inputs of angle multiplier 469. The output of angle multiplier 469 is connected via line 470 to the input of amplifier 471. The outputs of amplifiers 461, 462, 467, 468 and 471 are connected via lines 472, 473, 474, 475 and 476, respectively, to the signal inputs of latches 477, 478, 479, 480 and 481, respectively. The output of latch 456 is connected via line 482 to a first input of AND gate 483, whose output is connected to a first input of OR gate 484. The output of OR gate 484 is connected to line 485. The output of latch 457 is connected via line 486 to a first input of AND gate 487, whose output is connected to a second input of OR gate 484. The output of latch 458 is connected via line 488 to a first input of AND gate 489, whose output is connected to a first input of OR gate 490. The output of OR gate 490 is connected to line 491 and, via line 492, to second inputs of AND gates 483 and 487. The output of latch 459 is connected via line 493 to a first input of AND gate 494, whose output is connected to a second input of OR gate 490. The output of latch 477 is connected via line 495 to a first input of AND gate 496, whose output is connected to a first input of OR gate 497. The output of OR gate 497 is connected to line 498 and, via line 499, to second inputs of AND gates 489 and 494. The output of latch 478 is connected via line 500 to a first input of AND gate 501, whose output is connected to a second input of OR gate 497. The output of latch 479 is connected via line 502 to a first input of AND gate 503, whose output is connected to a first input of OR gate 504. The output of OR gate 504 is connected to line 505 and, via line 506, to second inputs of AND gates 496 and 501. The output of latch 480 is connected via line 507 to a first input of AND gate 508, whose output is connected to a second input of OR gate 504. The output of latch 481 is connected to line 509 and, via line 510, to second inputs of AND gates 503 and 508. Lines 485, 491, 498, 505 and 509 are connected to signal inputs of digital computer system 429. Signal source 426 is connected via line 511 to the input of monostable multivibrator 512. The output of monostable multivibrator 512 is connected to the input of monostable multivibrator 513, via line 514 to the control inputs of sample-and-hold elements 446, 447, 448, 449, 450 and 451, and via line 515 to a control signal input of computer system 429. The output of monostable multivibrator 513 is connected to the input of monostable multivibrator 516, whose output is connected via line 517 to the control inputs of latches 456, 457, 458, 459, 477, 478, 479, 480 and 481.

Signal source 426 is a source of a pulse signal on line 511 whose time is to be digitally measured. Signal source 426 may be, for example, of the form of radar system 11 of FIG. 1. The functions and operation of the system of FIG. 16 are generally similar to the functions and operation of the systems of FIGS. 1 and 11.

The digital output signals on lines 485, 491, 498, 505 and 509, the response of sampling section 428 to a pulse signal on line 511 and the generation of a control signal on line 515 are similar to the digital output signals on lines 54, 60, 67 and 71, the response of sampling section 13 to a pulse signal on line 77 and the generation of a control signal on line 81. The differences are primarily that the system of FIG. 16 is arranged for the generation of a 5-bit binary number while the system of FIG. 1 is arranged for the generation of a four-bit binary number, in the internal structures of oscillator section 427 and sampling section 428, and in the use of the angle multiplication technique shown in FIG. 11 to provide a form of interpolation between digital values directly obtainable from the output signals of oscillator section 427, and thereby provide a finer time measurement resolution.

The arrangement of monostable multivibrators 512, 513 and 516 is substantially the same as the arrangement of monostable multivibrators 78, 79 and 83 of FIG. 1. The operation of monostable multivibrators 512, 513 and 516 in response to a pulse signal on line 511 is in the general manner illustrated in FIGS. 2A–2C and described in connection with the system of FIG. 1. Sample-and-hold elements 446 through 451 are controlled by the line 514 control signal, and latches 456 through 459 and 477 through 481 are controlled by the line 517 control signal in the general manner of the corresponding sample-and-hold and latch elements of FIG. 1. Latches 456 through 459 and 477 through 481, and gates 483, 484, 487, 489, 490, 494, 496, 497, 501, 503, 504 and 508 may be, for example, standard 7,400 series TTL integrated circuit devices.

The signal outputs of oscillator section 427 on lines 440, 441, 442, 443, 444 and 445 correspond to $-\sin(\omega t-45°)$, $-\sin(\omega t+45°)$, $-\sin(2\omega-45°)$, $-\sin(2\omega+45°)$, $\cos(4\omega t)$ and $\sin(4\omega t)$, respectively, where $\omega t$ is the angular value of the time which is to be measured. When signal source 426 generates a pulse on line 511 whose time is to be measured, monostable multivibrator 512 and the line 514 control signal cause sample-and-hold elements 446 through 451 to sample and hold the values of the line 440 through 445 signals at the desired measurement time. The outputs of sample-and-hold elements 446 through 449 on lines 452, 453, 454 and 455 will be signals corresponding to $-\sin(\theta-45°)$, $-\sin(\theta+45°)$, $-\sin(2\theta-45°)$ and $-\sin(2\theta+45°)$, respectively, where $\theta$ is the angular value of the time to be digitally measured. The outputs of sample-and-hold elements 450 and 451 on lines 460 and 464 will be signals corresponding to $\cos(4\theta)$ and $\sin(4\theta)$, respectively.

Amplifiers 461 and 467 may be, for example, of the form shown in FIG. 13. Amplifiers 462 and 468 may be, for example, of the form shown in FIG. 14. Amplifier 471 may be, for example, of the form shown in FIG. 15. Angle multipliers 463 and 469 may be of the form shown in FIG. 12. The $\cos(4\theta)$ and $\sin(4\theta)$ signals on lines 460 and 464 are applied to the inputs of amplifiers 461 and 462 which generate logic level signals on lines 472 and 473, corresponding to the polarities of the $-\sin(4\theta-45°)$ and $-\sin(4\theta+45°)$ functions, respectively. In the general manner described in connection with FIG. 11, angle multipliers 463 and 469, and amplifiers 467, 468 and 471 generate signals corresponding to the polarities of $-\sin(8\theta-45°)$, $-\sin(8\theta+45°)$ and $-\sin(16\theta)$ on lines 474, 475 and 476, respectively. That is, the $\cos(4\theta)$ and $\sin(4\theta)$ signals on lines 460 and 464 are applied to the inputs of angle multiplier 463 whose outputs are signals corresponding to $\cos(8\theta)$ and $\sin(8\theta)$ on lines 465 and 466, respectively. These $\cos(8\theta)$ and $\sin(8\theta)$ signals are applied to the inputs of amplifiers 467 and 468, which generate logic level signals corresponding to the polarities of $-\sin(8\theta-45°)$ and $-\sin(8t+45°)$ on lines 474 and 475, respectively. The $\cos(8\theta)$ and $\sin(8\theta)$ signals on lines 465 and 466 are also applied to the inputs of angle multiplier 469 which generates a $\sin(16\theta)$ output signal on line 470. This $\sin(16\theta)$ signal is applied to the input of amplifier 471, which generates a logic level signal corresponding to the polarity of the $-\sin(16\theta)$ function on line 476.

The nine signals on lines 452 through 455 and 472 through 476 are a two-phase intermediate code representation of a 5-bit binary number corresponding to the time of the pulse signal on line 511. These intermediate code signals are sampled by latches 456 through 459 and 477 through 481 under the control of the line 517 signal. The nine logic level signals on lines 482, 486, 488, 493, 495, 500, 502, 507 and 509 are then a stable two-phase intermediate code representation of a 5-bit binary number corresponding to the time of the pulse signal on line 511. The conversion of this intermediate code representation into a 5-bit normal binary representation on lines 485, 491, 498, 505 and 509 directly parallels the corresponding conversion in the system of FIG. 1. The most significant bit signal is on line 485 and the least significant bit signal is on line 509.

Thus, the system of FIG. 16 uses the general approach of FIG. 1 to generate the two most significant bit of a binary number from the sampled values of the oscillator section 427 output signals on lines 440 through 443. It uses the approach of FIG. 11 to generate the three least significant bits of the 5-bit binary number from the sampled values of the line 444 and 445 signals. An advantage of the system of FIG. 16 is that it provides the basic accuracy of the system of FIG. 1, and also provides a finer digital time resolution for a given maximum output frequency of oscillator section 427. This can be particularly advantageous in instances in which it is difficult or impractical to generate and sample signal frequencies that are high enough to provide the desired digital time resolution via the approach of FIG. 1.

FIG. 17 is a diagrammatic illustration of an eighth form of the invention showing digital time measurement resulting in a 4-bit binary number, the use of binary counter elements for the generation of multiple frequency timing signals and the use of an intermediate two-phase code for the resolution of ambiguities. FIG. 17 includes a signal source 521, an oscillator section 522, a sampling section 523 and a digital computer system 524. Within oscillator section 522, oscillator 525 is connected via line 526 to the input of inverter 527 and to the clock input of flip-flop 529. The output of inverter 527 is connected to the clock input of flop-flop 528, whose output is connected to line 550. A first output of flip-flop 529 is connected via line 530 to a first data input of flip-flop 528 and to the clock input of flip-flop 533. A second output of flip-flop 529 is connected via line 531 to a second data input of flip-flot 528 and to the clock input of flip-flop 532. The output of flip-flop 532 is connected to line 549. A first output of flip-flop 533 is connected via line 534 to a first data input of flip-flop 532, to the clock input of flip-flop 537 and to line 548. A second output of flip-flop 533 is connected via line 535 to a second data input of flip-flop 532 and to the clock input of flip-flop 536. The output of flip-flop 536 is connected to line 547. A first output of flip-flop 537 is connected via line 538 to a first data input of flip-flop 536, to the clock input of flip-flop 541 and to line 546. A second output of flip-flop 537 is connected via line 539 to a second data input of flip-flop 536 and to the clock input of flip-flop 540. The output of flip-flop 540 is connected to line 545. A first output of flip-flop 541 is connected via line 542 to a first data input of flip-flop 540, to an input of signal source 521 and to line 544. A second output of flip-flop 541 is connected via line 543 to a second data input of flip-flop 540. Within sampling section 523, lines 544, 545, 546, 547, 548, 549 and 550 are connected to the signal inputs of latches 551, 552, 553, 554, 555, 556 and 557, respectively. The output of latch 551 is connected via line 558 to a first input of AND gate 559, whose output is connected to a first input of OR gate 560. The output of OR gate 560 is connected to line 561. The output of latch 552 is connected via line 562 to a first input of AND gate 563, whose output is connected to a second input of OR gate 560. The output of latch 553 is connected via line 564 to a first input of AND gate 565, whose output is connected to a first input of OR gate 566. The output of OR gate 566 is connected to line 567 and, via line 568, to second inputs of AND gates 559 and 563. The output of latch 554 is connected via line 569 to a first input of AND gate 570, whose output is connected to a second input of OR gate 566. The output of latch 555 is connected via line 571 to a first input of AND gate 572, whose output is connected to a first input of OR gate 573. The output of OR gate 573 is connected to line 574 and, via line 575, to second inputs of AND gates 565 and 570. The output of latch 556 is connected via line 576 to a first input of AND gate 577, whose output is connected to a second input of OR gate 573. The output of latch 557 is connected to line 578 and, via line 579, to second inputs of AND gates 572 and 577. Lines 561, 567, 574 and 578 are connected to signal inputs of digital computer system 524. Signal source 521 is connected via line 580 to the input of monostable multivibrator 581 and, via line 582, to the input of monostable multivibrator 583. The output of monostable multivibrator 581 is connected via line 584 to the control inputs of latches 551, 552, 553, 554, 555, 556 and 557. The output of monostable multivibrator 583 is connected via line 585 to a control signal input of computer system 524.

The previously described forms of the subject invention have shown the use of frequency multipliers and/or frequency dividers without specifying the form of the frequency multipliers or dividers in great detail. Many types of frequency multipliers and dividers are known and may be used in implementations of the subject invention. In the descriptions of the forms shown in FIGS. 1 and 6, it was assumed that the outputs of the frequency multipliers and dividers were sine wave signals. In many instances, it is convenient to use logical circuit elements such as TTL or ECL integrated circuit devices for frequency multiplication and/or division operations. FIG. 17 illustrates a form of the invention which uses binary counter or flip-flop elements as frequency dividers.

Signal source 521 is a source of a pulse signal on line 580 whose time is to be measured. Signal source 521 may be, for example, of the form of radar system 11 of FIG. 1. The functions and operation of the system of FIG. 17 are generally similar to the functions and operation of the system of FIG. 1. The digital output signals on lines 561, 567, 574 and 578 are similar to the digital output signals on lines 54, 60, 67 and 71 of FIG. 1. The most significant bit signal is one line 561 and the least significant bit signal is on line 578. The differences are primarily in the internal structures of oscillator section 522 and sampling section 523. The network of monostable multivibrators 581 and 583 differs from the network of monostable multivibrators 78, 79 and 83 of FIG. 1 to illustrate a different form of sampling and measurement operation. The flip-flops, latches and gates in the system of FIG. 17 may be, for example, standard 7,400 series TTL integrated circuit devices.

Signal source 521 is synchronized to oscillator section 522 via the line 542 signal. The signals on lines 544 through 550 are logic level signals whose values correspond generally to the polarities of the line 30 through line 36 signals in the system of FIG. 1. The time relationships of the line 544 through 550 signals are not exactly identical to the time relationships of the polarity values of the line 30 through 36 signals. This is because of the manner in which the line 544 through 550 signals are generated by binary counting operations. As will be described subsequently, these differences are not of great significance and do not affect the operation of the system. Substantially the same ambiguity resolution and binary number generation process is used in the system of FIG. 17 as in the system of FIG. 1.

The line 584 signal is normally high, so that latches 551 through 557 will normally accept and follow the input signals on lines 544 through 550. During this period of normal, non-measurement operation, the line 561, 567, 574 and 578 signals will be continually changing and will not represent a previous measurement value. When signal source 521 generates a time signal on line 580, monostable multi-vibrator 581 will generate a pulse of a predetermined duration. During this period, the line 584 signal will be low, causing latches 551 through 557 to retain the input signal values at the last instant that the line 584 signal was high. Thus, latches 551 through 557 will sample and temporarily hold the values of the line 544 through 550 signals at a time corresponding to the time of the line 580 time signal.

During the monostable multivibrator 581 pulse period, the network of logical gates will resolve any ambiguities and generate a four-bit binary number on lines 561, 567, 574 and 578 which is transmitted to computer system 524. The time period of monostable multivibrator 581 is chosen such that the ambiguity resolution process will require less than one half of the monostable multivibrator 581 pulse period. Monostable multivibrator 583 generates a pulse which begins at substantially the same time as the beginning of the monostable multivibrator 581 pulse, but lasts only approximately half as long. This pulse is tranmitted to computer system 524 via line 585. The end of the line 585 pulse indicates to computer system 524 that a time measurement has been made, and that valid data is available on lines 561, 567, 574, and 578.

Flip-flops 529, 533, 537 and 541 are binary counter elements which provide normal and complement outputs, and which change state on the negative or low going edge of the clock signal. They are connected in cascade to form a 4-bit binary counter. Flip-flops 528, 532, 536 and 540 are negative edge triggered flip-flops, such as JK or D type flip-flops, in which a data signal is transferred into the flip-flop on the negative or low going edge of the clock signal. If these flip-flops are conventional JK type flip-flops, the normal and complement data input signals would be connected in the manner shown in FIG. 17. If these flip-flops are conventional D type flip-flops, only one data input line would be required to each of these flip-flops. The line 526, oscillator 525 output signal is a rectangular wave signal, with approximately equal high and low periods. This signal is connected in a normal form to the clock input of flip-flop 529, and in an inverted form to the clock input of flip-flop 528.

Flip-flop 529 will be triggered at each low going transition of the line 526 signal and will change state once each cycle of the line 526 signal. Flip-flop 528 will be triggered on the high going transition of the line 526 signal, approximately midway between the triggerings of flip-flop 529. The data input connections to flip-flop 528 are such that when it is triggered it will assume a state opposite to that of flip-flop 529. That is, when flip-flop 528 is triggered, the line 550 signal will be set to a value opposite that of the line 530 signal. The result of this form of data input and triggering is that both the line 530 and 550 signals will be one half the frequency of the line 526 signal. However, the line 550 signal will lead the line 530 signal in phase by one quarter cycle. Flip-flops 532, 536 and 540 are similarly slaved to flip-flops 533, 537 and 541, respectively. In each case, they generate a signal of the same frequency as that of the flip-flop to which they are slaved, but leading in phase by one quarter cycle.

The operation of oscillator section 522 and of the system of FIG. 17 is illustrated in greater detail in FIGS. 18A through 18M. FIGS. 18A through 18G are plots of the line 544 through line 550 signals plotted as functions of time over a 0° to 360° range corresponding to one cycle of the line 544 signal. FIGS. 18H and 18I are similar plots of the line 530 and 526 signals plotted over the same 0° to 360° range. The 0° to 360° scale is specifically marked on FIGS. 18A, 18J and 18H. The time scale is also divided into 16 segments of 22.5° each. The individual segments are identified as segments 0 to 15, and are specifically marked on FIGS. 18B and 18K. The time relationship between the 0° to 360° scale in FIGS. 18A-18M and the line 544 signal is somewhat arbitrary. The particular relationship shown in FIG. 18 was chosen so that the system of FIG. 17 would generate a digital value of 0 for the range of 0° to 22.5° and a digital value of 15 for the range of 337.5° to 360°.

FIGS. 18A through 18G are also plots of the line 558, 562, 564, 569, 571, 576 and 578 signals, respectively, plotted as functions of the time of sampling by latches 551 through 557 over a 0° to 360° range corresponding to one cycle of the line 554 signal. Thus, FIG. 18A is a plot of both the line 544 signal and the line 558 signal. However, as in the case of FIGS. 3A-3G and 4A-4K, and FIGS. 7A-7D and 8A-8H, the horizontal scale of FIG. 18A does not have exactly the same significance for the line 544 and line 558 plots. FIGS. 18J through 18M are plots of the line 561, 567, 574 and 578 signals plotted as functions of the time of sampling by latches 551 through 557 over s similar 0° to 360° range. The signals shown in FIGS. 18A–18M are logic level signals which are normally either high or low and, in general, not of an intermediate value.

The line 526, oscillator 525 output signal shown in FIG. 18I is a symmetric signal with a frequency corresponding to 16 cycles over the 0° to 360° time scale. The FIG. 18I, line 526 signal is applied to the clock input of flip-flop 529. As shown in FIG. 18H, the line 530 output signal of flip-flop 529 changes state at each negative going transition of the FIG. 18I, line 526 signal. The line 526 signal is inverted via inverter 527 and applied to the clock input of flip-flop 528. As shown in FIG. 18G, the line 550 output of flip-flop 528 changes state at each positive going transition of the FIG. 18I, line 526 signal. The transitions of the FIG. 18G, line 550 signal are always to a state opposite that of the FIG. 18H, line 530 signal. Hence, the FIG. 18G and 18H signals are of the same frequency. However, the FIG. 18G, line 550 signal leads the FIG. 18H, line 530 signal in phase by one quarter cycle.

Line 530 is connected to the clock input of flip-flop 533 which is part of the binary counter chain. The FIG. 18E, line 548 output signal of flip-flop 533 changes state at each negative going transition of the FIG. 18H, line 530 signal. Flip-flop 532 is slaved to flip-flop 533 in the general manner of the slaving of flip-flop 528 to flip-flop 529. The FIG. 18F, line 549 output signal of flip-flop 532 is of the same frequency as the FIG. 18E, line 548 signal, but leads in phase by one quarter cycle. In a generally similar manner, the FIG. 18C, line 546 and FIG. 18A, line 544 signals are generated by flip-flops 537 and 541, the two more significant bit flip-flops of the binary counter chain. The FIG. 18D, line 547 signal is of the same frequency as the FIG. 18C, line 546 signal, but leads in phase by one quarter cycle. Similarly, the FIG. 18B, line 545 signal is of the same frequency as the FIG. 18A, line 544 signal, but leads in phase by one quarter cycle.

The network of logical gates in sampling section 523 is substantially equivalent to the corresponding network of logical gates in sampling section 13 of FIG. 1 and operates in a similar manner. The logic level signals shown in FIGS. 18A through 18G have a general resemblance to the signals shown in FIGS. 4A through 4G. The values of the individual FIG. 4A through 4F signals, and the FIG. 18A through 18F signals will be constant throughout the angular ranges in which they will be selected for transmission to corresponding data output lines, and will change only within angular ranges for which the particular signals will not be selected fro transmission to the corresponding data output lines.

Because of the arrangement of the counter circuits and the choice of the time scale, the FIG. 18A, 18C and 18E, line 544, 546 and 548 signals will all change shortly after the 0° time. The FIG. 18B, line 545 signal leads the FIG. 18A, line 544 signal in time by one quarter cycle, and will be constant for somewhat more than one quarter cycle after the 0° time. Similarly, the FIG. 18D and 18F, line 546 and 548 signals lead the FIG. 18C and 18E, line 545 and 547 signals by one quarter cycle at their respective frequencies. The small but finite propagation times of the signals through the flip-flops of oscillator section 522 will generally have no effect on the operation of the system of FIG. 17. For example, the first negative going transition of the FIG. 18E, line 548 signal after the 0° time may occur anywhere within the range of 0° to 22.5° without introducing a measurement error. Similarly, the first negative going transition of the FIG. 18C, line 546 signal may be anywhere within the range of 0° to 45°, and the first negative going transition of the FIG. 18A, line 544 signal may be anywhere within the range of 0° to 90°. Similar time variations of the FIG. 18B, 18D and 18F signals may occur without introducing a measurement error. In general, the allowable time variation doubles with each successive bit stage.

As an example, consider the digital measurement of a time of slightly more than 6/16 of full scale as indicated by dotted line 590 in FIGS. 18A-18M. This is the same time value that was used as an example in the descriptions of the operation of the systems of FIGS. 1 and 6. The value of the line 544 signal at that time, and the resulting line 558 signal, will be low as indicated by FIG. 18A. The values of the line 545 through 550 and line 562, 564, 569, 571, 576 and 578 signals will be as indicated in FIGS. 18B through 18G. The line 578 signal is the least significant bit of the binary number, and has a low value as shown in FIGS. 18G and 18M. Hence, the $2^0$ or least significant bit of the binary number will be a zero. The low value of the line 578 signal causes the selection of the line 576 signal for transmission to line 574, and a high or one value for the $2^1$ or 2 bit of the binary number. The high value of the line 574 signal causes the selection of the line 564 signal for transmission to line 567, and a high or one value for the $2^2$ or 4 bit of the binary number. The high value of the line 566 signal causes the selection of line 558 signal for transmission to line 561, and a low or 0 value for the $2^3$ or eight bit of the binary number.

The digital number resulting from the measurement of the time represented by dotted line 590 is thus binary 0110 or decimal 6. As may be seen in FIGS. 18B and 18K, dotted line 590 is in time segment number 6. Thus, the system of FIG. 17 has performed a digital measurement of the time represented by dotted line 590. As shown in FFIGS. 18A–18M, the system of FIG. 17 will generate digital numbers from 0 through 15 for line 77 signal times over a range of 0° to 360°.

The operation of the system of FIG. 17 is such that whenever the line 571 signal is at or near a transition point, the line 578 signal will be low and the line 576 signal will be selected for transmission to line 574. Whenever the line 576 signal is at or near a transition point, the line 578 signal will be high and the line 571 signal will be selected for transmission to line 574. Similarly, the lines and signals for the more significant bits of the binary number will be selected for transmission to the corresponding data output lines only when they are well away from transition points.

As in the case of the system of FIG. 1, the selection of a signal for any particular bit except the least significant bit is controlled by the value of the adjacent less significant bit. This maintains an exact synchronization of the various individual bit output signals, and avoids erroneous intermediate or transition values which might otherwise occur when the measured time was at or near a boundary point between two adjacent digital values. Hence, moderate timing errors of the line 544 thorugh line 549 signals will not affect the resulting digital values, as the generation of the output binary number is synchronized with the sampled value of the line 550 signal.

Figure 19:
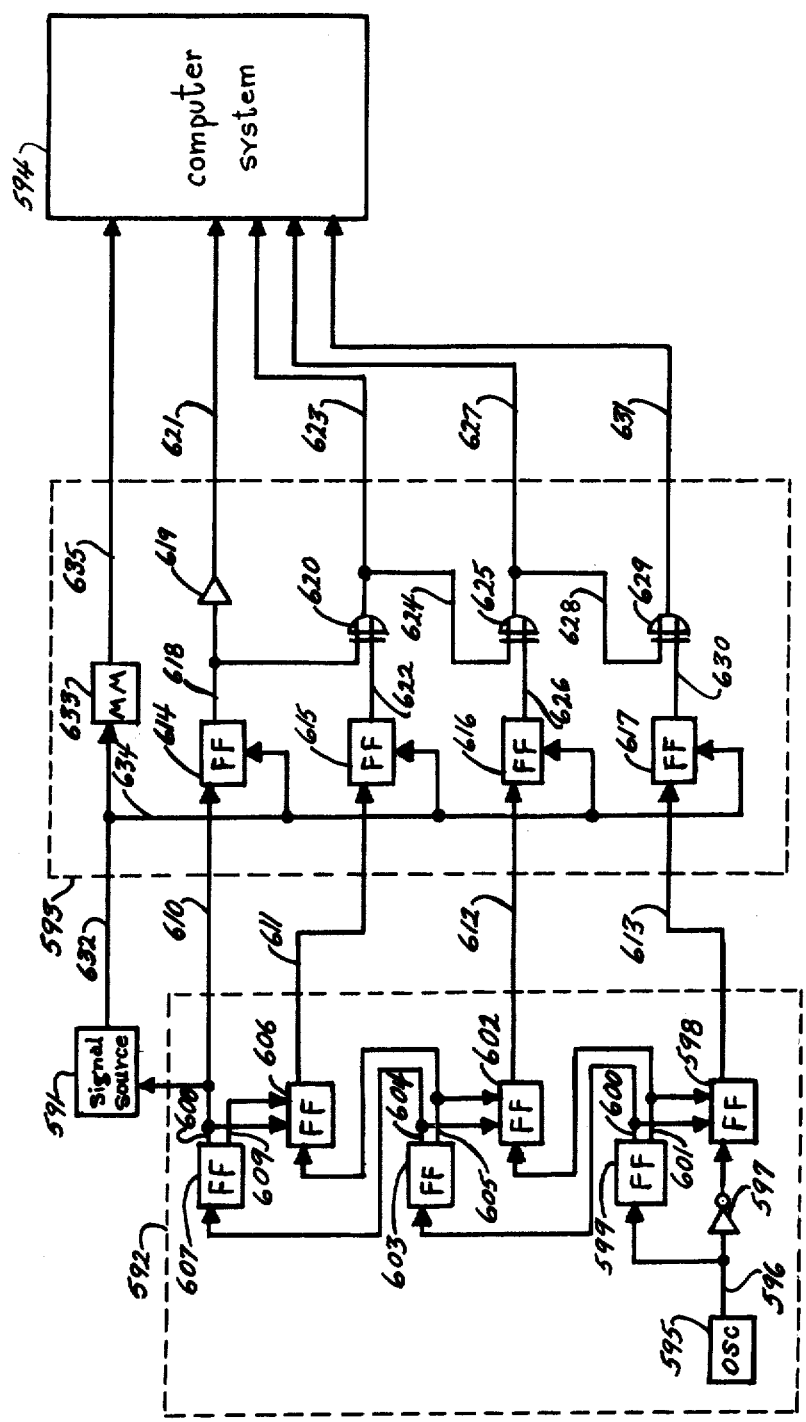
FIG. 19 is a diagrammatic illustration of a ninth form of the invention showing digital time measurement resulting in a 4-bit binary number, the use of binary counter elements for the generation of multiple frequency timing signals and the use of an intermediate Gray code for the resolution of ambiguities.

FIG. 19 is a diagrammatic illustration of a ninth form of the invention showing digital time measurement resulting in a 4-bit binary number, the use of binary counter elements for the generation of multiple frequency timing signals and the use of an intermediate Gray code for the resolution of ambiguities. FIG. 19 includes a signal source 591, an oscillator section 592, a sampling section 592 and a digital computer system 594. Within oscillator section 592, oscillator 595 is connected via line 596 to the input of inverter 597 and to the clock input of flip-flop 599. The output of inverter 597 is connected to the clock input of flip-flop 598, whose output is connected to line 613. A first output of flip-flop 599 is connected via line 600 to a first data input of flip-flop 598 and to the clock input of flip-flop 603. A second output of flip-flop 599 is connected via line 601 to a second data input of flip-flop 598 and to the clock input of flip-flop 602. The output of flip-flop 602 is connected to line 612. A first output of flip-flop 602 is connected via line 604 to a first data input of flip-flop 602 and to the clock input of flip-flop 607. A second output of flip-flop 603 is connected via line 605 to a second data input of flip-flop 602 and to the clock input of flip-flop 606. The output of flip-flop 606 is connected to line 611. A first output of flip-flop 607 is connected via line 608 to a first data input of flip-flop 606, to a signal input of signal source 591 and to line 610. A second output of flip-flop 607 is connected via line 609 to a second data input of flip-flop 606. Within sampling section 593, lines 610, 611, 612 and 613 are connected to the signal inputs of flip-flops 614, 615, 616 and 617, respectively. The output of flip-flop 614 is connected via line 618 to the input of buffer 619 and to a first input of EXCLUSIVE-OR gate 620. The output of buffer 619 is connected to line 621. The output of flip-flop 615 is connected via line 622 to a second input of EXCLUSIVE-OR gate 620. The output of EXCLUSIVE-OR gate 620 is connected to line 623 and, via line 624, to a first input of EXCLUSIVE-OR gate 625. The output of flip-flop 616 is connected via line 626 to a second input of EXCLUSIVE-OR gate 625. The output of EXCLUSIVE-OR gate 625 is connected to line 627 and, via line 628, to a first input of EXCLUSIVE-OR gate 629. The output of flip-flop 617 is connected via line 630 to a second input of EXCLUSIVE- OR gate 629. The output of EXCLUSIVE-OR gate 629 is connected to line 631. Lines 621, 623, 627 and 631 are connected to signal inputs of digital computer system 594. Signal source 591 is connected via line 632 to the input of monostable multivibrator 633 and, via line 634, to the clock inputs of flip-flops 614, 615, 616 and 617. The output of monostable multivibrator 633 is connected via line 635 to a control signal input of computer system 594.

The system of FIG. 17 uses substantially the same two-phase intermediate code and ambiguity resolution process as the system of FIG. 1, and is an illustration of a two-phase intermediate code system using binary counter type frequency dividers. The system of FIG. 19 uses substantially the same Gray intermediate code and ambiguity resolution process as the system of FIG. 6, and is an example of a Gray intermediate code system using binary counter type frequency dividers. The functions and operation of the system of FIG. 19 are generally similar to the functions and operation of the systems of FIGS. 1 and 6. The digital output signals on lines 621, 623, 627 and 631 are similar to the digital output signals on lines 54, 60, 67 and 71 of FIG. 1. The most significant bit signal is on line 621 and the least significant bit signal is on line 631. The differences are primarily in the internal structures of oscillator section 592 and sampling section 593, and that sampling section 593 illustrates a different form of sampling process.

Signal source 591 is a source of a pulse signal on line 632 whose time is to be measured. Signal source 591 may be, for example, of the form of radar system 11 of FIG. 1. Signal source 591 is synchronized to the line 610 signal. The inverter, flip-flops, buffer and logical gates of FIG. 19 may be, for example, standard 7,400 series TTL integrated circuit devices.

Sampling section 593 employs positive edge triggered flip-flops 614 through 617 as signal sampling elements. Flip-flop 614 samples the value of the line 610 signal at the time of a positive going transition of the line 634 signal. Hence, the line 618 signal will correspond to the value of the line 610 signal at the time of the last positive going transition of the line 634 signal. Flip-flop 614 will ignore any changes of the line 610 signal before or after a positive going transition of the line 634 signal. Flip-flops 615, 616 and 617 similarly sample the values of the line 611, 612 and 613 signals at the time of a positive going transition of the line 634 signal.

In operation, signal source 591 will generate a positive pulse on line 632, which will cause the sampling of the line 610 through 613 signals at the time of the leading edge of the positive pulse. Monostable multivibrator 633 will generate a short pulse whose duration is somewhat longer than the propagation time of the signals from flip-flops 614 through 617 to lines 621, 623, 627 and 631. Buffer 619 provides a short delay, comparable to the propagation time through EXCLUSIVE-OR gates 620, 625 and 629. This is to insure that valid data will be transmitted on line 621, as well as on lines 623, 627 and 631, until after the beginning of the monostable multivibrator 633 pulse. The line 621, 623, 627 and 631 output data signals will change, if necessary, and reach new stable values before the end of the monostable multivibrator 633 pulse. Hence, the pulse on line 635 to computer system 594 indicates that a new time measurement is in process. The end of the line 635 pulse indicates to computer system 594 that a new valid data value is available on lines 621, 623, 627 and 631. This data value will be transmitted until the next time measurement.

The general arrangement of oscillator section 592 is similar to the arrangement of oscillator section 522 of FIG. 17. The principal difference is that a different set of signal lines is brought out from oscillator section 592 so that it generates a Gray code set of clock signals rather than the two-phase set of clock signals of oscillator section 522. Flip-flops 599, 603 and 607 are binary counter elements which provide normal and complement outputs and which change state on the negative or low going edge of the clock signal. Flip-flops 598, 602 and 606 are negative edge triggered flip-flops in which the input data signal is transferred into the flip-flop on the negative going edge of the clock signal. The general arrangement of flip-flops 599, 603 and 607 in a binary counter chain, and the slaving of flip-flops 598, 602 and 606 to flip-flops 599, 603 and 607, respectively, are similar to the arrangement of oscillator section 522.

The operation of the system of FIG. 19 is illustrated in greater detail in FIGS. 20A through 20K. The line 610, 611, 604, 612, 600, 613 and 596 signals are plotted in FIGS. 20A through 20G, respectively, as functions of time over a 0° to 360° range corresponding to one cycle of the line 610 signal. The 0° to 360° scale is specifically marked on FIGS. 20A and 20H. The time scale is also divided into 16 segments of 22.5° each. The individual segments are identified as segments 0 through 15 and are specifically marked on FIGS. 20B and 20I.

The line 596, oscillator 595 output signal plotted in FIG. 20G has a frequency of eight cycles over the 0° to 360° time scale. The FIG. 20G, line 596 signal is connected directly to the clock input of flip-flop 599. The FIG. 20E, line 600 flip-flop 599 output signal changes state at each negative going transition of the FIG. 20G, line 596 signal. Flip-flop 598 is slaved to flip-flop 599 in the manner described for oscillator section 522 of FIG. 17. Hence, the FIG. 20F, line 613 signal is of the same frequency as the FIG. 20E, line 600 signal, but leads in phase by one quarter cycle. In a similar manner, the FIG. 20D, line 612 signal changes state on each positive going transition of the FIG. 20E, line 600 signal, and the FIG. 20C, line 604 signal changes state on each negative going transition of the FIG. 20E, line 600 signal. The FIG. 20D, line 612 signal leads the FIG. 20C, line 604 signal in phase by one quarter cycle. The FIG. 20B, line 611 signal changes state at each positive going transition of the FIG. 20C, line 604 signal. The FIG. 20A, line 612 signal changes state at each negative going transition of the FIG. 20C, line 604 signal. The FIG. 20B, line 611 signal leads the FIG. 20A, line 610 signal in phase by one quarter cycle.

Thus, flip-flops 599, 603 and 607 form a three-bit binary counter generating normal binary counter output signals on lines 600, 604 and 608. Flip-flops 598, 602 and 606 generate signals of the same frequencies as flip-flops 599, 603 and 607, respectively, but in each case leading in phase by one quarter cycle.

Only the line 610 through 613 signals are used as oscillator section 592 output signals. The FIG. 20C, line 604 and FIG. 20E, line 600 signals are used internally within oscillator section 592 in the signal generation process. The line 610 through 613 signals plotted in FIGS. 20A, 20B, 20D and 20F correspond to the polarities of the $-\sin(\theta)$, $-\cos(\theta)$, $-\cos(2\theta)$ and $-\cos(4\theta)$ functions. Hence, the FIG. 20A, 20B, 20D and 20F signals correspond to the signals plotted in FIGS. 8A through 8D. FIGS. 20A, 20B, 20D and 20F are also plots of the line 618, 622, 626 and 630 signals, plotted as functions of the time of sampling by flip-flops 614 through 617. As in the case of FIGS. 18A–18M, the time scale of FIG. 20A does not have exactly the same significance for the line 610 and 618 signals. That is, the plot of the line 610 signal is as a function of time, while the plot of the line 618 signal is as a function of the most recent sampling time. The time scales of FIGS. 20B, 20D and 20F have a corresponding different significance for the plots of the line 611, 622; line 612, 626; and line 613, 630 signals.

As an example, consider the measurement of a time of slightly more than 6/16 of full scale as indicated by dotted line 640 in FIGS. 20A–20K. This is the same time value that was used as an example for the description of the operation of the systems of FIGS. 1, 6 and 17. The value of the line 610 signal at the time of sampling, and the resulting line 618 signal, will be low as indicated in FIG. 20A. The values of the line 622, 626 and 630 signals will be as indicated in FIGS. 20B, 20D and 20F.

The low value of the line 618 signal is transitted to line 621, as shown in FIG. 20H, and causes the $2^3$ or most significant bit of the binary number to be zero. The low signal on line 618, the high signal on line 622 and the EXCLUSIVE-OR operation performed by EXCLUSIVE-OR gate 620 cause the line 623 signal to be high as shown in FIG. 20I. This gives a high or one value for the $2^2$ or four bit of the binary number. The high value of the line 623 signal, the low value of the line 626 signal and the EXCLUSIVE-OR operation performed by EXCLUSIVE-OR gate 625 cause the line 627 signal to be high as shown in FIG. 20J. This gives a high or one value for the $2^1$ or 2 bit of the binary number. The high values of the line 627 and line 630 signals and the EXCLUSIVE-OR operation performed by EXCLUSIVE-OR gate 629 cause the line 631 signal to be low as shown in FIG. 20K. This gives a low or zero value for the $2^0$ or least significant bit of the binary number.

The digital number resulting from the measurement of the time signal represented by dotted line 640 is binary 0110 or decimal 6. As may be seen from FIGS. 20B and 20I, dotted line 640 is in time segment 6. Thus, the system of FIG. 19 has performed a digital time measurement of the time signal represented by dotted line 640. As shown in FIGS. 20H through 20K, the system of FIG. 19 will generate digital numbers from 0 through 15 for time signals over a range of 0° to 360°.

Figure 21:
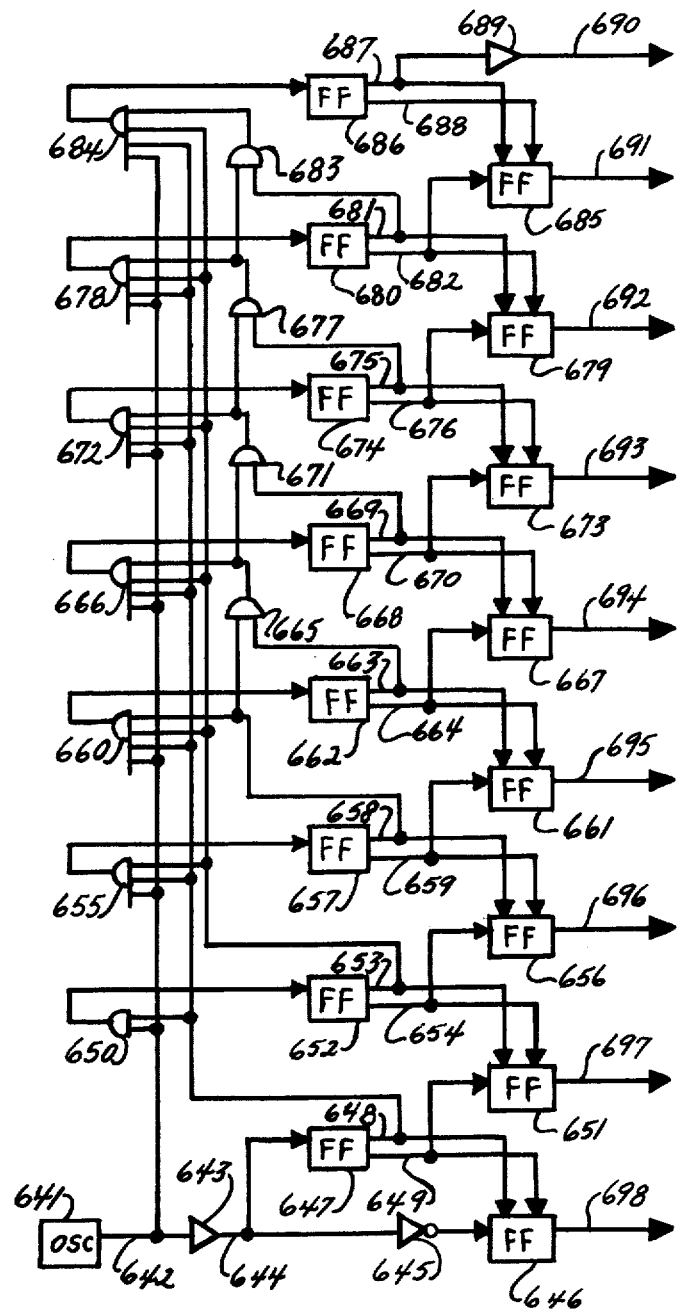
FIG. 21 is a diagrammatic illustration of a form of a fast carry counter circuit which may be used in systems of the general form shown in FIG. 19.

FIG. 21 is a diagrammatic illustration of a form of a fast carry counter circuit which may be used in systems of the general form shown in FIG. 19. In FIG. 21, oscillator 641 is connected via line 642 to the input of buffer 643 and to first inputs of AND gates 650, 655, 660, 666, 672, 678 and 684. The output of buffer 643 is connected via line 644 to the input of inverter 645 and to the clock input of flip-flop 647. The output of inverter 645 is connected to the clock input of flip-flop 646. A first output of flip-flop 647 is connected via line 648 to a first data input of flip-flop 646 and to second inputs of AND gates 650, 655, 660, 666, 672, 678 and 684. A second output of flip-flop 647 is connected via line 649 to a second data input of flip-flop 646 and to the clock input of flip-flop 651. The output of AND gate 650 is connected to the clock input of flip-flop 652. A first output of flip-flop 652 is connected via line 653 to a first data input of flip-flop 651 and to third inputs of AND gates 655, 660, 666, 672, 678 and 684. A second output of flip-flop 652 is connected via line 654 to a second data input of flip-flop 651 and to the clock input of flip-flop 656. The output of AND gate 655 is connected to the clock input of flip-flop 657. A first input of flip-flop 657 is connected via line 658 to a first data input of flip-flop 656, to a fourth input of AND gate 660 and to a first input of AND gate 665. A second output of flip-flop 657 is connected via line 659 to a second data input of flip-flop 656 and to the clock input of flip-flop 661. The output of AND gate 660 is connected to the clock input of flip-flop 662. A first output of flip-flop 662 is connected via line 663 to a first data input of flip-flop 661 and to a second input of AND gate 665. A second output of flip-flop 662 is connected via line 664 to a second data input of flip-flop 661 and to the clock input of flip-flop 667. The output of AND gate 665 is connected to a fourth input of AND gate 666 and to a first input of AND gate 671. The output of AND gate 666 is connected to the clock input of flip-flop 668. A first output of flip-flop 668 is connected via line 669 to a first data input of flip-flop 667 and to a second input of AND gate 671. A second output of flip-flop 668 is connected via line 670 to a second data input of flip-flop 667 and to the clock input of flip-flop 673. The output of AND gate 671 is connected to a fourth input of AND gate 672 and to a first input of AND gate 677. The output of AND gate 672 is connected to the clock input of flip-flop 674. A first output of flip-flop 674 is connected via line 675 to a first data input of flip-flop 673 and to a second input of AND gate 677. A second output of flip-flop 674 is connected via line 676 to a second data input of flip-flop 673 and to the clock input of flip-flop 679. The output of AND gate 677 is connected to a fourth input of AND gate 678 and to a first input of AND gate 683. The output of AND gate 678 is connected to the clock input of flip-flop 680. A first output of flip-flop 680 is connected via line 681 to a first data input of flip-flop 679 and to a second input of AND gate 683. A second output of flip-flop 680 is connected via line 682 to a second data input of flip-flop 679 and to the clock input of flip-flop 685. The output of AND gate 683 is connected to a fourth input of AND gate 684. The output of AND gate 684 is connected to the clock input of flip-flop 686. A first output of flip-flop 686 is connected via line 687 to a first data input of flip-flop 685 and to the input of buffer 689. A second output of flip-flop 686 is connected via line 688 to a second data input of flip-flop 685. The output of buffer 689 is connected to line 690. The outputs of flip-flops 685, 679, 673, 667, 661, 656, 651 and 646 are connected to lines 691, 692, 693, 694, 695, 696, 697 and 698, respectively.

In the case of a simple Gray code system such as that of FIG. 19, it is generally necessary that all of the various oscillator section output signals be generated with a time precision corresponding to the desired time accuracy and resolution. The relatively simple arrangement of flip-flop elements in oscillator section 592 will generally be adequate so long as the propagation time of a signal through the network of flip-flops is short relative to the desired digital time resolution. However, this requirement may become a substantial limitation for time measurement systems generally along the lines of FIG. 19 operated at high oscillator frequencies and/or extended so as to perform measurements corresponding to a larger number of bits.

A number of fast carry counter circuits have beeen devised to overcome such problems and may be adapted to the generation of a set of Gray code signals. In many instances, the effective carry propagation time can be reduced to substantially zero. FIG. 21 is an illustration of one fast carry counter circuit arranged for the generation of a set of Gray code signals.

For clarity of illustration, the circuit of FIG. 21 is arranged for the generation of nine oscillator section output signals corresponding to a Gray intermediate code. If the circuit of FIG. 21 were used for oscillator section 592 of FIG. 19, lines 690 through 693 would be connected to lines 610 through 613, respectively. Lines 694 through 698 would be connected to an extended portion of sampling section 593, constructed generally along the same pattern as that shown in FIG. 19.

In oscillator section 592 of FIG. 19, flip-flops 599, 603 and 607 form a normal binary counter. Flip-flops 598, 602 and 606 are slaved to flip-flops 599, 603 and 607, respectively, so as to generate the desired Gray code signals. In FIG. 21, flip-flops 647, 652, 657, 662, 668, 674, 680 and 686 are negative edge triggered flip-flops with normal and complement outputs. They are connected in a binary counter circuit which generates a set of normal binary output signals. The fast carry circuitry is connected to this binary counter chain. Flip-flops 646, 651, 656, 661, 667, 673, 679 and 685 are negative edge triggered data flip-flops. They are slaved to flip-flops 647, 652, 657, 662, 668, 674, 680 and 686, respectively, and generate the desired Gray code signals. The manner of the slaving of these flip-flops is in the general manner described in connection with FIGS. 17 and 19. In each case, a slaved flip-flop generates a signal of the same frequency as its associated master flip-flop but leading in phase by one quarter cycle. Buffers 643 and 689 are used to provide short time delays whose purposes will be described subsequently.

The line 642, oscillator 641 output signal is connected through buffer 643 to line 644 and the clock input of flip-flop 647. Buffer 643 has substantially the same propagation delay time as AND gates 650, 655, 660, 666, 672, 678 and 684. Hence, flip-flop 647 will be triggered one gate delay time after the low going transition of the line 642 signal.

The output of AND gate 650 will be high only if the line 642 and 648 signals are both high. When the line 648 signal is high, flip-flop 652 should make a transition on the next low going transition of the line 642 signal. If line 648 were connected directly to the clock input of flip-flop 652, flip-flop 652 would be triggered on the low going transition of the line 648 signal. However, the low going transition of the line 648 signal will be later than the low going transition of the line 642 signal by the propagation time through buffer 643 and flip-flop 647. In the circuit of FIG. 21, AND gate 650 is used to determine when the line 648 signal is high and is about to make a low going transition. When the AND gate 650 output signal is high, flip-flop 652 will be triggered on the next low going transition of the line 642 signal. The triggering signal applied to the clock input of flip-flop 652 will be one gate delay time after the low going transition of the line 642 signal. In this manner, flip-flop 652 is triggered at substantially the same time as flip-flop 647, without a propogation delay through flip-flop 647.

Similarly, the output of AND gate 655 will be high only when the line 648 and 653 signals, the flip-flop 647 and 652 output signals, and the line 642 signal are all high. The gate 655 output signal will then go low on the next low going transition of the line 642 signal, and will trigger flip-flop 657 at substantially the same time that flip-flops 647 and 652 are triggered. In a similar manner, the output of AND gate 660 will be high only when the line 648, 653 and 658 signals, the flip-flop 647, 652 and 657 output signals, and the line 642 signal are all high. The gate 660 output signal will then go low on the next low going transition of the line 642 signal, and will trigger flip-flop 662 at substantially the same time that flip-flops 657, 652 and 647 are triggered.

This technique of using AND gates connected to a clock signal and to all higher frequency flip-flops can be extended indefinitely to provide an effectively instantaneous carry propagation throughout an entire binary counter system. However, it has the disadvantage that the number of inputs to each AND gate is one greater than the number of higher frequency stages. For long counter chains this can be inconvenient. The output frequency of flip-flop 662 will be 1/16 the frequency of the line 642 signal. Hence, after flip-flop 662, it is convenient to use a slightly different technique in which the number of required inputs to each AND gate no longer increases. The lower frequency stages after flip-flops 662 are constructed in a repetitive pattern. In each case, an AND gate detects when the normal outputs of all of the higher frequency flip-flops are high and the next low going transition of the line 642 signal should cause a transition of the particular flip-flop. The AND gate output then goes low at the next line 642 low transition and triggers the corresponding flip-flop. The signals transmitted through AND gates 665, 671, 677 and 683 are of substantially lower frequencies than that of the line 642 signal, so that the cumulative propagation delays are of no consequence and do not affect the triggering times of the flip-flops.

Flip-flops 646, 651, 656, 661, 667, 673, 679 and 685, and buffer 689 are connected to the binary counter chain to generate the desired Gray code signal pattern. Buffer 689 provides a propagation delay comparable to that of a flip-flop, so that the timing of the line 690 signal will correspond to the timing of the line 691 through 698 signals. Hence, the system of FIG. 21 will generate a set of Gray code signals on lines 688 through 696 which is substantially free of any error due to propagation times through the various circuit elements of FIG. 21.

Figure 22:
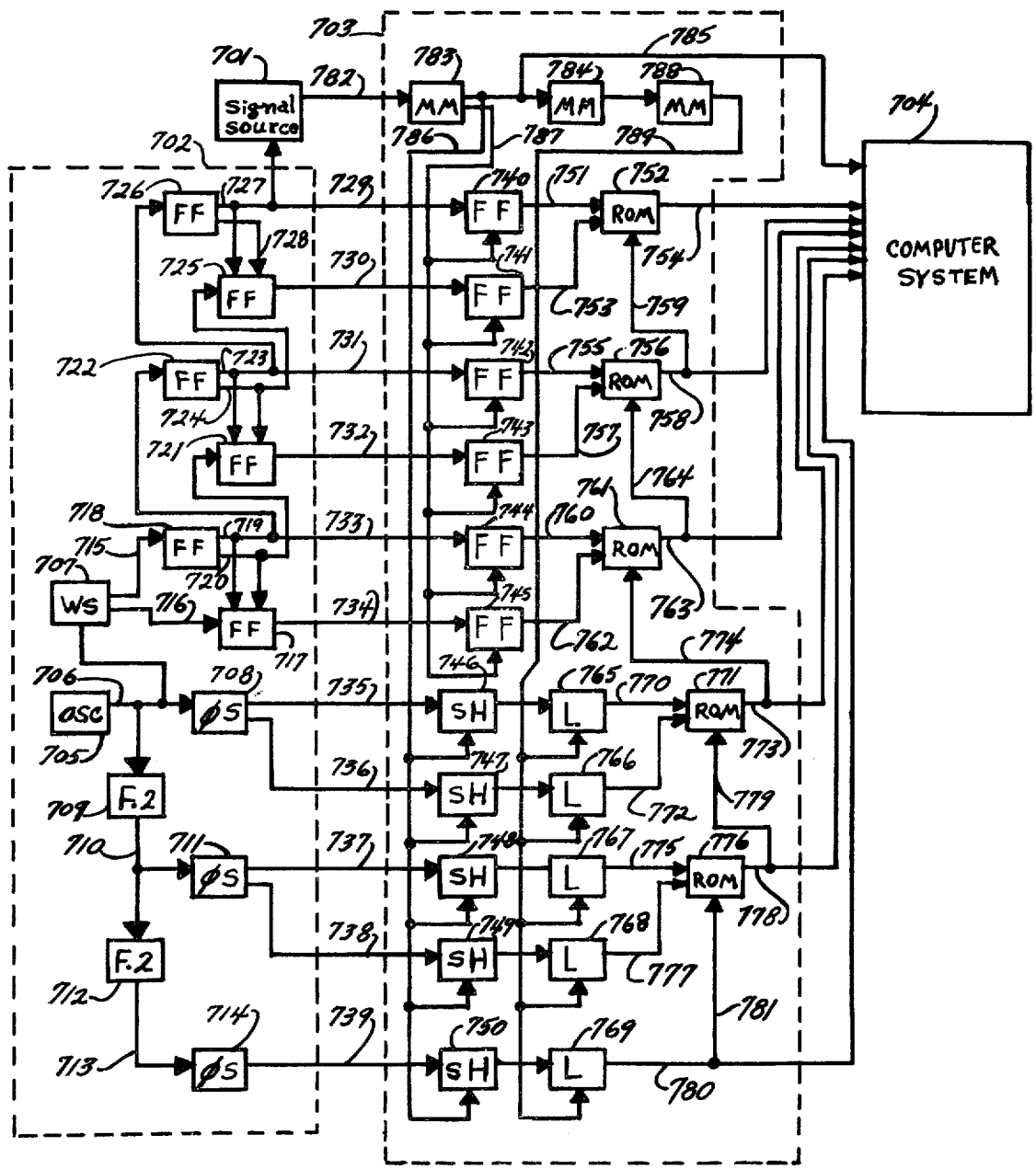
FIG. 22 is a diagrammatic illustration of a tenth form of the invention showing digital time measurement resulting in a 6-bit binary number, the use of a combination of frequency multipliers and binary counters for the generation of multiple frequency timing signals, the use of an intermediate two-phase code for the resolution of ambiguities and the use of a read-only memory in the ambiguity resolution circuits.

FIG. 22 is a diagrammatic illustration of a tenth form of the invention showing digital time measurement resulting in a 6-bit binary number, the use of a combination of frequency multipliers and binary counters for the generation of multiple frequency timing signals, the use of an intermediate two-phase code for the resolution of ambiguities and the use of a read-only memory in the ambiguity resolution circuits. FIG. 22 includes a signal source 701, an oscillator section 702, a sampling section 703 and a digital computer system 704. Within oscillator section 702, oscillator 705 is connected via line 706 to the input of wave shaper 707, to the input of phase shift 708 and to the input of frequency doubler 709. The output of frequency doubler 709 is connected via line 710 to the input of phase shift 711 and to the input of frequency doubler 712. The output of frequency doubler 712 is connected via line 713 to the input of phase shift 714. A first output of wave shaper 707 is connected via line 715 to the clock input of flip-flop 718. A second output of wave shaper 707 is connected via line 716 to the clock input of flip-flop 717. The output of flip-flop 717 is connected to line 734. A first output of flip-flop 718 is connected via line 719 to a first data input of flip-flop 717, to the clock input of flip-flop 722 and to line 733. A second output of flip-flop 718 is connected via line 720 to a second data input of flip-flop 717 and to the clock input of flip-flop 721. The output of flip-flop 721 is connected to line 732. A first output of flip-flop 722 is connected via line 723 to a first data input of flip-flop 721, to the clock input of flip-flop 726 and to line 731. A second output of flip-flop 722 is connected via line 724 to a second data input of flip-flop 721 and to the clock input of flip-flop 725. The output of flip-flop 725 is connected to line 730. A first output of flip-flop 726 is connected via line 727 to a first data input of flip-flop 725, to a signal input of signal source 701 and to line 729. A second output of flip-flop 726 is connected via line 728 to a second data input of flip-flop 725. The two outputs of phase shift 708 are connected to lines 735 and 736. Similarly, the two ouputs of phase shift 711 are connected to lines 737 and 738, and the output of phase shift 714 is connected to line 739. Within sampling section 703, lines 729, 730, 731, 732, 733 and 734 are connected to the signal inputs of flip-flops 740, 741, 742, 743, 744 and 745, respectively. Lines 735, 736, 737, 738 and 739 are connected to the signal inputs of sample-and-hold elements 746, 747, 748, 749 and 750, respectively. The output of flip-flop 740 is connected via line 751 to a first input of read-only memory 752. The output of flip-flop 741 is connected via line 753 to a second input of read-only memory 752, whose output is connected to line 754. The output of flip-flop 742 is connected via line 755 to a first input of read-only memory 756. The output of flip-flop 743 is connected via line 757 to a second input of read-only memory 756. The output of read-only memory 756 is connected to line 758 and, via line 759, to a third input of read-only memory 752. The output of flip-flop 744 is connected via line 760 to a first input of read-only memory 761. The output of flip-flop 745 is connected via line 762 to a second input of read-only memory 761. The output of read-only memory 761 is connected to line 763 and, via line 764, to a third input of read-only memory 756. The outputs of sample-and-hold elements 746, 747, 748, 749 and 750 are connected to the signal inputs of latches 765, 766, 767, 768 and 769, respectively. The output of latch 765 is connected via line 770 to a first input of read-only memory 771. The output of latch 766 is connected via line 772 to a second input of read-only memory 771. The output of read-only memory 771 is connected to line 773 and, via line 774, to a third input of read-only memory 761. The output of latch 767 is connected via line 775 to a first input of read-only memory 776. The output of latch 768 is connected via line 777 to a second input of read-only memory 776. The output of read-only memory 776 is connected to line 778 and, via line 779, to a third input of read-only memory 771. The output of latch 769 is connected to line 780 and, via line 781, to a third input of read-only memory 776. Lines 754, 758, 763, 773, 778 and 780 are connected to signal inputs of digital computer system 704. Signal source 701 is connected via line 782 to the input of monostable multivibrator 783. A first output of monostable multi-vibrator 783 is connected to the input of monostable multi-vibrator 784, via line 785 to a control signal input of computer system 704, and via line 786 to the control inputs of sample-and-hold elements 746, 747, 748, 749 and 750. A second output of monostable multivibrator 783 is connected via line 787 to the control inputs of flip-flops 740, 741, 742, 743, 744 and 745. The output of monostable multivibrator 784 is connected to the input of monostable multivibrator 788, whose output is connected via line 789 to the control inputs of latches 765, 766, 767, 768 and 769.

FIGS. 17 and 19 have shown systems which use binary counter elements for the generation of multiple frequency oscillator section output signals. The use of binary counter elements is convenient as they normally require little or no adjustment and are available as low cost integrated circuit devices. However, at the present time, commercially available binary counter elements are not capable of operating at frequencies as high as those of some other known forms of frequency multipliers and dividers. FIG. 22 illustrates a system in which binary counter elements are used to generate the lower frequency oscillator section output signals, and frequency multipliers are used to generate the higher frequency oscillator section output signals. The result is a combination system which allows the high oscillator section signal frequencies and corresponding fine time resolution of a frequency multiplier system, while retaining at least part of the relative simplicity and economy of a binary counter system.

Signal source 701 is a source of a signal on line 782 whose time is to be measured. Signal source 701 may be, for example, of the form of radar system 11 of FIG. 1. Signal source 701 is synchronized to oscillator section 702 via the line 727 signal. The functions and operation of the system of FIG. 22 generally resemble the functions and operation of the systems of FIGS. 1 and 17. The transmission of digital output data to computer system 704 via lines 754, 758, 763, 773, 778 and 780 is similar to the transmission of digital data via lines 73 through 76 to computer system 14 of FIG. 1, except for the obvious difference that sampling section 703 transmits a six-bit data word to computer system 704 while sampling section 13 transmits a four-bit data word to computer system 14. The most significant bit signal is on line 754 and the least significant bit signal is on line 780. The network of monostable multivibrators 783, 784 and 788 is similar to the network of monostable multivibrators 78, 79 and 83 of FIG. 1, except for the use of complementary outputs from monostable multivibrator 783. The response of sampling section 703 to a time signal on line 782 and the generation of a control signal pulse on line 785 is similar to the response of sampling section 13 to a time signal on line 77 and the generation of a control signal pulse on line 81. The general operation of multivibrators 783, 784 and 788 is as illustrated in FIGS. 2A–2C and described in connection with the system of FIG. 1. The various flip-flop and latch elements in FIG. 22 may be, for example, standard 7,400 series TTL integrated circuit devices.

Within oscillator section 702, oscillator 705, frequency multipliers 709 and 712 and phase shifts 708, 711 and 714 generate a set of two-phase oscillator section output signals on lines 735 through 739 in a manner generally similar to the generation of a set of two-phase oscillator section output signals on lines 30 through 36 by oscillator section 12 of FIG. 1. Flip-flops 717, 718, 721, 722, 725 and 726 generate a set of two-phase oscillator section output signals on lines 729 throughh 734 in the general manner that oscillator section 522 of FIG. 17 generates a similar set of two-phase output signals on lines 544 through 549. The two sets of two-phase signals, on lines 729 through 734 and lines 735 through 739, are synchronized as they are both generated from the output signal of oscillator 705 and form in combination a single set of two-phase oscillator section output signals. Wave shaper 707 generates complementary, rectangular wave logic level signals on lines 715 and 716, corresponding to the line 706 signal, to drive the flip-flop chain.

Within sampling section 703, a line 782 time signal will trigger monostable multivibrator 783. The line 786 output of monostable multivibrator 783 is normally high and goes low during the pulse time. This low pulse is conected via line 785 to computer system 704. The line 785 pulse indicates to computer 704 that a time measurement is in the process of being made. Valid data is available after the end of the line 785 pulse. The low pulse on line 786 causes sample-and-hold elements 746 through 750 to retain the input signal values on lines 735 through 739 at a time corresponding to the time of the line 782 time signal. At the same time, the complementary positive going signal on line 787 causes flip-flops 740 through 745 to sample and hold the values of the logic level signals on lines 729 through 734 at a time corresponding to the line 782 time signal. The output signal polarities of sample-and-hold elements 746 through 750 are then sampled by latches 765 through 769 under the control of the line 789 control signal. The signals on lines 751, 753, 755, 757, 760, 762, 770, 772, 775, 777 and 780 are then a two-phase intermediate code representation of a six-bit binary number corresponding to the time of the line 782 time signal. The conversion of this two-phase intermediate code representation into a 6-bit normal binary number is performed in the general manner of the systems of FIGS. 1 and 17, except that read-only memories are used in place of net-works of logical gates.

Read-only memory 752 is a 3-bit input (8 word), 1-bit output read-only memory. Read-only memories which are compatible with standard TTL and other logic circuit families are available as integrated circuit devices from a number of sources, or may be constructed from discrete components. The data pattern which is stored in read-only memory 752 is shown in Table 1. Each of the eight possible Table 1

| address input values | | | line 754 |
| --- | --- | --- | --- |
| line 759 | line 751 | line 753 | data output value |
| 0 | 0 | 0 | 0 |
| 0 | 0 | 1 | 1 |
| 0 | 1 | 0 | 0 |
| 0 | 1 | 1 | 1 |
| 1 | 0 | 0 | 0 |
| 1 | 0 | 1 | 0 |
| 1 | 1 | 0 | 1 |
| 1 | 1 | 1 | 1 |

Data Values for Read-Only Memory 752 of FIG. 22. combinations of the line 751, 753 and 759 data values will cause the generation of a predetermined data signal on line 754. As may be seen from Table 1, when the line 759 signal is low, the data output value is the same as the line 753 input signal and is independent of the line 751 signal. When the line 759 signal is high, the data output value is the same as the line 751 signal and is independent of the line 753 signal. Thus, the effective operation of read-only memory 752 is that when the line 759 signal is high, the line 751 signal is selected for transmission to line 754. When the line 759 signal is low, the line 753 signal is selected for transmission to line 754. This operation is identical to the operation of gates 52, 53 and 56 of FIG. 1, which select either the line 51 or the line 55 signal for transmission to line 54, depending on the value of the line 61 signal.

Hence, read-only memory 752 is a functional equivalent of the networks of gates 52, 53 and 56. Read-only memories 756, 761, 771 and 776 have the same predetermined data pattern as read-only memory 752, and perform substantially the same signal selection process. The network of read-only memories 752, 756, 761, 771 and 776 is functionally equivalent to the networks of logical gates shown in FIGS. 1 and 17 for the ambiguity resolution and code conversion process, and performs the ambiguity resolution and code conversion operations in a crresponding manner.

Figure 23:
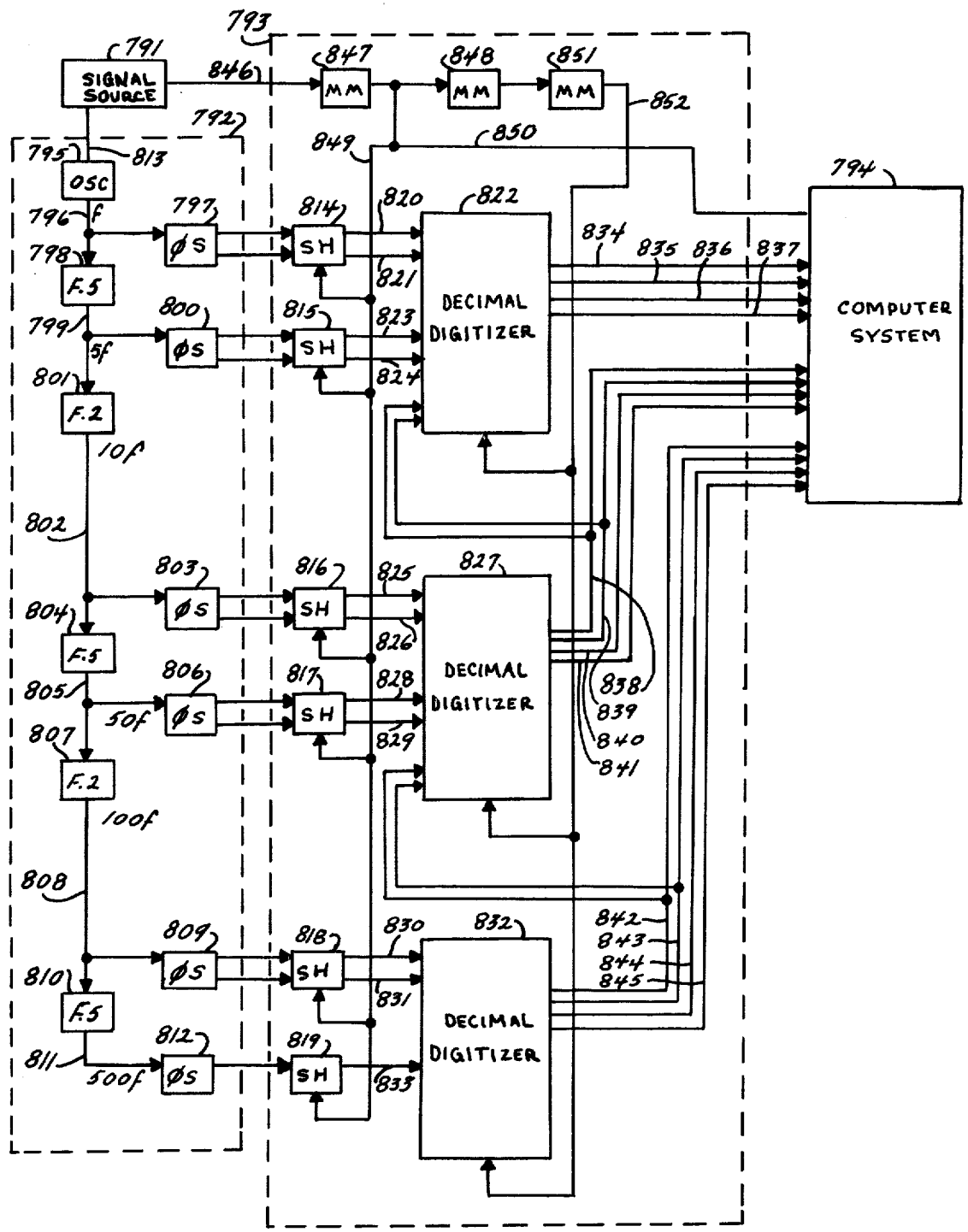
FIG. 23 is a diagrammatic illustration of an eleventh form of the invention showing digital time measurement resulting in a 3-digit decimal number, the use of frequency multipliers and the use of a read-only memory in the ambiguity resolution circuits.

FIG. 23 is a diagrammatic illustration of an eleventh form of the invention showing digital time measurement resulting in a three-digit decimal number, the use of frequency multipliers and the use of a read-only memory in the ambiguity resolution circuits. FIG. 23 includes a signal source 791, an oscillator section 792, a sampling section 793 and a digital computer system 794. Within oscillator section 792, oscillator 795 is connected via line 796 to the input of phase shift 797 and to the input of frequency multiplier 798. The output of frequency multiplier 798 is connected via line 799 to the input of phase shift 800 and to the input of frequency doubler 801. The output of frequency doubler 801 is connected via line 802 to the input of phase shift 803 and to the input of frequency multiplier 804. The output of frequency multiplier 804 is connected via line 805 to the input of phase shift 806 and to the input of frequency doubler 807. The output of frequency doubler 807 is connected via line 808 to the input of phase shift 809 and to the input of frequency multiplier 810. The output of frequency multiplier 810 is connected via line 811 to the input of phase shift 812. Oscillator 795 is connected via line 813 to signal source 791. Within sampling section 793, the two outputs of phase shift 797 are connected to the two signal inputs of dual sample-and-hold element 814. Similarly, the two outputs of phase shift 800 are connected to the two signal inputs of dual sample-and-hold element 815, the two outputs of phase shift 803 are connected to the two signal inputs of dual sample-and-hold element 816, the two outputs of phase shift 806 are connected to the two signal inputs of dual sample-and-hold element 817, the two outputs of phase shift 809 are connected to the two signal inputs of dual sample-and-hold element 818 and the output of phase shift 812 is connected to the signal input of sample-and-hold element 819. The two outputs of dual sample-and-hold element 814 are connected via lines 820 and 821 to first and second inputs of decimal digitizer 822. The two outputs of dual sample-and-hold element 815 are connected via lines 823 and 824 to third and fourth inputs of decimal digitizer 822. The two outputs of dual sample-and-hold element 816 are connected via lines 825 and 826 to first and second inputs of decimal digitizer 827. The two outputs of dual sample-and-hold element 817 are connected via lines 828 and 829 to third and fourth inputs of decimal digitizer 827. The two outputs of dual sample-and-hold element 818 are connected via lines 830 and 831 to first and second inputs of decimal digitizer 832. The output of sample-and-hold element 819 is connected via line 833 to a third input of decimal digitizer 832. The four outputs of decimal digitizer 822 are connected via lines 834, 835, 836 and 837 to first, second, third and fourth signal inputs of digital computer system 794. The four outputs of decimal digitizer 827 are connected via lines 838, 839, 840 and 841 to fifth, sixth, seventh and eighth signal inputs of computer system 794. Lines 838 and 839 are also connected to fifth and sixth inputs of decimal digitizer 822. The four outputs of decimal digitizer 832 are connected via lines 842, 843, 844 and 845 to ninth, tenth, eleventh and twelfth signal inputs of computer system 794. Lines 842 and 843 are also connected to fifth and sixth inputs of decimal digitizer 827. Signal source 791 is connected via line 846 to the input of monostable multivibrator 847. The output of monostable multivibrator 847 is connected to the input of monostable multivibrator 848, via line 849 to the control inputs of sample-and-hold elements 814, 815, 816, 817, 818 and 819, and via line 850 to a control signal input of computer system 794. The output of monostable multivibrator 848 is connected to the input of monostable multivibrator 851, whose output is connected via line 852 to control signal inputs of decimal digitizers 822, 827 and 832.

The previously described digital time measurement systems have been arranged for the generation of the output data in a binary form. The binary digital output of a binary digital time measurement system can be converted into decimal or some other desired radix by digital or logical operations upon the digital data. However, in some instances, it may be desirable to perform the digital time measurement itself in a non-binary radix. FIG. 23 is an illustration of a form of the subject invention arranged as a decimal digital time measurement system.

Signal source 791 is a source of a pulse signal on line 846 whose time is to be measured. Signal source 791 may be, for example, of the form of radar system 11 of FIG. 1. The functions and operation of the system of FIG. 23 are generally similar to the functions and operation of the system of FIG. 1. The response of sampling section 793 to a pulse signal on line 846 and the generation of a control signal on line 850 are similar to the response of converter 13 to a pulse signal on line 77 and the generation of a control signal on line 81. Digital data is transmitted to computer system 794 via lines 834 through 845 in a manner similar to the transmission of digital data to computer system 14 via lines 73 through 76. Oscillator 795 and signal source 791 are synchronized via line 813. As in the case of the system of FIG. 1, the synchronization may be in either direction. The line 796 oscillator 795 output signal of frequency f is connected to phase shift 797, whose two outputs correspond to $\cos(\omega t)$ and $\sin(\omega t)$. Frequency multiplier 798 multiplies the frequency of its input signal by a factor of 5, so that the line 799 signal connected to the input of phase shift 800 is of frequency 5f. The two outputs of phase shift 800 correspond to $\cos(5\omega t)$ and $\sin(5\omega t)$. Frequency doubler 801 multiplies the frequency of its input signal by a factor of 2, so that the line 802 signal connected to the input of phase shift 803 has a frequency of 10f. The two outputs of phase shift 803 correspond to $\cos(10\omega t)$ and $\sin(10\omega t)$. Frequency multiplier 804 multiplies the frequency of its input signal by a factor of 5, so that the line 805 signal connected to the input of phase shift 806 has a frequency of 50f. The two outputs of phase shift 806 corresponds to $\cos(50\omega t)$ and $\sin(50\omega t)$. Frequency doubler 807 multiplies the frequency of its input signal by a factor of 2, so that the line 808 signal connected to the input of phase shift 809 has a frequency of 100f. The two outputs of phase shift 809 correspond to $\cos(100\omega t)$ and $\sin(100\omega t)$. Frequency multiplier 810 multiplies the frequency of its input signal by a factor of 5, so that the line 811 signal connected to the input of phase shift 812 has a frequency of 500f. The output of phase shift 812 corresponds to $\sin(500\omega t)$.

Dual sample-and-hold elements 814, 815, 816, 817 and 818 each consist of two individual analog sample-and-hold elements, which sample and hold the signals on their signal input lines under the control of the line 849 control signal. Decimal digitizers 822 and 827 are shown in greater detail in FIG. 26 and will be subsequently described further. Decimal digitizer 832 is shown in greater detail in FIG. 24 and will be subsequently described further.

The operation of the latches within decimal digitizers 822, 827 and 832 under the control of the line 852 control signal is in the general manner illustrated in FIGS. 2A-2C and described in connection with the system of FIG. 1. The time difference between the line 849 control signal and the line 852 control signal is such that the outputs of the amplifiers within decimal digitizers 822, 827 and 832 will have had time to stabilize at values corresponding to the sampled values of the oscillator section 792 output signals before the sampling operation of the latches within decimal digitizers 822, 827 and 832 under the control of the line 852 signal.

When signal source 791 generates a pulse signal on line 846 initiating a time measurement operation, sampling section 793 samples the oscillator section 792 output signals at that time via sample-and-hold elements 814 through 819. Shortly thereafter, a 3-digit decimal number corresponding to the time of the line 846 pulse signal is transmitted to computer system 794 via lines 834 through 845. The three-digit decimal number is in the form of three binary coded decimal digits on twelve lines. The most significant decimal digit is transmitted on lines 834, 835, 836 and 837, with the most significant bit signal on line 834 and the least significant bit signal on line 837. Similarly, the middle decimal digit is transmitted on lines 838, 839, 840 and 841, with the most significant bit signal on line 838 and the least significant bit signal on line 841, and the least significant decimal digit is transmitted on lines 842, 843, 844 and 845, with the most significant bit signal on line 842 and the least significant bit signal on line 845. For part of the ambiguity resolution process, the line 838 and 839 signals are connected to inputs of decimal digitizer 822, and the line 842 and 843 signals are connected to inputs of decimal digitizer 827.

Figure 24:
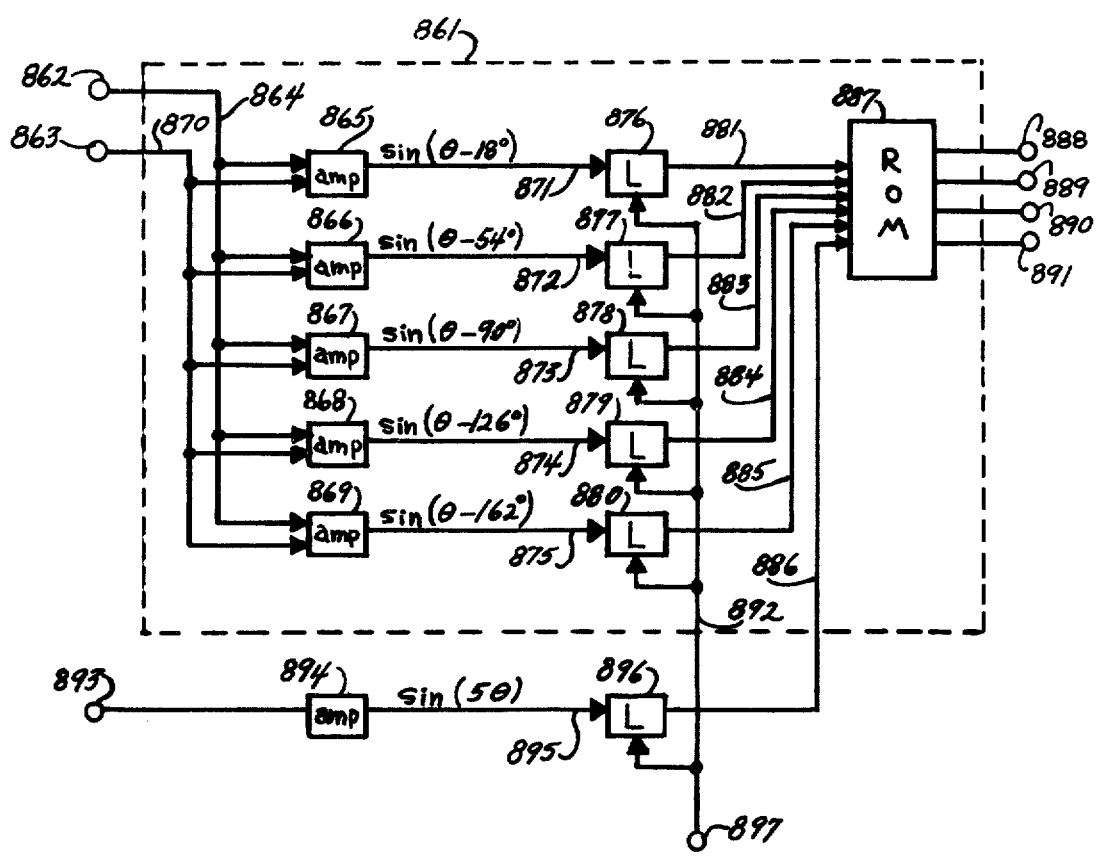
FIG. 24 is a diagrammatic illustration of a first form of a decimal digitizer circuit which may be used for one of the decimal digitizers sin the system of FIG. 23.

FIG. 24 is a diagrammatic illustration of a first form of decimal digitizer circuit, which may be used for decimal digitizer 832 of FIG. 23. FIG. 24 includes digitizer section 861, signal input terminals 862, 863 and 893, control input terminal 897 and output terminals 888, 889, 890 and 891. Terminal 862 is connected via line 864 to a first input of each of amplifiers 865, 866, 867, 868 and 869. Terminal 863 is connected via line 870 to a second input of each of amplifiers 865, 866, 867, 868 and 869. The outputs of amplifiers 865, 866, 867, 868 and 869 are connected via lines 871, 872, 873, 874 and 875, respectively, to the signal inputs of latches 876, 877, 878, 879 and 880, respectively. The outputs of latches 876, 877, 878, 879 and 880 are connected via lines 881, 882, 883, 884 and 885 to a first, second, third, fourth and fifth input, respectively, of read-only memory 887. The four signal outputs of read-only memory 887 are connected to terminals 888, 889, 890 and 891. Terminal 893 is connected to the input of amplifier 894, whose output is connected via line 895 to a signal input of latch 896. The output of latch 896 is connected to line 886, which is connected to a sixth input of read-only memory 887. Terminal 897 is connected to a control input of latch 896 and, via line 892, to a control input of each of latches 876, 877, 878, 879 and 880.

When the circuit of FIG. 24 is used for decimal digitizer 832 of FIG. 23, input terminals 862, 863 and 893 would be connected to lines 830, 831 and 833, respectively. Output terminals 888, 889, 890 and 891 would be connected to lines 842, 843, 844 and 845, respectively. Control signal terminal 897 would be connected to control line 852. Amplifiers 865, 866, 867, 868, 869 and 894 may be of the general form of FIGS. 13, 14 and 15. The input signals on terminals 862, 863 and 893 correspond to $\cos(\theta)$, $\sin(\theta)$ and $\sin(5\theta)$, respectively, where $\theta$ is the angle to be converted into a decimal digit by the circuit of FIG. 24. The functions of amplifiers 865, 866, 867, 868, 869 and 894 are to generate logic level signals corresponding to the polarities of the $\sin(-\theta-18°)$, $\sin(\theta-54°)$, $\sin(\theta-90°)$, $\sin(\theta-126°)$, $\sin(-\theta-162°)$ and $\sin(5\theta)$ functions, respectively. Latches 876, 877, 878, 879, 880 and 896 may be, for example, standard 7,400 series TTL integrated circuit devices.

From trigonometry:
$\sin(x+y) = \cos(y)\sin(x) + \sin(y)\cos(x)$
$\sin(\theta-18°) = \cos(-18°)\sin(\theta) + \sin(-18°)\cos(\theta)$
$\sin(\theta-18°) = 0.951 \sin(\theta) - 0.309 \cos(\theta)$ Hence, generating a logic level signal corresponding to the polarity of the $(0.951 \sin(\theta) - 0.309 \cos(\theta))$ function is equivalent to generating a logic level signal corresponding to the polarity of the $\sin(\theta-18°)$ function. If the circuit of FIG. 13 is used for amplifier 865, a $\sin(\theta)$ signal would be applied to terminal 366, a $\cos(\theta)$ signal would be applied to terminal 367, and resistors 368 and 371 would have a ratio of substantially 0.309 to 0.951 to provide the desired relative weighting of the sine and cosine signal components. Table 2 lists the corresponding sine function relationships for the five functions whose polarities are sensed by amplifiers 865, 866, 867, 868 and 869.

Table 2

| | |
|---|---|
| $\sin(\theta-18°)$ | $= .951 \sin(\theta) - .309 \cos(\theta)$ |

Table 2-Continued

| | |
|---|---|
| $\sin(\theta-54°)$ | $= .588 \sin(\theta) - .809 \cos(\theta)$ |
| $\sin(\theta-90°)$ | $= - \cos(\theta)$ |
| $\sin(\theta-126°)$ | $= -.588 \sin(\theta) - .809 \cos(\theta)$ |
| $\sin(\theta-162°)$ | $= -.951 \sin(\theta) - .309 \cos(\theta)$ |

Sine Function Relationships for FIG. 24.

Amplifier 894 generates a logic level signal corresponding to the polarity of the $\sin(5\theta)$ function. Amplifier 894 may be, for example, of the general form of the circuit of FIG. 13, with the terminal 893 signal connected to terminal 366 and terminal 367 being grounded. Read-only memory 887 is a 6-bit input (64 word), four-bit output read-only memory. Suitable read-only memories, compatible with 7,400 series TTL integrated circuit devices, are commercially available from a number of semiconductor device suppliers. The data pattern in read-only memory 889 will be described subsequently.

When a digital time measurement is to be performed, a control signal pulse from monostable multivibrator 851 on line 852 and terminal 897 will cause latches 876, 877, 878, 879, 880 and 896 to sample and hold their respective signal input values. Read-only memory 887 converts the logic level signals on lines 881 through 886 into a 4-bit binary coded decimal digit on terminals 888 through 891. Read-only memory 887 performs a function which is similar to that of the network of logical gates between latches 44 through 50 and binary data output lines 54, 60, 67 and 71 of FIG. 1. That is, it resolves any ambiguities and generates the desired digital number in the desired form.

FIGS. 25A through 25F illustrate the analog-to-digital conversion process of the circuit of FIG. 24 in greater detail. FIGS. 25A, 25B, 25C, 25D, 25E and 25F are plots of the signals on lines 881, 882, 883, 884, 885 and 886, respectively, of FIG. 24. FIGS. 25A-25F are plotted as functions of the value of an analog angle signal $\theta$ at the most recent time of sampling. For the description of the operation of the digitizer circuit of FIG. 24, $\theta$ is the angle signal on terminals 862 and 863, and lines 830 and 831 of FIG. 23, not the angle signal on lines 820 and 821 of FIG. 23. FIGS. 25A-25F are plotted over a 0° to 360° range of $\theta$, which is specifically marked on FIG. 25A. The $\theta$ or analog variable scale is also divided into ten segments of 36° each. The individual segments are identified as segments 0 through 9, and are specifically marked on FIG. 25B. The signals shown in FIGS. 25A-25F are logic level signals which are normally either high or low and, in general, not of an intermediate value.

Figure 25:
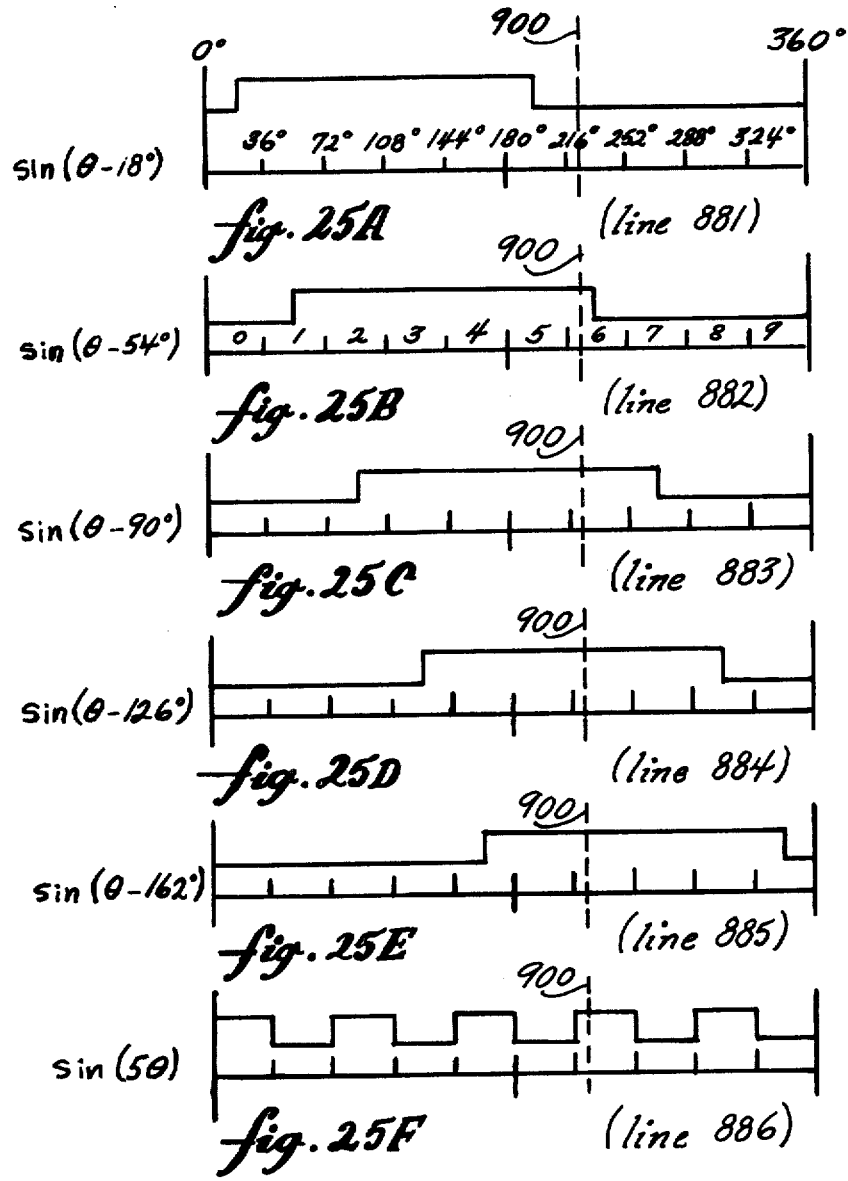
FIGS. 25A through 25F are graphical illustrations of certain logical signals within the decimal digitizer circuit of FIG. 24, plotted as functions of the angle signal being measured by that digitizer circuit.

FIG. 25A is a plot of the line 881 signal, the output of latch 876, corresponding to the polarity of the $\sin(-\theta-18°)$ function at the most recent time of sampling by latch 876. FIGS. 25B through 25F are similar plots of the line 882 through 886 signals, corresponding to the polarities of the $\sin(\theta-54°)$, $\sin(\theta-90°)$, $\sin(\theta-126°)$, $\sin(\theta-162°)$ and $\sin(5\theta)$ functions at the most recent time of sampling by latches 877, 878, 879, 880 and 896, respectively. The function of FIG. 25A is low through the midpoint of segment 0, then high through the midpoint of segment 5, and then low through the end of the plot. The function of FIG. 25B is low through the midpoint of segment 1, then high through the midpoint of segment 6, and then low for the remainder of the plot. The functions of FIGS. 25C, 25D and 25E are similarly high for an interval of approximately five segments, with the individual transition points being staggered as shown in FIGS. 25A–25F. FIG. 25F is a plot of the line 886 signal, corresponding to the polarity of the sin(5θ) function, and has a transition at the end of each of the 36° angular segments.

The overall process of the conversion of the FIG. 25A–25F signals into decimal digital values is synchronized by the FIG. 25F sin(5θ) signal. The data values which are set into read-only memory 887 of FIG. 24 are listed in Table 3. Only 20 of the 64 possible input value combinations are listed in Table 3. This is because, in normal operation, only these 20 combinations will occur. The Table 3

| angular segment number | address input values | | | | | | Data output values | | | |
|---|---|---|---|---|---|---|---|---|---|---|
|  | A | B | C | D | E | F | 8 | 4 | 2 | 1 |
| 0 | 0 | 0 | 0 | 0 | 0 | 1 | 0 | 0 | 0 | 0 |
|   | 1 | 0 | 0 | 0 | 0 | 1 |   |   |   |   |
| 1 | 1 | 0 | 0 | 0 | 0 | 0 | 0 | 0 | 0 | 1 |
|   | 1 | 1 | 0 | 0 | 0 | 0 |   |   |   |   |
| 2 | 1 | 1 | 0 | 0 | 0 | 1 | 0 | 0 | 1 | 0 |
|   | 1 | 1 | 1 | 0 | 0 | 1 |   |   |   |   |
| 3 | 1 | 1 | 1 | 0 | 0 | 0 | 0 | 0 | 1 | 1 |
|   | 1 | 1 | 1 | 1 | 0 | 0 |   |   |   |   |
| 4 | 1 | 1 | 1 | 1 | 0 | 1 | 0 | 1 | 0 | 0 |
|   | 1 | 1 | 1 | 1 | 1 | 1 |   |   |   |   |
| 5 | 1 | 1 | 1 | 1 | 1 | 0 | 0 | 1 | 0 | 1 |
|   | 0 | 1 | 1 | 1 | 1 | 0 |   |   |   |   |
| 6 | 0 | 1 | 1 | 1 | 1 | 1 | 0 | 1 | 1 | 0 |
|   | 0 | 0 | 1 | 1 | 1 | 1 |   |   |   |   |
| 7 | 0 | 0 | 1 | 1 | 1 | 0 | 0 | 1 | 1 | 1 |
|   | 0 | 0 | 0 | 1 | 1 | 0 |   |   |   |   |
| 8 | 0 | 0 | 0 | 1 | 1 | 1 | 1 | 0 | 0 | 0 |
|   | 0 | 0 | 0 | 0 | 1 | 1 |   |   |   |   |
| 9 | 0 | 0 | 0 | 0 | 1 | 0 | 1 | 0 | 0 | 1 |
|   | 0 | 0 | 0 | 0 | 0 | 0 |   |   |   |   | angular segment numbers listed in Table 3 correspond to the angular segment numbers plotted in FIG. 25B. Address input values A, B, C, D, E and F correspond to the functions plotted in FIGS. 25A through 25F, and the signals on lines 881 through 886, respectively. The data output value columns labeled 8, 4, 2 and 1 correspond to output terminals 888, 889, 890 and 891, respectively. The headings of the data output value columns are the weightings given to the particular bits in the binary coded decimal pattern.

As an example, consider the digital measurement of an analog signal with a value of slightly more than 6/10 of full scale at the time of sampling as indicated by dotted line 900 in FIGS. 25A–25F. The line 881 signal will be low, and the line 882 through 886 signals will be high as shown in FIGS. 25A–25F. Referring to Table 3, this combination of address input values corresponds to angular segment number 6, and will generate data output values of 0110, a binary coded decimal 6. Thus, the system of FIG. 24 has performed an analog-to-digital conversion of the signal represented by dotted line 900. The system of FIG. 24 will generate binary coded decimal values from 0 through 9 for angle signal inputs over a range of 0° to 360°.

The system of FIG. 24 has several similarities to the two-phase code ambiguity resolution process shown in FIG. 1. The FIG. 25A through 25E, line 881 through 885 signals are a "low speed" or more significant signal set, while the FIG. 25F, line 886 signal is a "high speed" or less significant signal. The only one of the FIG. 25A through 25E signals which changes value within angular segment 6 is the FIG. 25B, line 882 signal. As may be seen from Table 3, the value of address input B, the FIG. 25B, line 882 signal, does not affect the data output of read-only memory 887 when the other input signals correspond to angular segment 6. In general, the exact transition points of the FIG. 25A through 25E signals will not affect the exact transition points between adjacent digital values. The transition points between adjacent digital values are determined by the transitions of the "high speed" FIG. 25F, line 886 signal.

When the circuit of FIG. 24 is used for decimal digitizer 832 of FIG. 23, the angle signal which it converts into a decimal digit is 100 times the angle signal on lines 820 and 821. Hence, decimal digitizer 832 will provide the least significant digit of a 3-digit decimal number corresponding to the time of the line 846 signal.

Figure 26:
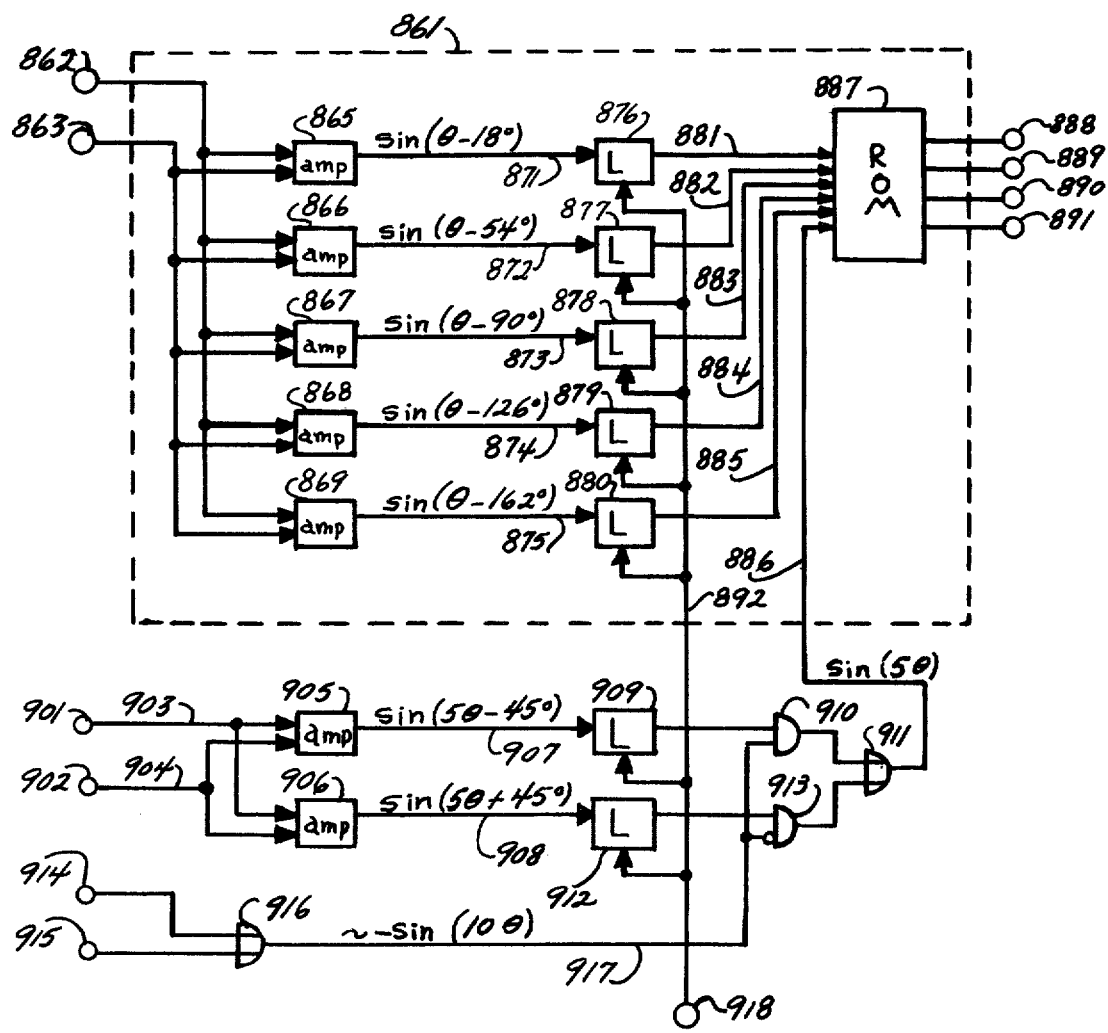
FIG. 26 is a diagrammatic illustration of a second form of decimal digitizer circuit, which may be used for certain decimal digitizers in the system of FIG. 23.

FIG. 26 is a diagrammatic illustration of a second form of decimal digitizer circuit, which may be used for decimal digitizers 822 and 827 in the system of FIG. 23. FIG. 26 includes digitizer section 861, signal input terminals 862, 863, 901, 902, 914 and 915, control input terminal 918 and signal output terminals 888, 889, 890 and 891. Digitizer section 861 is identical to digitizer section 861 of FIG. 24, and operates in a substantially identical manner. Signal input terminals 862 and 863, lines 881 through 886, read-only memory 887, terminals 888 through 891 and line 892 are equivalent to the similarly numbered elements of digitizer section 861 of FIG. 24. Terminal 901 is connected via line 903 to a first input of amplifier 905 and to a first input of amplifier 906. Terminal 902 is connected via line 904 to a second input of amplifier 905 and to a second input of amplifier 906. The output of amplifier 905 is connected via line 907 to a signal input of latch 909, whose output is connected to a first input of AND gate 910. The output of AND gate 910 is connected to a first input of OR gate 911, whose output is connected to line 886. The output of amplifier 906 is connected via line 908 to a signal input of latch 912, whose output is connected to a first input of AND gate 913. The output of AND gate 913 is connected to a second input of OR gate 911. Terminals 914 and 915 are connected to the two inputs of OR gate 916, whose output is connected via line 917 to second inputs of AND gates 910 and 913. Terminal 918 is connected to a control input of each of latches 909 and 912 and, via line 892, to a control input of each of the five latches of digitizing section 861.

If the circuit of FIG. 26 is used for decimal digitizer 822 of FIG. 23, input terminals 862, 863, 901, 902, 914 and 915 would be connected to lines 820, 821, 823, 824, 838 and 839, respectively. Output terminals 888, 889, 890 and 891 would be connected to lines 834, 835, 836 and 837, respectively. If the circuit of FIG. 26 is used for decimal digitizer 827 of FIG. 23, input terminals 862, 863, 901, 902, 914 and 915 would be connected to lines 825, 826, 828, 829, 842 and 843, respectively. Output terminals 888, 889, 890 and 891 would be connected to lines 838, 839, 840 and 841, respectively. In both cases, control signal terminal 918 would be connected to control line 852.

The arrangement and operation of the circuit of FIG. 26 generally resembles the arrangement and operation of the circuit of FIG. 24. In both cases, the object is to convert an angle signal θ, which is applied as cos(θ) and sin(θ) component signals to input terminals 862 and 863, into a corresponding decimal digit. The principal difference of the circuit of FIG. 26 is that it includes additional circuits whereby the transitions between the various decimal values are synchronized with the transitions between the values of 9 and 0 of a similar decimal digitizer circuit used for generating the adjacent less significant decimal digit. Digitizer section 861 of FIG. 26 is substantially identical to digitizer section 861 of FIG. 24. All of the elements numbered below 900 are substantially identical to the like numbered elements in FIG. 24. Only the elements numbered 901 and above are unique to FIG. 26.

In the circuit of FIG. 24, a sin(5θ) signal is applied to terminal 893. A corresponding logic level signal is generated on line 886 to synchronize the operation of digitizer section 861. In the circuit of FIG. 26, a logic level signal whose value corresponds to the polarity of the sin(5θ) function is generated on line 886 in such a manner that the transitions of this signal are controlled by the 9 through 0 transitions of the adjacent less significant decimal digit. The terminal 914 signal is the 8 bit of the adjacent less significant decimal digit, and the terminal 915 signal is the 4 bit of the adjacent less significant digit. The line 917 output signal of OR gate 916 will be a logic level signal which will be low when the value of the adjacent less significant decimal digit is 0 through 3, and high when the adjacent less significant digit is 4 through 9. This signal generally corresponds to the polarity of the −sin(10θ) function. The high to low transition of the line 917 signal, for an increasing value of θ, corresponds exactly to the positive to negative transition of the −sin(10θ) function. The low to high transition of the line 917 signal occurs slightly earlier than the negative to positive transition of the −sin(10θ) function.

The terminal 901 and 902 signals correspond to cos(5θ) and sin(5θ), respectively. Amplifiers 905 and 906 may be of the general form of the circuits shown in FIGS. 13 and 14, and generate signals corresponding to sin(5θ−45°) and sin(5θ+45°) on lines 907 and 908, respectively. The output signals of latches 909 and 912 are logic level signals whose values correspond to the polarities of the line 907 sin(5θ−45°) and line 908 sin(θ+45°) signals. The network of gates 910, 911 and 913 selects one of the latch 909 or latch 912 output signals, in accordance with the value of the line 917 signal, for transmission to line 886. The general operation of this gate network is similar to the operation of the gate network of FIG. 1. The result is the generation of a sin(5θ) signal on line 886 whose transitions are synchronized with the low going transitions of the line 917 signal, for an increasing value of θ. This synchronizes the line 886 signal with the 9 through 0 transitions of the adjacent less significant decimal digit. That the high going transitions of the line 917 signal, for an increasing value of θ, are not at precisely the right angle value is not of great significance. The value of the line 886 signal will normally change only upon the low going transitions of the line 917 signal.

If the circuit of FIG. 26 is used for decimal digitizer 827 of FIG. 23, it will generate the middle digit of a 3-digit decimal number corresponding to the time of the line 846 signal. Transitions between digital values generated by digitizer 827 will be synchronized with the 9 through 0 transitions of the digital value generated by decimal digitizer 832. The circuit of FIG. 26 may be similarly used for decimal digitizer 822 of FIG. 23. It will then generate the most significant digit of a three-digit decimal number corresponding to the time of the line 846 signal. The digital value generated by digitizer 822 will be synchronized with the 9 through 0 transitions of the digital value generated by decimal digitizer 827 and, hence, with the 9 through 0 transitions of the digital value generated by decimal digitizer 832.

The preceding disclosure has shown features of the subject invention arranged in various specific combinations. Other combinations of such features may be devised to meet particular requirements. For example, the system of FIG. 9 is substantially a combination of the two-phase and Gray intermediate code systems shown in FIGS. 1 and 6. Other combination systems, for example, corresponding to a combination of the two-phase intermediate code binary counter system of FIG. 17 and the Gray intermediate code binary counter system of FIG. 19 may be devised. Some of the possible variations of the subject invention are described below. These variations may be applied to the subject invention individually and/or in combination.

For convenience and clarity of illustration, the digital time measurement systems shown and described herein have generally been limited to relatively short digital word lengths and correspondingly low conversion accuracies and resolutions, and/or short time measurement scales. The general techniques may be readily adapted for the design and construction of converters for other digital word lengths and, in particular, may be extended for longer digital word lengths and correspondingly higher conversion accuracies and resolutions, and/or longer time measurement scales.

The preceding disclosure has shown digital time measurement systems in which signal frequencies are multiplied by 2 and 5 and divided by two for the generation of multiple frequency timing signals. Other frequency multiplication and/or division ratios may be used in other forms of the subject invention.

The preceding disclosure has shown a number of digital time measurement systems in which the digital output data is coded in a normal binary or binary coded decimal form. The general features of the subject invention may be used for digital time measurement systems in which the digital output data is coded in other radices as may be desired. For example, the general arrangement of FIG. 23 may be used as a guide for the design of a digital time measurement system providing a digital output in such radix as may be desired. Logical circuits and counting devices which provide sets or subsets of clock signals whose frequencies are related by ratios other than successive powers of two may be used in such implementations of the subject invention.

The preceding disclosure has shown a number of digital time measurement systems in which the digital output data is coded in a normal binary or binary coded decimal form, and in which the digital output values may vary over a range from zero through some upper limit. Similar systems may be devised in which the digital output values are coded in some other desired form, for example, a Gray code, a 4-2-2-1 code, an excess three code, a two out of five code or a biquinary code. Similar systems may be devised in which the digital output values may vary through a range of negative values, in addition to or in place of a range of positive values, or a range which does not include zero.

Negative digital output values may be coded in complement, sign and magnitude or other form as may be desired. In a simple form, an extension to include a range of negative digital values may not require any change in the physical digital time measurement system. Considering a 4-bit binary number as a 2's complement value, a value of −1 is represented as 1111, −2 as 1110, etc. The entire range of a 4-bit, 2's complement representation is 1000 through 0111 or, in decimal, −8 through +7. The system of FIG. 1 has been described as a system for digital time measurement over a range of 0° to 360°, with digital output values of 0 through 15. Using the 2's complement representation described above, the system of FIG. 1 can also be used for digital time measurement over a range of −180° to +180°, with digital output values of −8 through +7.

The preceding disclosure has shown a number of systems in which a time signal source and an oscillator section are synchronized with each other. The exact time relationship of the operation of the signal source and the operation of the oscillator section may be adjusted in several ways. For example, in the system of FIG. 1, the relative timing of radar system 11 and oscillator 17 may be adjusted by placing a phase shift element in line 29 so as to allow adjustment of the relative phase of the line 29 synchronizing signal. Such an adjustment may be used regardless of whether the synchronization is of radar system 11 to oscillator 17, or of oscillator 17 to radar system 11. In general, a variety of signal processing and offset techniques may be used on the synchronizing signal(s) transmitted between a time signal source and an oscillator section of various forms of the subject invention, to provide means for the adjustment of the relative time scale of the digital time measurement.

Digital offset techniques may be used to provide an effective offset or adjustment of the digital time measurement scale to the operation of a time signal source. For example, in the system of FIG. 1, logical or digital processing means may be connected between lines 54, 60, 67 and 71, and computer system 14 and display 15. The logical processing means would add or subtract a numerical value from the line 54, 60, 67 and 71 signals, and transmit the offset digital value to computer system 14 and display 15. The offset value may be constant or variable, depending on the system requirements. In the system of FIG. 1, such offset techniques may be used to adjust the digital time measurement system so that a digital output value of zero corresponds to a zero radar range, or such other condition as may be desired.

The preceding disclosure has mentioned from time to time that standard 7,400 series TTL integrated circuit devices may be used for various logical and digital elements in implementations of the subject invention. These references to 7,400 series TTL devices are because of the present wide usage and common availability of these devices. The subject invention is not limited to implementations with 7,400 series TTL devices, or similar devices, and may be implemented with various types of present and/or future logical and digital elements and devices as may be desired.

At the present time, logical and digital elements and devices are predominantly of a binary or two-state nature. That is, the input and output signals are normally of one of two possible values and, in general, not of intermediate or other values. Some logical elements and devices have been devised which operate with more than two possible normal signal values. The concepts of the subject invention may be implemented with non-binary or non-two-state digital and logical elements and devices if so desired.

The preceding disclosure has shown and described analog multiplier, linear amplifier, integrator and polarity detection circuit elements. Other present and/or future analog circuit elements and devices may be used to provide analog signal operations for the subject invention.

Signal sampling devices such as used in the systems shown and described in this disclosure are generally either analog sampling devices, for the sampling of analog signals, or digital sampling devices for the sampling of digital signals. An analog sampling device is typically capable of sampling and holding an analog signal which may have any value within a range, for example, ±10 volts. However, after the sampling has been performed and the sampled value is being held, the output signal is generally subject to drift. A digital sampling device such as a latch circuit can typically retain only binary or two-state signals that are either low or high, but can generally retain such signal values for an indefinitely long period of time. There are two principal purposes for which sampling may be employed in the subject invention. The first purpose, for which sampling is employed in all forms of the subject invention, is the sampling of a plurality of oscillator section output signals at a time or times corresponding to the time signal(s) whose time(s) are to be measured. The sampled values are used for the generation of a digital time measurement signal(s) in the desired form. For this purpose, either analog or digital sampling may be employed. For example, in FIG. 1, the outputs of oscillator section 12 are sampled by analog sample-and-hold elements 37 through 43. In FIG. 17, the outputs of oscillator section 522 are sampled by digital latches 551 through 557.

The second purpose for which sampling may be employed in the subject invention is to sample and hold logical or digital signals so that a valid digital data output signal may be transmitted indefinitely. For this second purpose, digital sampling devices will usually be preferred. For example, in the system of FIG. 1, latches 44 through 50 are employed for this purpose.

In some instances, a single set of sampling elements may be used for both purposes. For example, in FIG. 19, edge triggered flip-flops 614 through 617 are used both for the sampling of the oscillator section 592 output signals, and to retain the sampled values indefinitely so that a valid digital output signal may be transmitted indefinitely on lines 621, 623, 627 and 631.

The process of recording and subsequently reproducing digital data via a digital data recorder can, in effect, provide a form of sampling operation. For example, as mentioned in the description of the system of FIG. 10, digital data receiver 233 can be a digital data recorder which from time to time samples and records the data values on lines 248 through 254. When this data is subsequently reproduced, the data values will be held for a period of time which is at least in part determined by the characteristics of the digital data reproducer. This sampling by recording process can be used in addition to or in place of sampling with analog and/or digital sampling elements as described previously. For example, if digital data receiver 233 is a suitable digital data recorder, sample-and-hold elements 234 through 240, latches 241 through 247 and monostable multivibrators 256, 257 and 260 may be deleted. Line 30 would be connected to line 248 and a signal input of digital data receiver 233. Lines 31 through 36 would be similarly connected to lines 249 through 254 and corresponding signal inputs of digital data receiver 233. Line 255 would be connected directly to line 259 and a control signal input of digital data receiver 233. Digital data receiver 233 would then record the values of the line 30 through 36 signals at the times of pulse signals on line 255 whose times were to be measured.

The preceding disclosure has shown a number of systems in which digital time measurements are performed in part by the sampling of a plurality of oscillator section output signals at a time which is to be digitally measured. In these previously described systems, the various samplings of the oscillator section signals have been performed substantially simultaneously. In some instances, it may be desirable to use a form of staggered sampling in which some number of the sampling operations are performed at times which differ from the measurement time by a controlled amount. The effective sampling time of an analog or digital sampling element may be delayed by using passive or active circuit elements to delay the sampling control signals to that sampling element. Such a staggered sampling technique may be used, for example, to reduce the number and/or complexity of the phase shift elements and the number of signal output lines of an oscillator section.

For example, in the system of FIG. 1, phase shifts 19, 22 and 25 may be simplified by eliminating the line 31, 33 and 35 outputs. The line 30, 32 and 34 outputs would be signals corresponding to $-\sin(\omega t - 45°)$, $-\sin(2\omega t - 45°)$ and $-\sin(4\omega t - 45°)$, as before. The line 31 signal input of sample-and-hold element 38 would be connected to line 30. Similarly, the line 33 and 35 signal inputs of sample-and-hold elements 40 and 42 would be connected to lines 32 and 34, respectively. The control signal input of sample-and-hold element 38 would be delayed by a time corresponding to 90° or one-fourth cycle of the line 30 signal. Similarly, the sample control signal inputs to sample-and-hold elements 40 and 42 would be delayed by times corresponding to 90° of the line 32 and 34 signals respectively. In operation, the line 80 sampling control signal would cause the immediate sampling of the line 30 signal by sample-and-hold element 37. The sample-and-hold element 37 output signal would then correspond to $-\sin(\theta - 45°)$, as in the previously described operation of the system of FIG. 1. Sample-and-hold element 38 would sample the line 30 signal one-fourth cycle later, so that the sample-and-hold element 38 output signal would correspond to $-\sin(\theta + 45°)$. Hence, the output of sample-and-hold element 38 would be the same as in the previously described operation of FIG. 1, even though oscillator section 12 no longer generated a $-\sin(\omega t + 45°)$ line 31 output signal. Similarly, the outputs of sample-and-hold elements 40 and 42 would correspond to $-\sin(2\theta + 45°)$ and $-\sin(4\theta + 45°)$. The operation of the modified system of FIG. 1 would be otherwise in accordance with the previously described operation of the system of FIG. 1. Thus, staggered sampling can be used to provide substantially the same results as the simultaneous sampling of a number of signals of the same frequency but of different phase. Other forms of staggered sampling systems may be devised to meet particular requirements.

The general arrangements shown for digital time measurements have included the generation of an intermediate digital code representation of the time signal, and the conversion of this intermediate code signal into the desired output digital value in, for example, binary or binary coded decimal form. A reason for the use of this intermediate digital code is that it allows ambiguities and errors which might otherwise occur to be automatically resolved. FIG. 1 shows the use of a two-phase binary intermediate code, FIG. 6 shows the use of a Gray binary intermediate code and FIG. 24 shows the use of a form of two-speed intermediate code. Other forms of the invention shown generally use the two-phase or Gray intermediate codes or a combination thereof. The specific intermediate codes shown and described are not the only intermediate codes which may be used for the subject invention. In general, a suitable intermediate code will be one in which it is not necessary for two or more intermediate code signal values to change simultaneously between two adjacent digital values.

In the majority of the digital time measurement systems shown in the preceding disclosure, the time resolution has been such that one digital count corresponds to the time of one half cycle of the highest frequency oscillator section output signal. FIG. 16 has shown a system in which angle multiplication techniques are used to provide a form of interpolation, to increase the time measurement resolution. In the system of FIG. 16, one digital count corresponds to one eighth cycle of the highest frequency oscillator section 427 output signals on lines 444 and 445. The interpolation is performed by an analog-to-digital conversion of a number of the sampled values of the oscillator section output signals. Other forms of analog-to-digital conversion may be similarly used to provide increased resolution. Interpolation techniques may be applied to other forms of the invention in addition to that shown in FIG. 16. For example, the interpolation system shown in FIG. 16 may be combined with the form of the invention shown in FIG. 22. The resulting system would then use digital counters to generate one section of the resulting output digital data work, frequency multipliers to generate a second section of the output digital data word and interpolation to generate a third section of the output digital data word. The increase in the digital measurement resolution obtained via interpolation may be greater than, equal to or less than that shown in FIG. 16.

The preceding disclosure has described some of the advantages of the subject invention for the measurement of times and time intervals. However, particularly for the measurement of long time intervals with corresponding digital values containing a relatively large number of bits, a simple start/stop counter offers the advantage of economy. Such a start/stop counter would normally be used by being reset to zero before an interval that is to be measured, started at the beginning of the interval and stopped at the end of the interval. It would count the number of pulses from a clock oscillator during the time interval to be measured. In some instance, it may be desirable to combine a form of the invention generally along the lines of FIG. 5 and a simple start/stop counter to obtain the advantages of the subject invention and some of the economies of a simple start/stop counter.

As an example, assume that a form of the invention is constructed generally along the lines of FIGS. 5 and 23, so as to measure time intervals in terms of a 5-digit decimal number on a scale of 10 milliseconds and with a resolution of 0.1 microseconds. In addition, a simple start/stop counter is employed to count clock pulses from a 1KHz oscillator. Assume that this combination is used to measure a time interval of 1,234,567.8 microseconds. The section of the combination constructed in accordance with the subject invention would generate a digital value of 4,567.8 microseconds. Simple start/stop counters may have errors of one or two counts in the measurement of a time interval, depending on the relative timing of the start and stop pulses and the clock oscillator pulses. Hence, the start/stop counter section of the combination would measure a value in the range of 1,232 to 1,236. Because of the overlap of the least significant digit of the start/stop counter value and the most significant digit of the digital time measurement section constructed in accordance with the subject invention, any slight inconsistencies between the two readings can be manually or automatically corrected. The start/stop counter reading would be corrected by one or two counts, if necessary, so that the least significant digit of its reading agreed with the most significant digit of the 5-digit fine reading.

The entire 8-digit reading would be assembled with the 4 most significant digits being the corrected start/stop counter reading and the 4 least significant digits being the four least significant digits of the 5-digit fine reading. In the example given, the corrected 4-digit counter reading would be 1,234, and the fine reading would be 45,678. The total reading would be 1,234,567.8 microseconds.

Thus, the combination of a simple start/stop counter, and a section constructed in accordance with the subject invention to measure time intervals on a scale of 10,000 microseconds, can be used to measure time intervals of arbitrary length. Other combinations of simple counters or other time measurement systems and various forms of the subject invention may be constructed to satisfy various particular requirements. In general, an overlap of the least significant digit(s) or bit(s) of the coarse time measurement section and the most significant digit(s) or bits(s) of the fine measurement section will allow any slight inconsistencies between the coarse and fine readings to be resolved.

FIGS. 1, 6, 9, 11, 16, 17 and 19 show the use of networks of logical gates to convert an intermediate code representation of a measured digital time value into a desired digital output form, for example, a normal binary code. FIGS. 22, 24 and 26 show the use of read-only memories for the similar purpose of converting an intermediate code representation into a desired output form. In general, networks of logical gates, read-only memories, and/or other means may be used for such code conversions. Given a set of data input lines to a logical gate network, a set of data output lines thereof, and a desired relationship between the input and output data values, there are in general many gate networks and/or logical devices that can provide the desired relationship.

Logical gate networks other than those shown in FIGS. 1, 6, 9, 11, 16, 17 and 19 may be devised to perform substantially the same functions. A logical gate network may be used in place of read-only memory 887 of FIG. 24. The network would have six data inputs lines, four data output lines and would implement the data relationship shown in Table 3. The output data values for input data values not listed in Table 3 will not normally be significant, as they will not occur in the normal operation of the system of FIG. 24.

One or more read-only memories may be substituted for the network of logical gates shown in FIG. 1. If a single read-only memory were used, it would a 7-bit input (128 word), 3-bit output read-only memory. The seven address input lines would be connected to lines 51, 55, 57, 62, 64, 69 and 71. The three data output lines would be connected to lines 54, 60 and 67. Line 71 would, as before, provide the least significant bit output signal. A suitable set of data values for the read-only memory may be determined by making a table of the 128 possible combinations of the seven address line signals and noting the output data values which would be generated by the logical gate network shown in FIG. 1. Other logical gate networks shown in other figures may be similarly replaced by a read-only memory.

As shown in FIG. 22, the code conversion process in a particular system may be implemented with more than one read-only memory. As a further example, the code conversion process in the system of FIG. 16 could be implemented with a single nine-bit input (512 word) 4-bit output read-only memory. The nine address input lines of the read-only memory would be connected to lines 482, 486, 488, 493, 495, 500, 502, 507 and 509. The four data output lines of the read-only memory would be connected to lines 485, 491, 498 and 505. Line 509 would, as before, be connected directly to a signal input of computer system 429.

The code conversion process in FIG. 16 could also be implemented with two read-only memories, each having a 5-bit input (32 words) and a 2-bit input. In this case, the address input lines of a first read-only memory would be connected to lines 482, 486, 488, 493 and 499, and its two data output lines would be connected to lines 485 and 491. The address input lines of the second read-only memory would be connected to lines 495, 500, 502, 507 and 509, and its data output lines would be connected to lines 498 and 505. In this example, each of the two read-only memories would replace a group of six gates. An advantage of the multiple read-only memory approach is that the total number of bits in the read-only memories is generally less. For example, a single nine-bit input (512 word), 4-bit output read-only memory will contain a total of 2,048 bits. Two read-only memories, each 5-bit input (32 word), 2-bit output will contain a total of 128 bits. The code conversion process in the system of FIG. 16 could be implemented with four read-only memories, each 3-bit output (8 word), and 1-bit output, of the type used in the system of FIG. 21. The total number of bits in the four read-only memories would be 32 bits.

If desired, mixed code conversion systems may be devised using combinations of logical gate networks, read-only memories and/or other means as may be desired. For example, in the system of FIG. 16, a five-bit input, 2-bit output read-only memory may be used to replace gates 483, 484, 487, 489, 490 and 494, while retaining the other gates shown in FIG. 16.

FIG. 1 shows the use of frequency multipliers for the generation of multiple frequency timing signals while FIG. 6 shows the use of frequency dividers for a similar purpose. If desired, combinations of frequency multipliers and frequency dividers, such as shown in FIG. 22, may be used for such purposes. For example, the system of FIG. 1 may be modified to use two frequency multipliers and one frequency divider. An oscillator with an output signal of twice the frequency of oscillator 17 would be connected to line 21. Frequency multiplier 20 would be deleted and a frequency divider circuit substituted therefor. Line 21 would be connected to the input of the frequency divider circuit and its output would be connected to the input of phase shift 19. Synchronization between the new double frequency oscillator and radar system 11 could be provided by a connection between the new oscillator and radar system 11, or the output of the frequency divider could be connected to line 29 and the synchronization input of radar system 11. With these changes, the system of FIG. 1 would otherwise operate as described previously.

The preceding disclosure has shown a number of systems in which times are digitally measured by the sampling of sine wave signals of various frequencies and of the general forms $\pm\sin(N\omega t)$, $\pm\cos(N\omega t)$ and $\pm\sin(N\omega t\pm 45°)$. FIGS. 17 through 22 have shown a number of systems in which rectangular wave signals of a particular time or phase relationship are sampled. The use of sine waves and other signals of these particular phases is convenient but not necessary. Functions generally of the form $\pm\sin(N\omega t\pm A)$, and corresponding signals of other wave forms, where A is an appropriate phase angle may be employed in inplementations of the subject invention.

FIGS. 17, 19, 21 and 22 have shown the generation of multiple frequency clock signals via logical or counting operations. FIG. 21 has shown a form of fast carry counter circuit in which the propagation time effects are substantially reduced. There is in general no single or unique arrangement of logical elements to perform a given set of logical functions. Hence, other arrangements of logical circuit elements and/or counting devices may be devised to perform generally similar functions for the generation of sets or subsets of clock signals.

The preceding disclosure has shown a number of systems in which one, two or five different phases of a signal of a particular frequency are sampled for conversion into a set of logical or digital values as part of a digital time measurement process. Other systems may be devised which are generally similar to the forms of the invention shown, but which may include the sampling of one or more numbers of phases which are different from one, two or five.

The preceding disclosure has shown a number of systems in which oscillator section signals of a generally sine wave form and/or rectangular waveform are generated and sampled. In particular instances, it may be desirable to generate and sample signals of other waveforms in addition to or in place of sinusoidal and/or rectangular waveform signals. For example, triangular waveform signals such as are generated by some types of current integration oscillators may be used in the subject invention.

In the claims, the term periodic signal is intended to imply a signal, such as a sinusoidal or rectangular waveform, whose value effectively repeats in a generally periodic manner. The term cyclic variable is intended to imply a variable, such as an angle, whose values effectively repeat in a generally cyclic manner. The term time measurement is intended to include the measurement of event times, multiple event times and time intervals. The term analog as in analog signal is intended to generally imply a signal whose value may vary more or less continuously over a range. In a particular application, an analog signal generated by a signal source may possess this characteristic to a greater or lesser extent. The term logical as in logical signal is intended to generally imply a signal which will normally have one of a predetermined number of values except for transitions between values. The term digital as in digital signal is intended to generally imply a signal representing a digital value which may correspond to one or more logical signals. A particular signal may have a combination of analog, logical and/or digital properties. For example, the polarity of an analog signal relative to a reference value may be a logical signal and/or a binary digital signal. The term sampling means is used in a broad sense and is intended to include analog sampling means, digital sampling means and combinations thereof. The term subset is intended in its broad sense. A particular subset may include an entire set of which it is a subset. Two subsets of the same set may or may not overlap.

What is claimed is:

1. A digital time measurement system including a source of a plurality of different related periodic signals, a source of a time signal whose time is to be measured, means for sampling the values of said plurality of periodic signals in response to a signal from said time signal source and generating a plurality of logical signals from the sampled values of said plurality of periodic signals, said plurality of logical signals comprising an intermediate code representation of a digital data value corresponding to the measured time such that not more than one of said logical signals need change between any two adjacent digital data values, digital data receiving means, and means connecting said plurality of logical signals to said digital data receiving means.

2. The combination of claim 1 further characterized by said means connecting said logical signals to said digital data receiving means including means for converting said digital data value from said intermediate code representation corresponding to said logical signals into a different output code representation of the same digital value for transmission to said digital data receiving means.

3. The combination of claim 1 further characterized by said source of periodic signals including means providing signals of a plurality of different frequencies.

4. The combination of claim 3 further characterized by said source of periodic signals including means to provide a subset of said signals at frequencies related to each other substantially in proportion to successive powers of two.

5. The combination of claim 4 further characterized by said means connecting said logical signals to said digital data receiving means including means for converting said digital data value from said intermediate code representation corresponding to said logical signals into a different output code representation of the same digital value for transmission to said digital data receiving means.

6. The combination of claim 4 further characterized by said logical signals including a subset of logical signals comprising a pair of logical signals corresponding to each frequency of a subset of said subset of frequencies related substantially in proportion to successive powers of two, said means connecting said logical signals to said digital data receiving means including means for the selection of one of each pair of logical signals in said subset of logical signals for transmission to said digital data receiving means, the selection being a predetermined function of the values of at least some of said logical signals exclusive of the pair from which the selection is made.

7. The combination of claim 6 further characterized by said sampling means including analog sampling means sampling a subset of said periodic signals as analog signals having analog signal values, and by said means for generating a plurality of logical signals including means for generating a second subset of a plurality of said logical signals which are predetermined functions of the sampled analog signal values, the number of logical signals in said second subset of logical signals being greater than the number of said sampled analog signal values.

8. The combination of claim 7 further characterized by a subset of said sampled analog signal values comprising a first set of component signals corresponding to a first cyclic variable corresponding to the time of said time signal, said means for generating a second subset of a plurality of logical signals including means for generating at least one additional set of component signals corresponding to at least one additional cyclic variable which is substantially at a predetermined phase angle to a predetermined constant multiple of said first cyclic variable, a plurality of said signals of said second subject of logical signals being at least partially predetermined functions of said additional component signals.

9. The combination of claim 3 further characterized by said means connecting said logical signals to said digital data receiving means including means for converting said digital data value from said intermediate code representation corresponding to said logical signals into a different output code representation of the same digital value for transmission to said digital data receiving means.

10. The combination of claim 3 further characterized by said sampling means including analog sampling means for the sampling of a subset of said periodic signals as analog signals, and by said means for generating a plurality of logical signals including means for generating a subset of a plurality of said logical signals as predetermined functions of the sampled analog signal values, the number of logical signals in said subset of logical signals being greater than the number of said sampled analog signal values.

11. The combination of claim 10 further characterized by said means connecting said logical signals to said digital data receiving means including means for converting said digital data value from said intermediate code representation corresponding to said logical signals into a different output code representation of the same digital value for transmission to said digital data receiving means.

12. A digital time measurement system including a source of a plurality of clock signals which are time related to each other, a source of a time signal whose time is to be measured, means for sampling the values of said clock signals in response to a signal from said time signal source, said sampled clock signal values comprising a set of cyclic signals representative of the time of said time signal, means generating a plurality of logical signals from said sampled clock signal values, said plurality of logical signals comprising an intermediate code representation of a digital data value corresponding to the measured time, said intermediate code representation being selected so that not more than one of said logical signals need change between any two adjacent digital data values, digital data receiving means, and means connecting said plurality of logical signals to said digital data receiving means.

13. The combination of claim 12 wherein said source of said clock signals includes means generating said clock signals to have values which are cyclic over a plurality of different minimum time intervals.

14. The combination of claim 13 further characterized by said means connecting said logical signals to said digital data receiving means including means for converting said digital data value from said intermediate code representation corresponding to said logical signals into a different output code representation of the same digital value for transmission to said digital data receiving means.

15. The combination of claim 13 further characterized by said means generating said clock signals including means generating a subset of clock signals of cyclic minimum time intervals related to each other substantially in proportion to successive powers of two.

16. The combination of claim 15 further characterized by said means connecting said logical signals to said digital data receiving means including means for converting said digital data value from said intermediate code representation corresponding to said logical signals into a different output code representation of the same digital value for transmission to said digital data receiving means.

17. The combination of claim 13 further characterized by said sampling means including analog sampling means for sampling a subset of said clock signals as analog signals having analog signal values, and by said means for generating a plurality of logical signals including means for generating a subset of a plurality of said logical signals which are predetermined functions of the sampled analog signal values, the number of logical signals in said subset of logical signals being greater than the number of said sampled analog signal values.

18. The combination of claim 17 further characterized by said means connecting said logical signals to said digital data receiving means including means for converting said digital data value from said intermediate code representation corresponding to said logical signals into a different output code representation of the same digital value for transmission to said digital data receiving means.

19. A digital time measurement system to provide a digital word comprising a selected number of bits representing a time function, including a source of a plurality of periodic signals having values cycling between two states with respect to a reference value, a source of a time signal whose time is to be measured, means for establishing a time reference between said periodic signals and each time signal from said source, means for sampling the states of each of said plurality of periodic signals in response to a time signal from said time signal source, and for generating a plurality of logical signals therefrom representing a digital value derived from the states of said plurality of periodic signals with respect to the reference value and being generated so that not more than one of said logical signals need change between any two adjacent digital values.

20. A method of providing a digital data value indicating a relative time including the steps of generating a plurality of time related periodic signals, sampling the values of each of said plurality of periodic signals in response to a time signal, and generating a plurality of logical signals indicating the sampled values of said plurality of periodic signals selected so that only one of said logical signals need change between any two adjacent digital data values.

21. The method of claim 20 including the further step of converting said digital data value represented by said logical signals into a different output digital code representation of the same digital value for transmission to digital data receiving means.

22. The method of claim 21 including the step of providing a time reference for all of said periodic signals prior to the sampling step.

23. The method of claim 22 wherein the step of providing said time reference comprises a first sampling step and generating logical signals representing a first digital data value.

24. The method of claim 21 wherein the output digital code comprises a plurality of bits and the step of converting the logical signals to an output code representation includes the step of controlling the value of all but one of the bits at least in part by the value of an adjacent bit.

* * * * *

UNITED STATES PATENT OFFICE
CERTIFICATE OF CORRECTION

Patent No. 3,889,189                    Dated June 10, 1975

Inventor(s) Tenny D. Lode

It is certified that error appears in the above-identified patent and that said Letters Patent are hereby corrected as shown below:

Column 4, line 63 "sin" should be --in--. Column 6, line 33 "-sin(-" should be-- -sin(--; line 37 "AT" should be--At--; line 51 "signals" should be--signal--. Column 7, line 41 "7,400" should be --7400--. Column 8, line 13 "7,400" should be--7400--; line 29 "7,400" should be --7400--. Column 9, line 61 "7,400" should be --7400--. Column 10, line 35 "61" should be--62--; line 61, after "$2^3$" insert--or--. Column 14, line 44 "fourbit" should be--four-bit--. Column 18, line 59 "numbmer" should be--number--. Column 19, line 22 "retentinon" should be--retention--. Column 21, line 24, "signal" should be--Signal--. Column 22, line 52 "317" should be--327--. Column 24, line 18 "sin(-" should be-- -sin(--; line 53 "subs" should be--sub--. Column 26, line 60 "off" should be--of--. Column 27, line 13 after "includes" delete --a--; line 56 "-sin(-" should be-- -sin(--. Column 28, line 30 "7,400" should be--7400. Column 31, line 58 "7,400" should be--7400--; line 61 "-sin(-" should be-- -sin(--; line 62 after "2$_b$", first occurrence insert--$_b$--; line 62 after "2$_b$" second occurrence insert--$_b$ --. Column 32, line 33 "8$_L$" should be--8$_Θ$--; line 58 "bit" should be--bits--. Column 34, line 32 "one" should be--on--; line 41 "7,400" should be--7400--; line 64 "multi-vibrator" should be--multivibrator--. Column 37, line 7 "fro" should be--for--; line 54 "566" should be--567--; line 63 "FFigs." should be--Figs.--. Column 38, line 19 "thorugh" should be--through--; line 30 "592" should be--593--; line 42 "602" should be--603--. Column 39, line 35 "7,400" should be--7400--. Column 42,

UNITED STATES PATENT OFFICE
CERTIFICATE OF CORRECTION

Patent No. 3,889,189      Dated June 10, 1975

Inventor(s) Tenny D. Lode

It is certified that error appears in the above-identified patent and that said Letters Patent are hereby corrected as shown below:

line 11 "input" should be--output--. Column 46, line 65 "7,400" should be --7400--. Column 47, line 46 "net-works" should be--networks. Column 48, line 29 "crresponding" should be--corresponding--. Column 51, line 42 "-sin(-" should be-- -sin(--; line 46 "7,400" should be--7400--. Column 52, line 14 "7,400" should be--7400--; line 52 "-sin(-" should be -sin( . Column 55, line 42, after "(" insert--5--. Column 57, line 48 "7,400" should be--7400--; line 51 "7,400" should be--7400--; line 54 "7,400" should be--7400--.

Signed and Sealed this

Tenth Day of July 1979

[SEAL]

Attest:

*Attesting Officer*

LUTRELLE F. PARKER
*Acting Commissioner of Patents and Trademarks*